US009032164B2

(12) United States Patent
Rupanagunta et al.

(10) Patent No.: US 9,032,164 B2
(45) Date of Patent: May 12, 2015

(54) APPARATUS FOR PERFORMING STORAGE VIRTUALIZATION

(75) Inventors: Sriram Rupanagunta, Costa Mesa, CA (US); Parag Bhide, Costa Mesa, CA (US)

(73) Assignee: Emulex Corporation, Costa Mesa, CA (US)

( * ) Notice: Subject to any disclaimer, the term of this patent is extended or adjusted under 35 U.S.C. 154(b) by 899 days.

(21) Appl. No.: 11/707,325

(22) Filed: Feb. 16, 2007

(65) Prior Publication Data

US 2007/0239944 A1    Oct. 11, 2007

Related U.S. Application Data

(60) Provisional application No. 60/774,793, filed on Feb. 17, 2006.

(51) Int. Cl.
*G06F 12/00* (2006.01)
*G06F 3/06* (2006.01)
*G06F 11/14* (2006.01)
*G06F 11/20* (2006.01)
*H04L 12/721* (2013.01)

(52) U.S. Cl.
CPC ............ *G06F 3/0635* (2013.01); *G06F 3/0613* (2013.01); *G06F 3/067* (2013.01); *G06F 11/1435* (2013.01); *G06F 11/2005* (2013.01); *G06F 11/201* (2013.01); *G06F 11/2033* (2013.01); *G06F 2201/84* (2013.01); *H04L 45/62* (2013.01)

(58) Field of Classification Search
USPC ....................................................... 711/154
See application file for complete search history.

(56) References Cited

U.S. PATENT DOCUMENTS 6,405,284 B1 * 6/2002 Bridge ........................ 711/114
6,952,737 B1 * 10/2005 Coates et al. ................ 709/229
7,093,038 B2 * 8/2006 Ghosh et al. .................. 710/62

(Continued)

OTHER PUBLICATIONS

Anonymous. (Apr. 4, 2005). "StoreAge Announces First and Only SPAID-Optimized Storage Services Application Software; Split-Path Data Protection Software Available for SPAID Hardware Platforms," *Business Wire*, located at http://www.businesswire.com/news/home/20050404005385/en/StoreAge-Announces-SPA . . . , last visited Jun. 27, 2012, two pages.

(Continued)

*Primary Examiner* — Aimee Li
*Assistant Examiner* — Prasith Thammavong
(74) *Attorney, Agent, or Firm* — McAndrews, Held & Malloy Ltd.

(57) ABSTRACT

The splitting of storage applications and functions into a control path (CP) component and a data path (DP) component is disclosed. Reads and writes may be handled primarily in the DP. The CP may be responsible for discovery, configuration, and exception handling. The CP can also be enabled for orchestrating complex data management operations such as snapshots and migration. Storage virtualization maps a virtual I/O to one or more physical I/O. A virtual target (vTarget) in the virtual domain is associated with one physical port in the physical domain. Each vTarget may be associated with one or more virtual LUNs (vLUNs). Each vLUN includes one or more vExtents. Each vExtent may point to a region table, and each entry in the region table may contain a pointer to a region representing a portion of a pExtent, and attributes (e.g. read/write, read only, no access) for that region.

26 Claims, 49 Drawing Sheets

(56) References Cited

U.S. PATENT DOCUMENTS

| | | | | |
|---|---|---|---|---|
| 7,228,538 | B1* | 6/2007 | Burton et al. | 717/170 |
| 7,269,743 | B2* | 9/2007 | Yagawa | 713/189 |
| 7,603,507 | B2* | 10/2009 | Yagi et al. | 710/316 |
| 7,864,806 | B2* | 1/2011 | Qiu et al. | 370/474 |
| 2004/0068561 | A1* | 4/2004 | Yamamoto et al. | 709/224 |
| 2004/0111485 | A1* | 6/2004 | Mimatsu et al. | 709/213 |
| 2005/0083952 | A1* | 4/2005 | Swain | 370/401 |
| 2005/0193161 | A1* | 9/2005 | Lee et al. | 711/103 |
| 2006/0112219 | A1* | 5/2006 | Chawla et al. | 711/114 |
| 2006/0212751 | A1* | 9/2006 | Yamamoto et al. | 714/6 |

OTHER PUBLICATIONS

Anonymous. (Apr. 6, 2005). "StoreAge and iVivity Announce Availability of SPAID-Based, SAN Storage Product: First ASIC-Based, SPAID Solution to Enter the Market," *Business Wire*, located at http://businesswire.com/news/home/20050406005012/en/StoreAge-iVivity-Announc . . . , last visited Jun. 27, 2012, three pages.

Bhide, P. et al. (Jul. 31, 2003). "Aarohi FabricStream™ API, T11/03-480V0," *Aarohi Communications*, T11.5 FAIS Project Submittal, document date of Aug. 4, 2003, located at http://www.t10.org/ftp/t11/document.03/03-480v0.pdf, last visited Jul. 2, 2012, 19 pages.

Bhide, P. et al. (Aug. 5, 2003). "Aarohi FabricStream™ API, T11/03-480V1," *Aarohi Communications*, T11.5 FAIS Project Submittal, document date of Aug. 6, 2003, located at http://www.t10.org/ftp/t11/docurnent.03/03-480v1.pdf, last visited Jul. 2, 2012, 19 pages.

Clark, T. (Dec. 10, 2003). "A New Standard for Fabric Intelligence," *EnterpriseStorageForum.com*, located at http://www.enterprisestorageforum.com/sans/features/article.php/3287021/A-New-Standar . . . , last visited Jun. 27, 2012, http://www.enterprisestorageforum.com/sans/features/article.php/11188_3287021_2/A-New . . . , last visited Jul. 9, 2012, http://www.enterprisestorageforum.com/sans/features/article.php/11188_3287021_3/A-New . . . , last visited Jul. 9, 2012, three pages.

Garrett, B. (Jan. 20, 2005). "A Case for Port Level Storage Network Intelligence," *Enterprise Strategy Group*, located at http://www.esg-global.com/briefs/a-case-for-port-level-storage-network-intelligence/, last visited Jun. 27, 2012, two pages.

Mellor, C. (Feb. 23, 2005). "One Question: Are You in or Are You Out?" *TechWorld*, located at http://features.techworld.com/storage/1217/one-question-are-you-in-or-are-you-out/, last visited Jun. 27, 2012, five pages.

Mellor, C. (Mar. 10, 2005). "EMC's Virtualisation SPAID-work," *TechWorld*, located at http://features.techword.com/storage/1254/emcs-virtualisation-spaid-work/, last visited Jun. 27, 2012, five pages.

Mellor, C. (Apr. 6, 2005). "Storage Boosted by SPAID Technology," *TechWorld*, located at http://news.techworld.com/storage/3430/storage-boosted-by-spaid-technology/?print, last visited Jul. 9, 2012, one page.

Norall, S. (Feb. 12, 2007). "Storage Virtualization Strategies," *InfoWorld* Virtualization Executive Forum, San Francisco, CA, located at http://www.infoworld.com/event/virtualization/docs/Storage%20Virtualization%20Strategies.pdf, last visited Jun. 27, 2012, 20 pages.

* cited by examiner

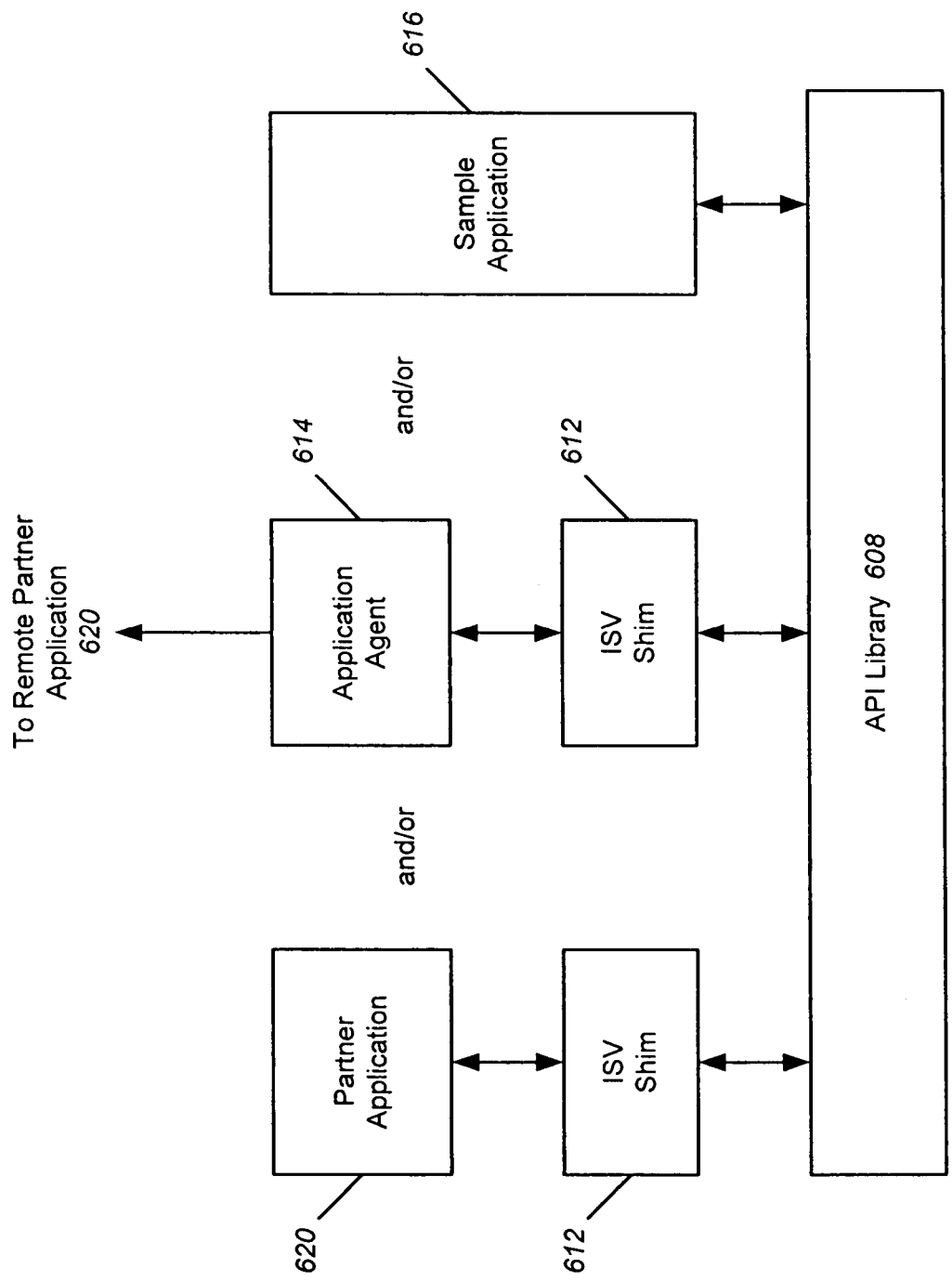

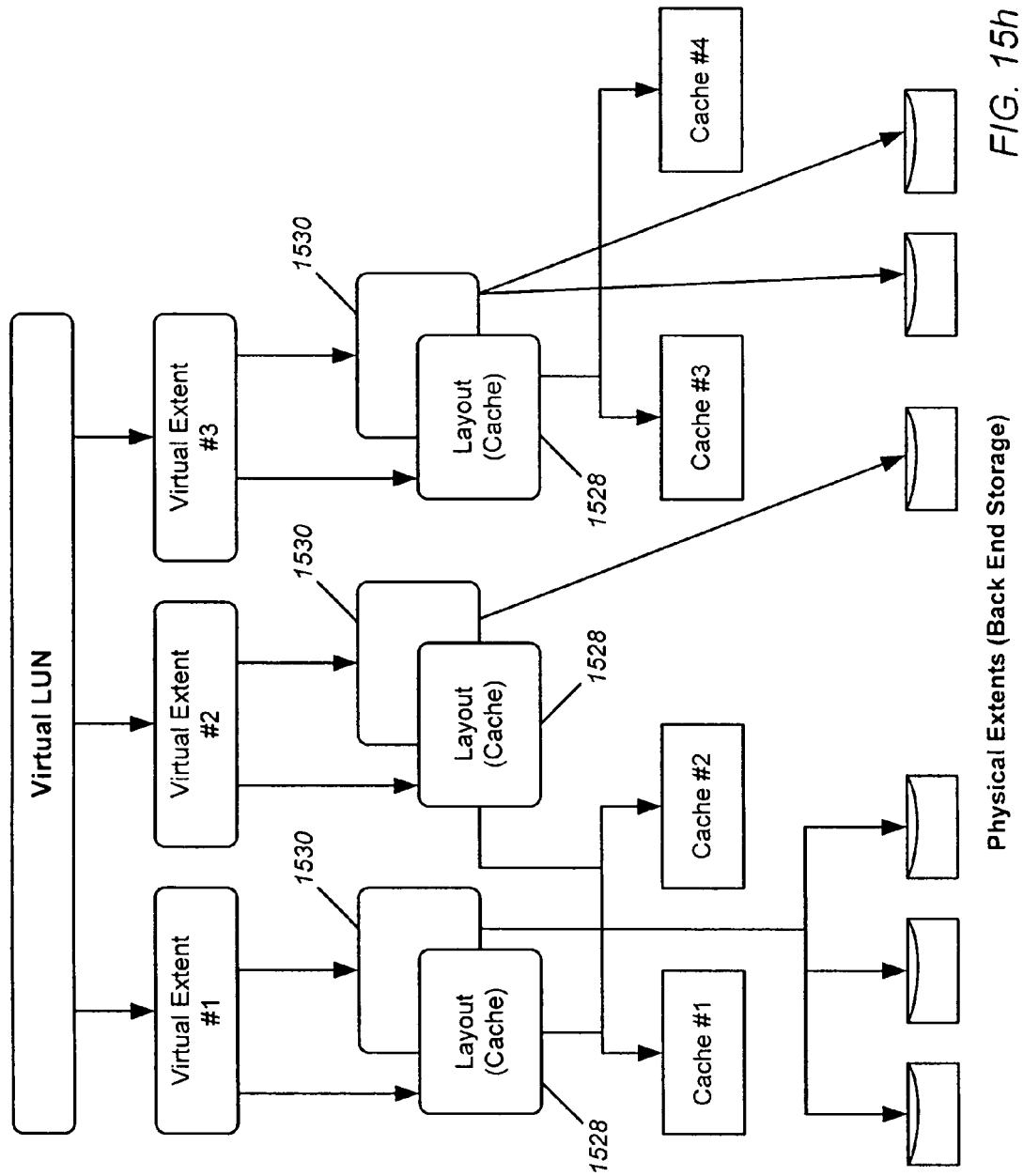

Write IO Flow Using Hierarchical Maps

- Supports Pooling of Storage from Multiple Vendors
- Supports Data Migration from One Storage Device to the Other (Vendor Agnostic)
- Support Creation of Point-in-Time Copies of Data on High-End Storage Devices to Second-Tier Storage Devices

APPARATUS FOR PERFORMING STORAGE VIRTUALIZATION

CROSS-REFERENCE TO RELATED APPLICATIONS

This application claims the benefit under 35 USC 1.19(e) from U.S. Provisional Application No. 60/774,793 filed on Feb. 17, 2006, and is related to U.S. patent application Ser. No. 11/433,728 filed May 11, 2006, both of which are incorporated herein by reference.

FIELD OF THE INVENTION

This invention relates to communications between initiators and targets in a storage area network (SAN) fabric, and more particularly to the splitting of such communications into a control path (CP) for controlling the communication flow, and a data path (DP) for enabling the communication flow at or near wire speeds.

BACKGROUND OF THE INVENTION

Traditional storage applications have been monolithic systems, running all aspects of storage applications and analysis on a single processor. This leads to huge amounts of functionality resident on one piece of hardware and/or software.

Conventional systems are monolithic in that they did not distinguish between control and data paths. Processors and software in these monolithic systems were used to handle both control and data functions. This results in slower performance of data functions.

Therefore, there is a need for a split-path architecture that enables control functions to be handled in the CP, while data functions are handled in the DP, producing a more efficient flow of data across a storage area network (SAN) fabric.

SUMMARY OF THE INVENTION

Embodiments of the invention are directed to the splitting of storage applications and functions into a CP component and a DP component. Reads and writes may be handled primarily in the DP. The CP may be responsible for discovery, configuration, and exception handling. The CP can also be enabled for orchestrating complex data management operations such as snapshots and migration. This bifurcation of functions can lead to increased throughput and flexible and dynamic management capabilities without high overhead.

Initiators and targets may be connected to a virtualization device in a SAN fabric. The virtualization device includes a DP, which may include an intelligent network processor (INP) and random access memory (RAM). The RAM may store the various virtual disk (vDisk) tables, region tables, and layout tables as defined by the virtualization structures. The virtualization device also includes a CP, which may include a processor and associated software connected to the INP.

The virtualization device effectively creates an initiator domain and a target domain. In the initiator domain, hosts do not see the targets directly. Instead, they see one or more virtual targets (VTs) created within the virtualization device, and communicate with the VTs using virtual I/O. However, the VTs will make it appear to the hosts that they are in fact communicating directly with one or more targets. The VTs may include, but are not limited to, a concatenation of multiple physical targets to form a larger-capacity VT, a mirror of two physical targets, and other arrangements of physical targets. In the target domain, targets do not see the initiators directly. Instead, they see one or more virtual initiators (VIs) created within the virtualization device, and communicate with the VIs using physical I/O.

From a physical domain perspective, initiators and physical storage arrays (containing targets) communicate over a storage area network comprised of switches. A physical storage array may contain one or more physical ports (e.g. FC ports) for connecting to the switches (e.g. FC switches). Each physical port provides access to a number of physical storage devices, which may be referred to as LUNs. Each LUN may contain one or more physical extents (pExtents), and each LUN may be mapped to one volume of a target. LUNs may be within the same physical drive or spread out among several physical drives.

From a virtual domain perspective, the goal is to emulate the physical domain. The overall concept is to map a virtual I/O to one or more physical I/O. A virtual target (vTarget) in the virtual domain is associated with one physical port in the physical domain. Each vTarget may be associated with one or more virtual LUNs (vLUNs). As noted above, each vLUN includes one or more vExtents. The vLUNs map I/O requests, which may span two or more vExtents, to physical I/O. Each vExtent may point to a region table, which may contain one or more entries and effectively breaks up the memory represented by the vExtent into small regions. Each entry may contain a pointer to a region representing a portion of a pExtent, and attributes (e.g. read/write, read only, no access) for that region. In general, region tables provide finer granularity of control over the vLUN. Each vExtent may alternatively be associated with a layout. A "re-map" type layout points to a single pExtent and creates a mapping between the vExtent and a pExtent. A "mirror" type layout points to two pExtents for performing a mirroring function. A "striping" type layout points to two or more pExtents for performing a striping function.

The CP discovers physical disks in the fabric, manages the mapping of virtual to physical storage, and presents virtual targets to initiators. Based on mappings programmed by the CP, the DP performs reads and writes in real time and refers exceptions back to the CP.

For example, a Read/Write (R/W) command from an Initiator for a vDisk configured in its tables is routed by the DP to the corresponding pDisk. Using the logical block address (LBA) in the command, the DP identifies the vExtent to which the I/O belongs. The vExtent entry leads to the layout descriptor that specifies the geometry of the virtual extent and maps it to one or more physical extents. If R/W access is enabled for the vExtent, the DP forwards the I/O to the mapped physical extent(s).

In case the vExtent is sub-divided into regions, the region within which the I/O falls is identified. The Region entry leads to the Layout entry (and an offset). Using the Layout entry the DP validates access permissions for the region. If the permission is not sufficient, the I/O is faulted to the CP. Otherwise, the physical target information is picked up using the layout handle in the Layout entry and the DP generates appropriate SCSI command to the target. If the vDisk or vExtent entry is not present in the DP tables, it results in an I/O miss event notification being sent to the CP.

When there is an I/O miss (which occurs when a mapping table doesn't exist, or when a portion of the mapping table indicates that the target is not writable), the CP needs to have access to those I/O requests. For example, if the CP has set up a vDisk, and is performing some special operations on that vDisk, such as a snapshot, then if a write is received for that vDisk, the CP may not want it to occur immediately, and may instead want to take control of that I/O request. To prevent the write from happening, the CP may mark certain sections of that vDisk as unwritable, so that instead of processing the I/O request the DP will send an I/O miss to the CP, and the CP can take control. The CP can then perform certain operations such as a re-mapping, and then allow the I/O to proceed.

The communications between the CP and DP are generalized. There are multiple ways that the CP can talk to the DP, based on the customer applications. The most common communication protocol is a PCIe interface. In general, the CP and DP communication mechanism is done so that the physical transport is abstracted out, and the drivers are unaware of communications below, which are abstracted into a messaging layer.

The OS abstraction layer, which includes certain device drivers, is software that runs in the CP and abstracts commonly used OS services such as thread services, semaphores etc. and is utilized to ease porting to other operating systems. A Hardware Abstraction Layer (AHAL) and message layer can be utilized to provide a C language interface from the CP drivers to the DP(s) through message-passing mechanisms. The AHAL can utilize a layer such as the CPML (Control-Path Messaging Layer) to provide the transport interface between the Control Path Processor and the device(s).

The driver layer includes a set of drivers that expose a API library. The Virtualization module provides an interface to create and maintain virtual disks on one or more DP (virtualization) engines. The FC Initiator/Target Module provides Fibre Channel Initiator/Target functionality, including a frame interface for sending and receiving raw FC frames. The Device Management and Diagnostics Driver provides an interface to initialize the hardware devices, update firmware, and run diagnostic commands on the device.

The API library runs in the processor. The API library is used by the partner applications to perform tasks such as snapshots, data migration, block copy, and the like. The API provides a feature set that builds upon the capabilities of the hardware platforms. Both the OS abstraction layer and the API library are provided to the partner (owner of the virtualization device).

An application agent communicates with a remote partner application, the application agent using an ISV shim to communicate with the API library. The partner application is written to link with the API library to perform certain functions such as snapshots, data migration, etc.

In the split path architecture, both CP and DP may run in the same computer, or different computers. If different computers are used, there is a high availability (HA) mode of operation where multiple CPs can be employed to control a DP. If one CP goes down, the other can take over. If the CP and DP are located in the same computer, another HA mode of operation can be employed in which a single CP controls multiple DP engines. If one of the DPs goes down, the CP can transfer the information to the other DP.

A number of virtualization services may be performed by partner applications utilizing the API library. In a simple LBA remap, one virtual target is instantiated and associated with one physical target in a one-to-one map. The system can also support synchronous mirroring with local mirrors and/or remote mirroring with a journal disk. In mirroring, a single virtual disk maps to two physical disks for redundancy.

Block copy copies data from one physical disk to another physical disk without involving the host software. This is typically used for data migration or snapshots, when data is copied from one disk to another disk. The block copy function is called as part of that migration or snapshot process. Block copy is normally performed between two separate devices. However, there are occasions when a block copy is attempted between two blocks that are actually part of the same target or same device. This can occur when repeated carving of the disks occurs across volumes. So it may appear that a block copy is being performed from one volume to another, when in fact the copy is being attempted within the same volume. When this occurs, read and write request can clash, and remain unresolved and waiting in both directions, resulting in deadlock. However, the block copy operation referred to above avoids deadlock.

Another type of virtualization service that is capable of being implemented using the virtualization structures and split-path architecture is snapshots. In a standard disk environment, there are large amounts of data on the disks, and if a failure occurs, it is desirable to revert or roll back the volume to some previous version. This previous version of the volume is a snapshot. Transactions that occur after the failure are maintained so that they can be reapplied to the volume after the volume has been rolled back to the previous version, and the up to date database can recreated.

Another supported virtualization service is online data migration. If a lot of data is stored on a physical disk, and the physical disk is creating problems or is old, the data should be moved a new disk. Preferably, all the data should be moved over to the new disk without down time. Cutting off access to users creates down time and is unacceptable. Online migration enables this without down time. To migrate data from one vDisk to another, there is a software layer that starts copying data, but while this is going on, the initiators can be doing reads or writes. When these reads or writes happen to a certain portion of the disk being copied, those I/O requests are faulted as I/O misses, and the storage application software will queue the I/Os and wait for the data in that portion to be copied before letting the I/O go through.

The mirroring capability described above enables another feature, caching. In caching, applications can maintain their data caches in the fabric by treating the cache as a mirror. A caching appliance connected to the SAN can cache data locally when initiators send requests to targets. For example, during a write request, mirroring constructs can be used to deliver a copy of the data into cache, and the caching application may determine that the data also needs to be written to the target. If a read request for this data is subsequently received, it can be read directly from the cache, and the read request is never forwarded to the target. Background processes can be used to sync up the data in the cache. If, during a read request, the cache is determined to be out of sync (i.e. the data in the cache may not be updated), the data can be read from the physical storage and stored into the cache, and then the caching appliance may send the data along to the initiator.

Using the virtualization structure described above, volumes can be created in a hierarchical manner by mapping them to hierarchical extents. Hierarchical mode allows the creation of maps of various vDisks on top of vDisks. The layout tables may point to another vDisk instead of the pExtents. The hierarchy is traversed, going through multiple layers of vDisks, until a pExtent is eventually reached. The advantage of hierarchical volumes is that it makes partner applications simpler to write. For example, if it is desired to create a block copy of a vDisk, it is not necessary to get into the details of each physical layout and set permissions. Instead, a vDisk can be placed above it, regions and permissions can be created on this higher level vDisk, and a virtual block copy can then be performed on the lower vDisk using what amounts to a virtual command. The lower level details within the lower vDisk need not be managed. Similarly, if writing to a mirror, multiple writes to each pDisk are not necessary, because one write will take care of it.

BRIEF DESCRIPTION OF THE DRAWINGS

FIG. 6b illustrates an exemplary CP software layer diagram showing how partner applications or application agents communicate with an application programming interface (API) library through ISV shims according to embodiments of the invention.

FIG. 15h illustrates an exemplary object model of a "cacheable virtual disk" according to embodiments of the invention.

FIG. 15l illustrates an exemplary write—cache hit/cache allocate (single cache agent) according to embodiments of the invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Split-Path Architecture

Embodiments of the invention are directed to the splitting of storage applications and functions into a CP component and a DP component.

Figure 1A:
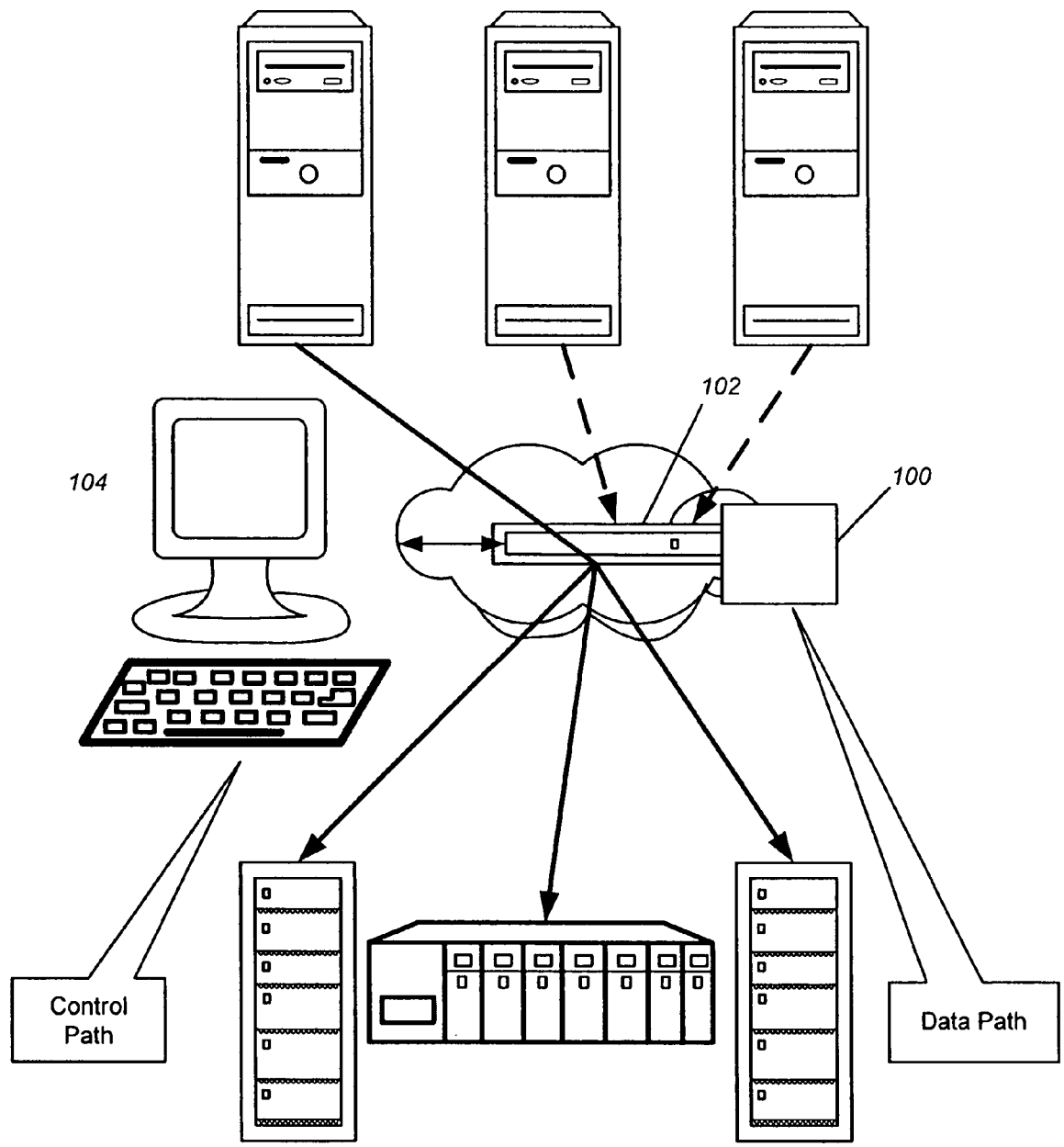
FIG. 1a illustrates an exemplary SAN showing the bifurcation of storage functions and applications according to embodiments of the invention.

FIG. 1a is a diagram detailing a model of such a bifurcation of functions and applications. In this view, the reads and writes (such as Small Computer System Interface (SCSI) operations) are handled entirely in the DP. The application intelligence and management functions reside in the CP. In this manner, the items in the CP are responsible for discovery, configuration, and exception handling. The CP can also be enabled to be responsible for orchestrating complex data management operations such as snapshots and migration. In this manner, the bifurcation of the functions can lead to vast increases in throughput and/or flexible and dynamic management abilities for such an interconnected system without large amounts of overhead for configuring individual pieces of hardware for each new change in the system.

Dedicated and specialized hardware can implement the DP portion of the storage application. The CP resides external to the DP. The DP performs table lookups, exchange management, and packet modification in a cut-through manner at wire-speed.

In FIG. 1a, the hardware and firmware of the DP are represented by a virtualization hardware block 100. There are several basic configurations. In one configuration, the virtualization hardware block is a switch module within a switch 102, the switch module containing the hardware/firmware of the DP. In this configuration a computer 104 is connected to the switch, the computer including a processor running the software of the CP, including partner applications. This may be referred to as a switch configuration. In another configuration, the virtualization hardware block is a card within a computer, the card holding the hardware/firmware of the DP. The computer includes a processor running the software of the CP, including partner applications. This may be referred to as an appliance configuration. In yet another configuration, the partner application could be run in a second computer, and be connected to the CP computer which runs an application agent to enable communications with the partner application.

Figure 1B:
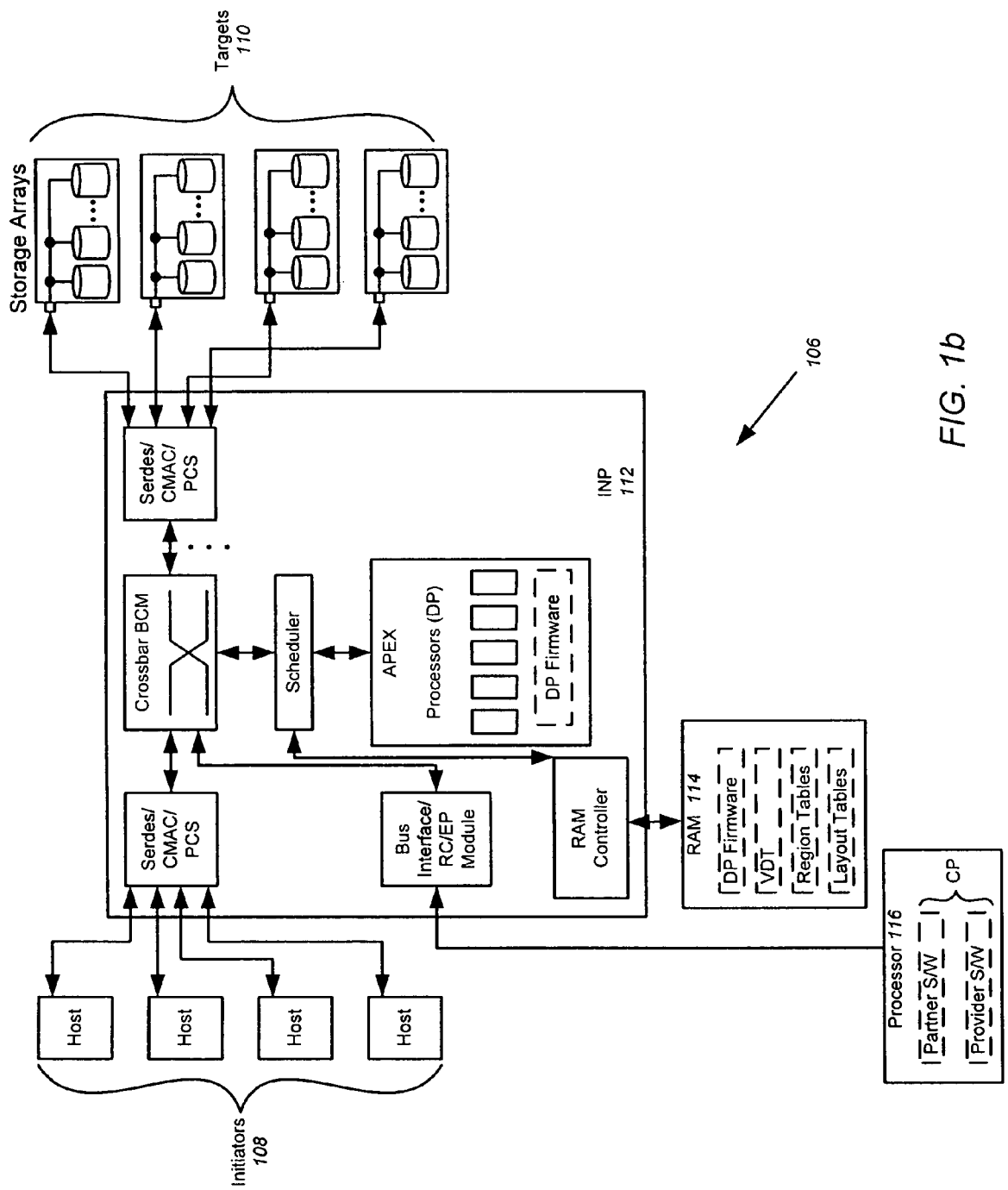
FIG. 1b illustrates an exemplary SAN fabric in which hosts or initiators and targets are connected to virtualization device according to embodiments of the invention.

FIG. 1b is an illustration of an exemplary SAN fabric 106 in which hosts 108 or initiators and the targets 110 are connected to a virtualization hardware block referred to herein as an intelligent network processor (INP) 112. It should be understood that the SAN fabric, as defined herein, is not limited to a single SAN, but can encompass multiple SANs in remote locations, configured and connected to function as a single SAN. The INP is described in U.S. patent application Ser. No. 11/433,728, filed May 11, 2006, the contents of which are incorporated herein by reference, and is shown and described in greater detail in FIG. 1c and the accompanying text. The INP, along with random access memory (RAM) 114, may form the DP. The DP includes the hardware of the INP along with firmware which is stored in the RAM and also within the APEX core of processors. The RAM may also store the various virtual disk (vDisk) tables, region tables, and layout tables to be discussed infra.

Also connected to the INP is another processor 116 and associated software, along with partner software, which together may form the CP.

Figure 1C:
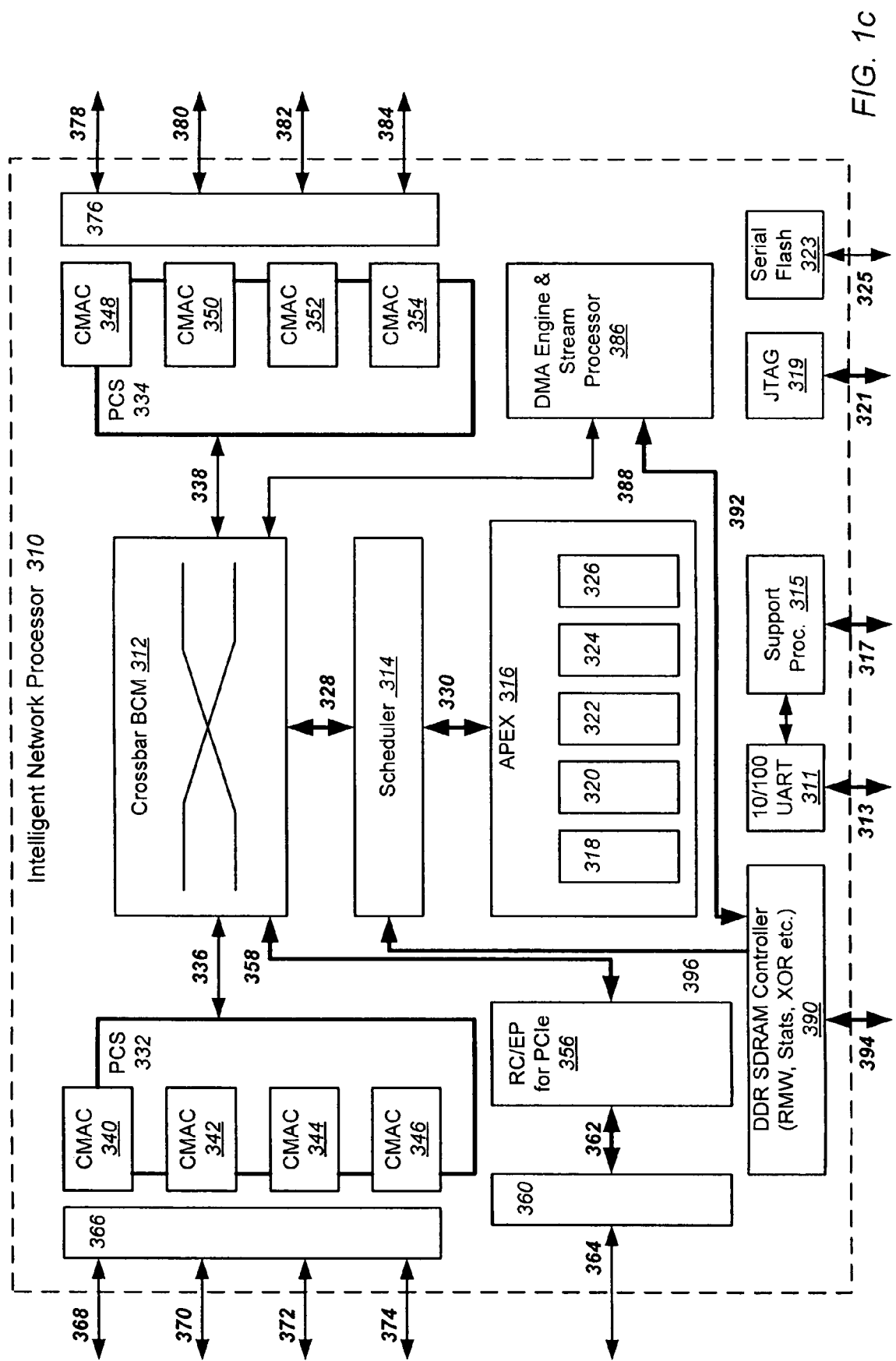
FIG. 1c illustrates an exemplary intelligent network processor (INP) for implementing a DP according to embodiments of the invention.

FIG. 1c is an illustration of an exemplary INP 310 implemented according to embodiments of the present invention. It should be understood that the architecture of the INP 310 shown in FIG. 1c is merely exemplary, and that other INP configurations may be utilized in the DP. INP 310 may be composed of a single silicon integrated circuit die, which may be packaged inside a ceramic, metal, or plastic housing to form a unitary component. INP 310 includes a bi-directional crossbar module (BCM) 312 which is controlled by a flow identification and scheduler module 314 through a bus 328. The BCM 312 may be a multi-ported shared Random Access Memory (RAM) having memory locations mapped as passages, and operating at 224 Gbps. The scheduler 314 operates under the control of an application processor (APEX) 316 acting through the bus 330, and maps the passages of crossbar locations inside the BCM 312. The scheduler 314 pre-processes received frames, packets, and peripheral component interconnect extended (PCIe) requests before they are acted upon by APEX 316. The scheduler 314 also parses received Fibre Channel (FC) frames into correct sequence, and parses received Gigabit Ethernet (GbE) packets (in Internet Protocol (IP) format) into a Transport Control Protocol (TCP) flow.

The APEX 316 may contain multiple core processors (e.g. five processors) for executing firmware, denoted in the example of FIG. 1c as processors 318, 320, 322, 324, and 326. These processors may be referred to herein as data path processors (DPPs). The processors 318, 322, 324, and 326 may be core model ARC750 as provided by ARC, Inc., which preferably each have the capability of executing 32 bit Reduced Instruction Set Computer (RISC) firmware with a clock speed of 500 MHz, and may each include 32 KB of dedicated instruction memory (not shown).

The BCM 312 is connected to protocol coordination storage (PCS) modules 332 and 334 through buses 336 and 338, respectively. PCS module 332 is connected to and controls the operation of Combined Media Access Controller (CMAC) modules 340, 342, 344, and 346. The CMAC modules 340, 342, 344, and 346 are identical hardware interfaces capable of each communicating using the FC protocol at 1 Gbps, 2 Gbps, and 4 Gbps speeds; and are each capable of communicating using the Ethernet protocol (the Internet Protocol) at 1 Gbps speed (1 GbE). The speed and protocol settings for the CMAC modules 340, 342, 344, and 346 are controlled by the PCS 332, which operates in response to control signals from a bus (not shown) connecting the PCS 332 to the APEX 316. The PCS 332 also has trunking modes in which it coordinates the operation of the four CMAC modules 340, 342, 344, and 346 together as a single trunk, when such trunking modes are determined by control signals from the APEX 316. One of the trunking modes of the PCS 332 causes the CMAC modules 340, 342, 344, and 346 to operate together as a single trunk for 10 Gbps FC protocol (10 Gb FC) provided in an X Attachment Unit Interface (XAUI) trunk as specified by existing FC standards for signaling. Another of the trunking modes of the PCS 332 causes the CMAC modules 340, 342, 344, and 346 to operate together as a single trunk for 10 Gbps Ethernet protocol (10 GbE) as specified in proposed GbE standards for signaling.

The PCS 334 is connected to the CMAC modules 348, 350, 352, and 354 in the same way that PCS 332 is connected to the CMAC modules 340, 342, 344, and 346. The construction of the PCS 334 is preferably the same as the construction of the PCS 332, but operating independently of the PCS 332. The CMAC modules 348, 350, 352, and 354 preferably have the same construction as the CMAC modules 340, 342, 344, and 346.

The Root Complex and EndPoint (RC/EP) module 356 is connected to the BCM 312 through bus 358, and is connected to bus interface 360 through bus 362. The bus interface 360 is preferably a serializer/deserializer (SERDES) for use with PCIe bus signals. The bus interface 360 is connected to the PCIe bus 364 provided by a host computer (not shown). One function of the RC/EP module 356 is to send and receive messages in the format determined by the PCIe industry standard, including configuration inquiry responses, separating messages for lanes, and messages for implementing particular functions. The PCIe bus 364 may have 8 lanes, operating at 2.5 Gbps.

Physical interface 366 includes combined SERDES coupled to each of the CMACs 340, 342, 344, and 346. The function of the interface 366 is to selectively provide, under control of signals coupled from the APEX 316, electronic signals in the FC protocol, GbE protocol, or trunking protocols such as XAUI for 10 Gb FC or 10 GbE. The interface provides such electronic signals on port interface connections 368, 370, 372, and 374 which exit the INP 310. The outputs are coupled to transceivers (not shown) which may be optical transceivers for connection to fiber optic cables, or electrical transceivers for connection to electrical cables. The physical interface 376 is preferably identical in construction to the interface 366, is coupled to the CMACs 348, 350, 352, and 354, and has port interface connections 378, 380, 382, and 384.

The direct memory access (DMA) engine and stream processor 386 is connected to the BCM 312 through bus 388, and is connected to a double data rate (DDR) synchronous dynamic random access memory (SDRAM) controller 390 through bus 392. The function of the controller 390 is to control the sending and receiving of data to and from an external DDR memory module (not shown) connected to the bus 394 of the controller 390; The controller 390 includes capabilities for providing RMW, statistics collection, exclusive Or (XOR) masking for data being transferred to or from the external DDR memory module. The data pathway through the bus 392 to the DMA engine and stream processor 386 and through the bus 388 to the BCM 312 allows DMA memory operations to occur directly with the controller 390 and its attached DDR memory module, without data flow through the APEX 316, for data being exchanged with other sources including the PCIe capabilities accessed through the bus 358 and RC/EP module 356, and the FC and GbE capabilities accessed through the buses 336 and 338 with the PCS modules 332 and 334. The ability to allow direct access for DMA operations through the BCM 312 with the DDR SDRAM controller 390 saves time that would be otherwise consumed by data being transferred into and out of the APEX 316. The controller 390 is also connected to the scheduler 314 through the bus 396. The controller 390 creates queues in the external DDR memory for storing data messages, and writes to and reads from such queues. The use of such queues, and the direct memory access to the crossbar BCM 312 (through the buses 388 and 392, controller 390, and DMA engine and stream processor 386) effectively increases the size of the crossbar BCM 312, and allows more switching pathways to be created than if the BCM 312 were used without the external DDR memory attached to connection 394.

The DMA engine and stream processor 386 may also perform several data stream transformations, including but not limited to T10.CAP (the Data Integrity protocol standard), data Cyclic Redundancy Check (CRC)/checksum insertion or checking/removal, marker insertion or removal, and transferring data to/from multiple buffers.

A Universal Asynchronous Receiver/Transmitter (UART) module 311 is provided which allows external control communications with the INP 310 at rates including 10 Megabits per second (Mbps) and 100 Mbps, though a UART connection 313. A support processor 315 is connected to exchange messages with the UART module 311, and has an external connection 317. The support processor 315 is preferably a core model ARC750 as provided by ARC, Inc. Joint test action group (JTAG) module 319 has an external connection 321, and is used for boundary scan testing of the hardware contained within the INP 310. The serial flash memory 323 has an external connection 325, is preferably a non-volatile reprogrammable memory which may be loaded through the connection 325, and stores the firmware for operation of the APEX 316 and support processor 315.

Figure 1D:
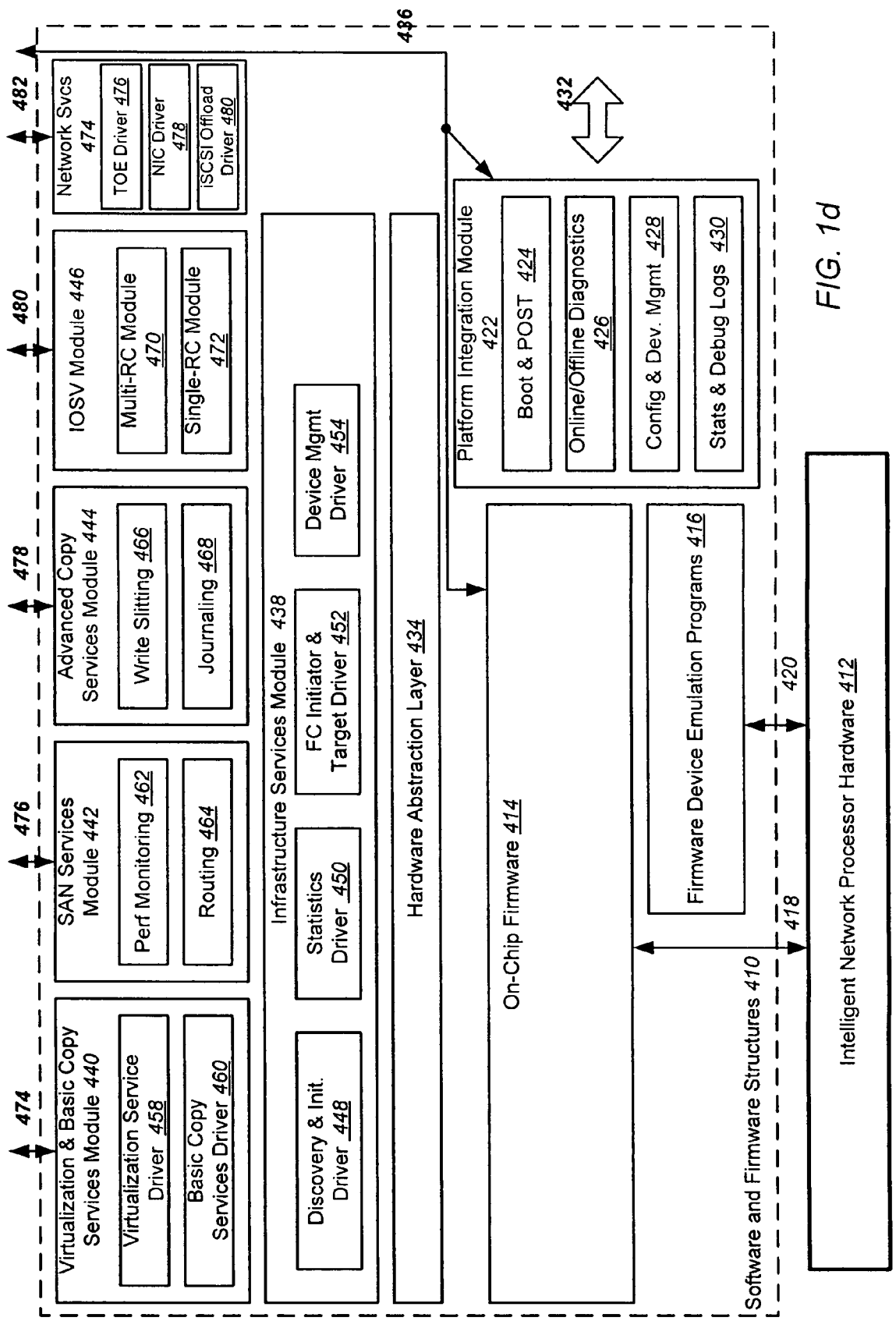
FIG. 1d illustrates exemplary firmware and software structures for use with the INP of FIG. 1c according to embodiments of the invention.

FIG. 1d is an illustration of the firmware and software structures 410 for use with the INP of FIG. 1c, as implemented according to embodiments of the present invention. The structures 410 serve to provide the computer codes for activating the INP hardware 412, and for interacting with a host operating system software structure (not shown) such as Linux or Microsoft Windows. The hardware 412 is preferably the same as the INP of FIG. 1c. On-chip firmware 414 and firmware device emulation programs 416 may be downloaded into the hardware 412, and are for execution by the APEX and support processor of FIG. 1c. The firmware 414 and programs 416 interact with the hardware 412 through connections 418 and 420, respectively.

Platform integration module (PIM) 422 is firmware code for execution by the support processor of FIG. 1c, and includes a boot startup and power on self test (POST) module 424, online and offline diagnostic program module 426, configuration and device management module 428, and status and debug log module 430. The PIM 422 may be accessed through the connection 432. The connection 432 is preferably the same as the connection 317 of FIG. 1c.

The on-chip firmware 414 and PIM 422 may be accessed by an external software operating system through a hardware abstraction layer 434, or may be directly accessed through a connection 436. The layer 434 is a part of a software driver program which also includes an infrastructure services module 438, a virtualization and basic copy services module 440, a Storage Area Network (SAN) services module 442, an advanced copy services module 444, an Input/Output Storage Virtualization (IOSV) module 446, and a network services module 474. The software drivers including the layer 434 and modules 438, 440, 442, 444, 446 and 474 are to be executed as a program on an external host computer processor (not shown) under the control of a host operating system software structure (not shown).

The infrastructure services module 438 includes a discovery and initiator driver 448, a statistics driver 450, a FC initiator and target driver 452, and a device management driver 454. The virtualization and basic copy services module 440 includes a virtualization services driver 458 and a basic copy services driver 460. The SAN services module 442 includes a performance monitoring module 462 and a routing module 464. The advanced copy services module 444 includes a wire splitting module 466 and a journaling module 468. The IOSV module 446 includes a multi-RC module 470 and a single RC module 472. The network services module 474 includes a Transmission Control Protocol (TCP) Offload Engine (TOE) driver 476, a Network Interface Card (NIC) driver 478, and an internet Small Computer System Interface (iSCSI) offload driver 480. The modules 440, 442, 444, 446 and 474 interface with the host operating system software structure (not shown) through the connections 474, 476, 478, 480 and 482, respectively.

In FIG. 1d, the hardware and firmware of the DP are associated with the INP block 412 and firmware block 414, respectively, and the software of the CP includes the hardware abstraction layer 434 and everything above it.

Virtualization Structure

Figure 1E:
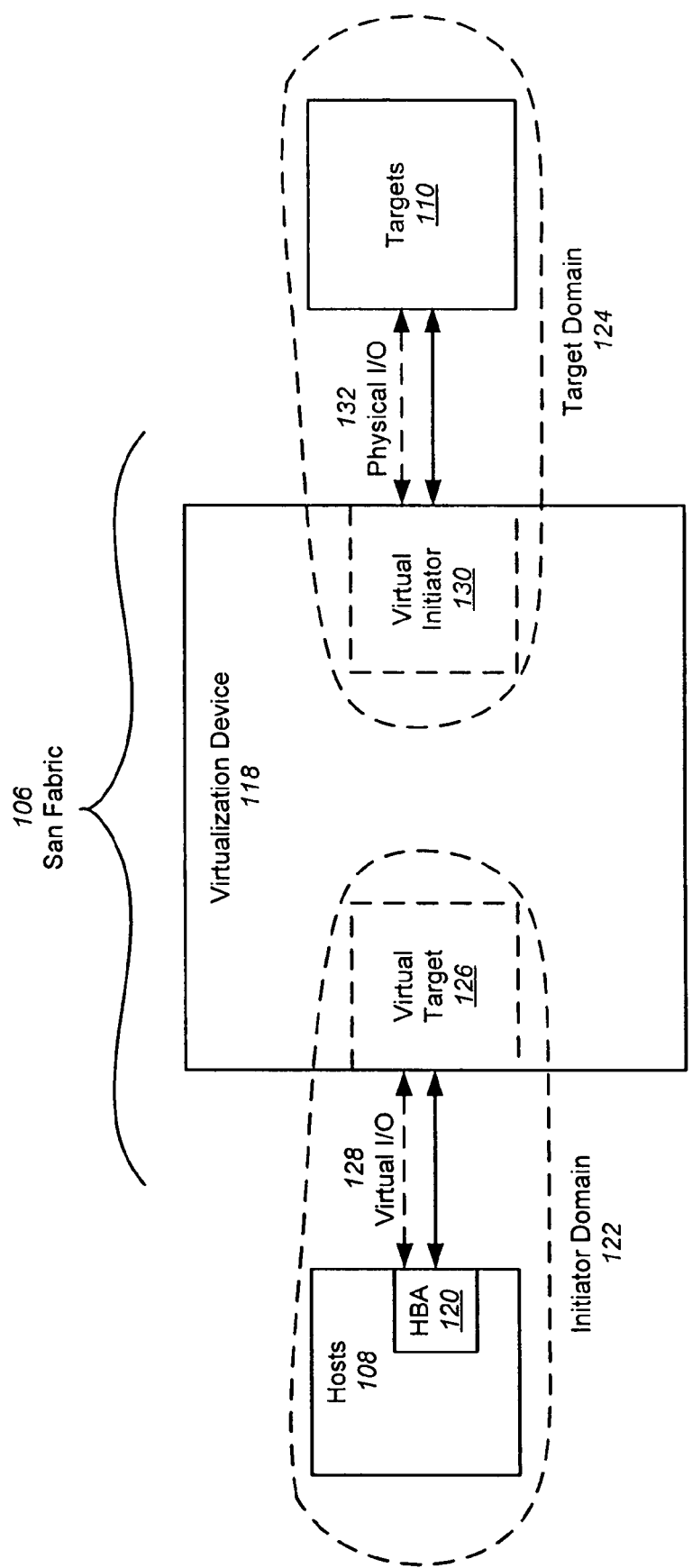
FIG. 1e illustrates an exemplary virtualization architecture from an initiator/target perspective according to embodiments of the invention.

FIG. 1e illustrates an exemplary split path architecture from an initiator/target perspective according to embodiments of the present invention. In FIG. 1e, hosts 108 and targets 110 are coupled to a SAN fabric 106, which may include switches for enabling communications between the initiators and the targets. A virtualization device or appliance 118 may be integrated within one or more of the switches, or may be external but coupled to the switch. Hosts 108 may include interface devices such as HBAs 120. The virtualization appliance 118 effectively creates an initiator domain 122 and a target domain 124.

In the initiator domain 122, hosts 108 do not see the targets directly. Instead, they see one or more virtual targets (VTs). 126 created within the virtualization appliance 118, and communicate with the VTs using virtual I/O 128. However, the VTs 126 will make it appear to the hosts 108 that they are in fact communicating directly with one or more targets. The VTs 126 may include, but are not limited to, a concatenation of multiple physical targets to form a larger-capacity. VT, a mirror of two physical targets, and other arrangements of physical targets. In the case of a VT being a mirror of two physical targets, because hosts 108 does not see targets directly, when a host writes to the VT, it will not know that it is performing a mirrored write.

In the target domain 124, targets 110 do not see the initiators directly. Instead, they see one or more virtual initiators (VIs) 130 created within the virtualization appliance 118, and communicate with the VIs using physical I/O 132.

In the split-path architecture described above, communications are split into a data path (performance path) implemented in hardware and firmware to perform wire-speed data communications, and a control path (the non-performance path) implemented in software that is primarily used during startup and during special situations (e.g. an I/O miss). The control path is needed to create the VTs and map them to specific physical targets, typically (but not always) performed during boot time. The data path is where the data actually moves. When an initiator performs an I/O operation such as a read or write transaction, the data path is utilized.

Figure 1F:
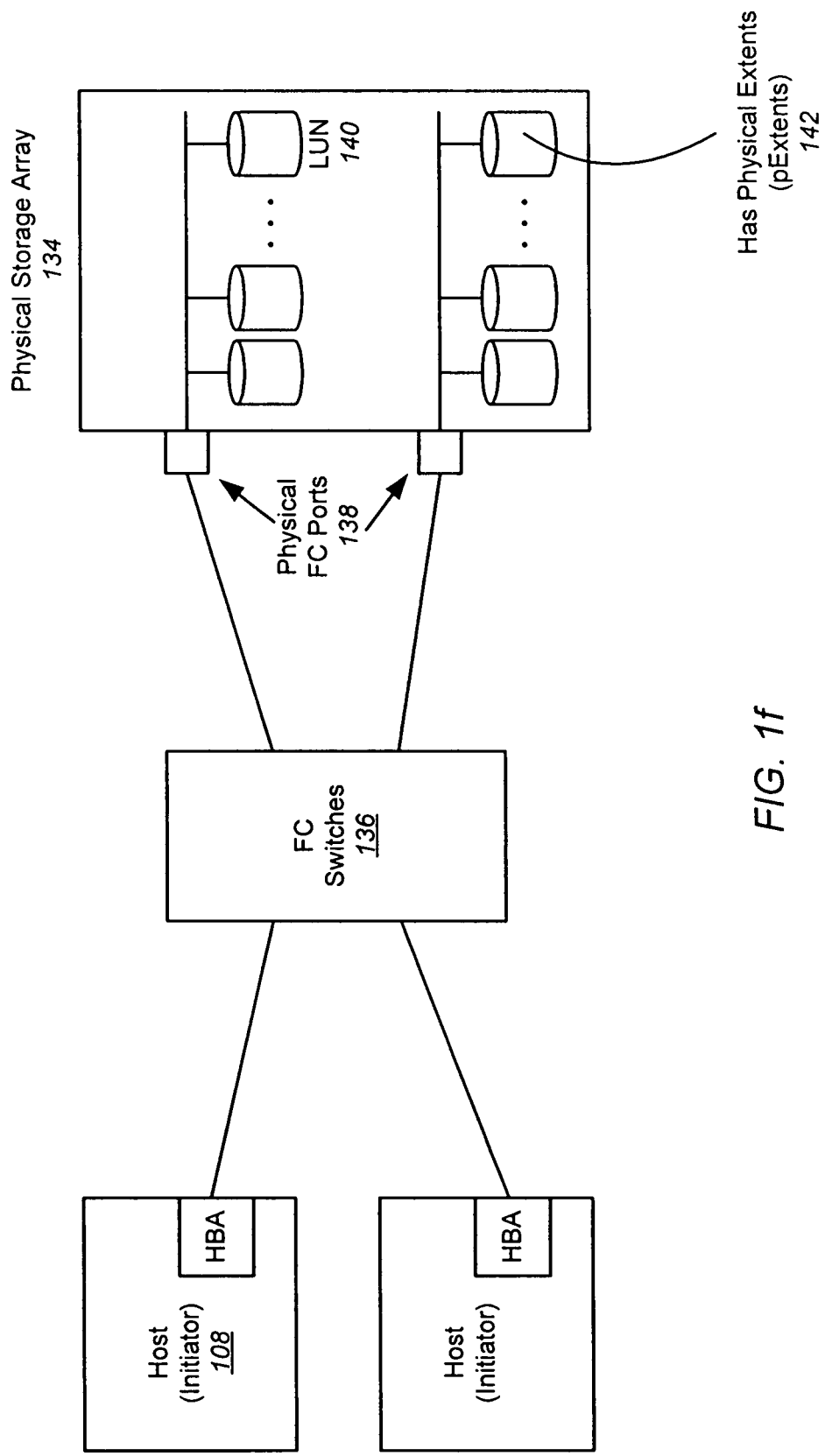
FIG. 1f illustrates an exemplary SAN from a physical domain perspective.

FIG. 1f illustrates an exemplary SAN from a physical domain perspective. In FIG. 1f, hosts (initiators) 108 and physical storage arrays 134 (containing targets) communicate over a storage area network comprised of switches 136. A physical storage array 134 may contain one or more physical ports 138 (e.g. FC ports) for connecting to the switches 136 (e.g. FC switches). Each physical port 138 provides access to a number of physical storage devices, which may be referred to as LUNs 140. Thus, in the example of FIG. 1f, if a host should login to port 138, it will see three LUNs, each corresponding to a single volume. Each LUN 140 may contain one or more physical extents (pExtents) 142, and each LUN may be mapped to one volume of a target. LUNs may be within the same physical drive or spread out among several physical drives.

Figure 1G:
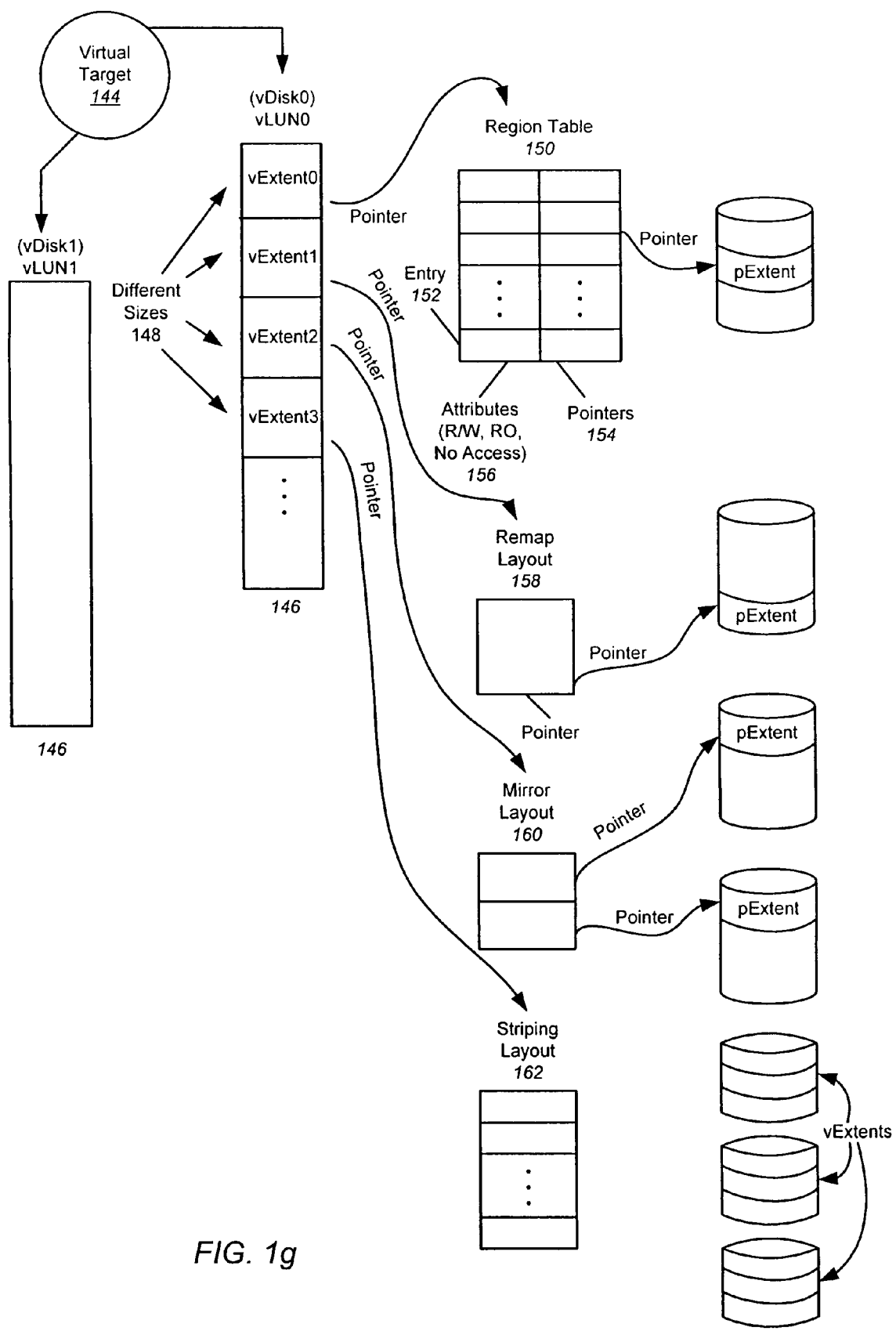
FIG. 1g illustrates an exemplary virtual target from a virtual domain perspective according to embodiments of the invention.

FIG. 1g illustrates an exemplary virtual target from a virtual domain perspective. In the virtual domain, the goal is to emulate the physical domain. For example, an initiator logging in to a virtual target should see a port and one or more LUNs, With reference to FIG. 1e, the overall concept is to map a virtual I/O to one or more physical I/O. In FIG. 1g, a virtual target (vTarget) 144 in the virtual domain is associated with one physical port in the physical domain (see FIG. 1f). Each vTarget 144 in FIG. 1g may be associated with one or more virtual LUNs (vLUNs) 146, such as vLUN0 and vLUN1 in the example of FIG. 1g. As in the physical domain, initiators will login to the virtual targets, and see one or more vLUNs.

Each vLUN 146 includes one or more virtual extents (vExtents) 148, such as vExtent0 through vExtent3 in the example of FIG. 1g. Each vExtent 148 may be of a different size. The vLUNs map I/O requests, which may span two or more vExtents, to physical I/O. Each vExtent 148 may point to a region table 150, which may contain one or more entries 152, which effectively breaks up the memory represented by the vExtent into small regions. Each entry 152 may contain a pointer 154 to a region representing a portion of a pExtent, and attributes 156 (e.g. read/write, read only, no access) for that region. In general, region tables provide finer granularity of control over the vLUN. Each pExtent may be associated with a single or multiple pLUNs. The attributes 156 control access to that region. For example, if a write command is directed to an entry 152 in the region table 150 with an attribute of read only, an I/O miss will be generated and sent to the control path for further handling.

Each vExtent 148 may alternatively be associated with a layout (see exemplary layouts 158, 160 and 162). Layout 158 is a "re-map" type layout, which points to a single pExtent and creates a mapping between the vExtent 148 and a pExtent. In a re-map layout type, the pExtent should be the same size as the memory size represented by the vExtent. Layout 160 is a "mirror" type layout, which points to two pExtents for performing a mirroring function. In a mirror layout type, each pExtent should be the same size as the memory size represented by the vExtent. The entries in a region table may also be associated with a layout. Layout 162 is a "striping" type layout, which points to two or more pExtents for performing a striping function. In a striping layout type, each pExtent is smaller than the memory size represented by the vExtent.

When a vTarget sees a virtual I/O for a virtual LUN, it looks at the logical block address (LBA) range for each vExtent. The virtual I/O could be within a vExtent or straddling multiple vExtents. The DP then walks through the tables and determines which physical volumes it needs to send the I/O.

The major functions of the CP and the DP can be implemented using a control path processor and a data path controller. The CP processor (CPP) represents the one or more processors in the CP that runs the logic of the application, manages the mapping of virtual to physical storage, and can load maps into DP for it to map I/Os automatically. The DP controller (DPC) includes the DPPs and associated memory, engines and logic, is configured by the CP, is based on mappings given it by CP, performs routine reads and writes in real time, refers exceptions back to the CP, and can move data from one physical device to another.

Figure 2:
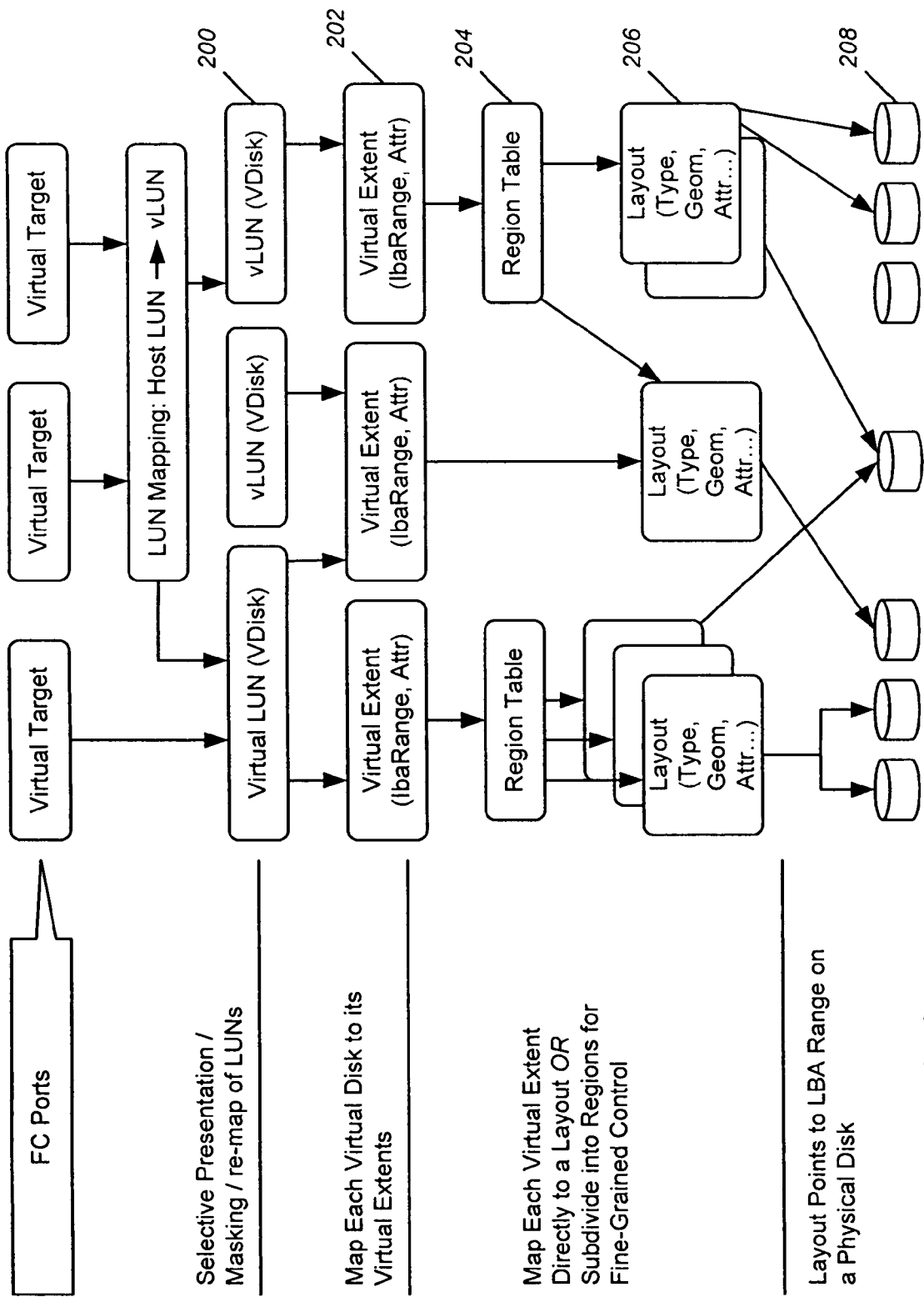
FIG. 2 illustrates an exemplary table-driven virtualization model according to embodiments of the invention.

FIG. 2 is an exemplary diagram of a table-driven Virtualization Model according to embodiments of the present invention. This implementation is one of several that could be used, and should not be taken as limiting in any way. In this aspect, the virtualization of a data storage space is enabled, such that virtual targets may be defined from among several physical targets, thus allowing the dynamic allocation and targeting of data storage functions. Accordingly, this allows a communication layer, which in turn allows the target space to be defined to the external world independently of the actual physical layout and physical devices present.

The following sections briefly describe one embodiment of a virtualization scheme, the objects that comprise and/or use the Virtualization Mapping Tables, and their relationships.

The Virtual Disk Table represents a set of virtual disks (vDisks) 200. A VDT entry in the Data Path (DP) memory has several virtual extent (vExtent) entries 202. The virtual extents of a virtual disk need not be of equal size. Also the number of virtual extents for a virtual disk is not fixed.

A virtual extent will be qualified by start addresses and end addresses (i.e. LBA—Logical Block Address, the addressable entity in block storage schemes). Since the region table is associated with the virtual extent, it is not required to divide the entire virtual disk into small regions. This allows the memory resources to be conserved.

The virtual extent entries can be stored within the VDT entry. This information could be used by the Data Path Controller (DPC) during LBA translation. The region size in the vExtent is measured in LBAs and is typically a power of two.

The region table 204 can be created and managed by the application (API client) when it requires region-level control over any virtual LBA range, such as on-line migration. A region entry has layout handle attributes (read-only/read-write/no-access), and the relative offset within the layout. In one application, a separate Region Table is created for every vExtent that uses regions.

A layout 206 may be composed of one or more physical extents. The simplest layout is one denoted $MAP_{13}$ SIMPLE, which consists of only one physical extent. In a mirroring/striping layout each physical extent represents a specific stripe, or a set of contiguous blocks of storage in a specific mirror, and/or both. If there are m mirrors and s stripes, then there are m*s physical extents in the layout. Size of a stripe=size of the virtual extent/no. of stripes. The stripe size in LBAs is uniform across the layout and in this application is a power of 2. In other applications, this need not be.

Each physical extent 208 is typically associated with a physical device, and thereby associated with a physical device address, physical Logical Unit number (LUN), and a physical block address. The sizes of vDisks, vExtents, physical disks (pDisks), and pExtents are in units of LBAs.

Figure 3A:
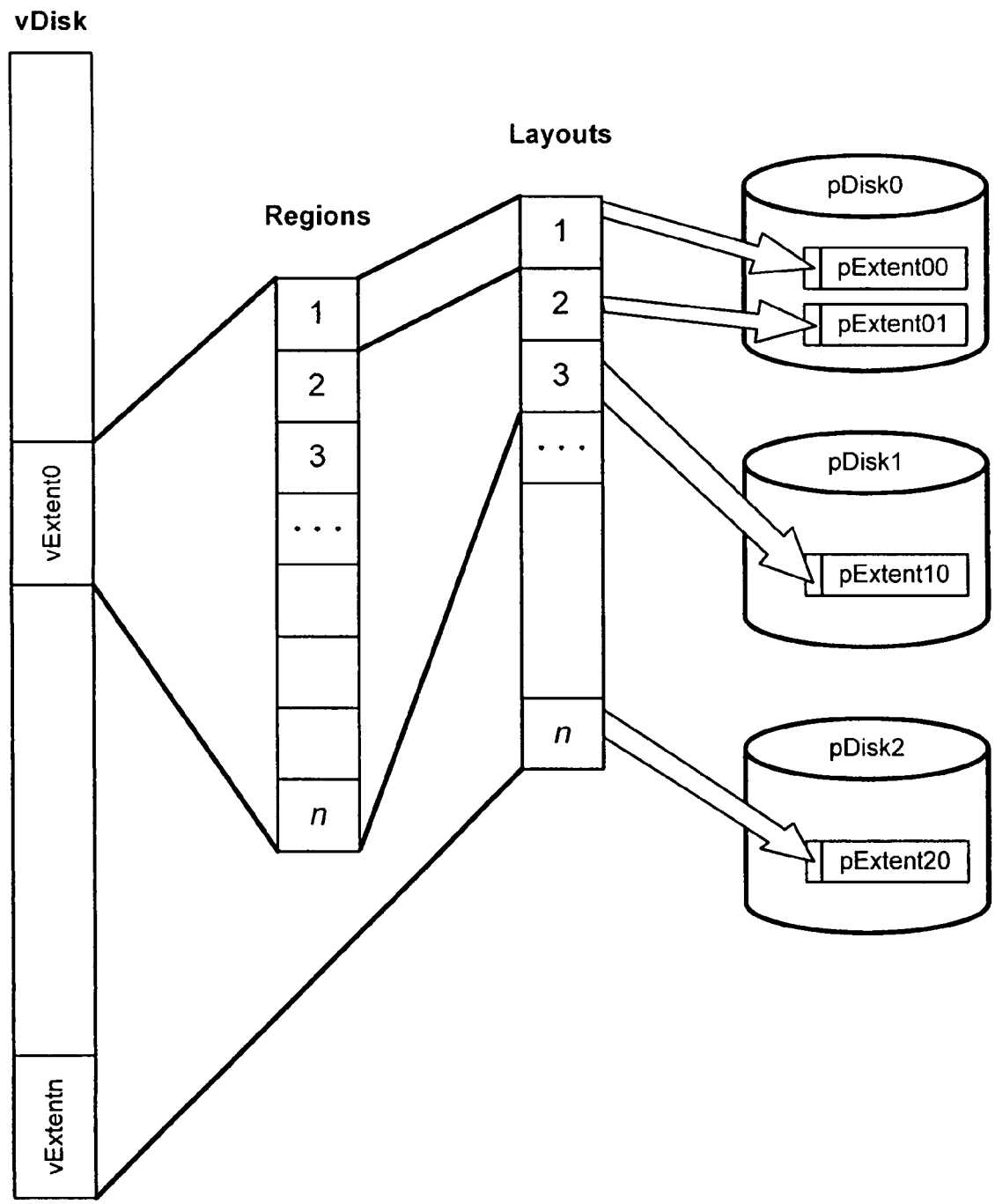
FIG. 3a illustrates an exemplary virtual disk (vDisk) to physical disk (pDisk) mapping according to embodiments of the invention.

FIG. 3a is an example of vDisk to pDisk mapping. In this example, there are three physical disks pDisk0, pDisk1, and pDisk2. vExtent0 is associated with Layouts 1, 2, and 3 through its Region Table. Layouts 1 and 2 are composed of storage represented by pExtent00 and pExtent01 respectively. Layout 3 consists of pExtent10. vExtentn does not consist of any regions and is directly associated with Layoutn which is composed of pExtent20.

Figure 3B:
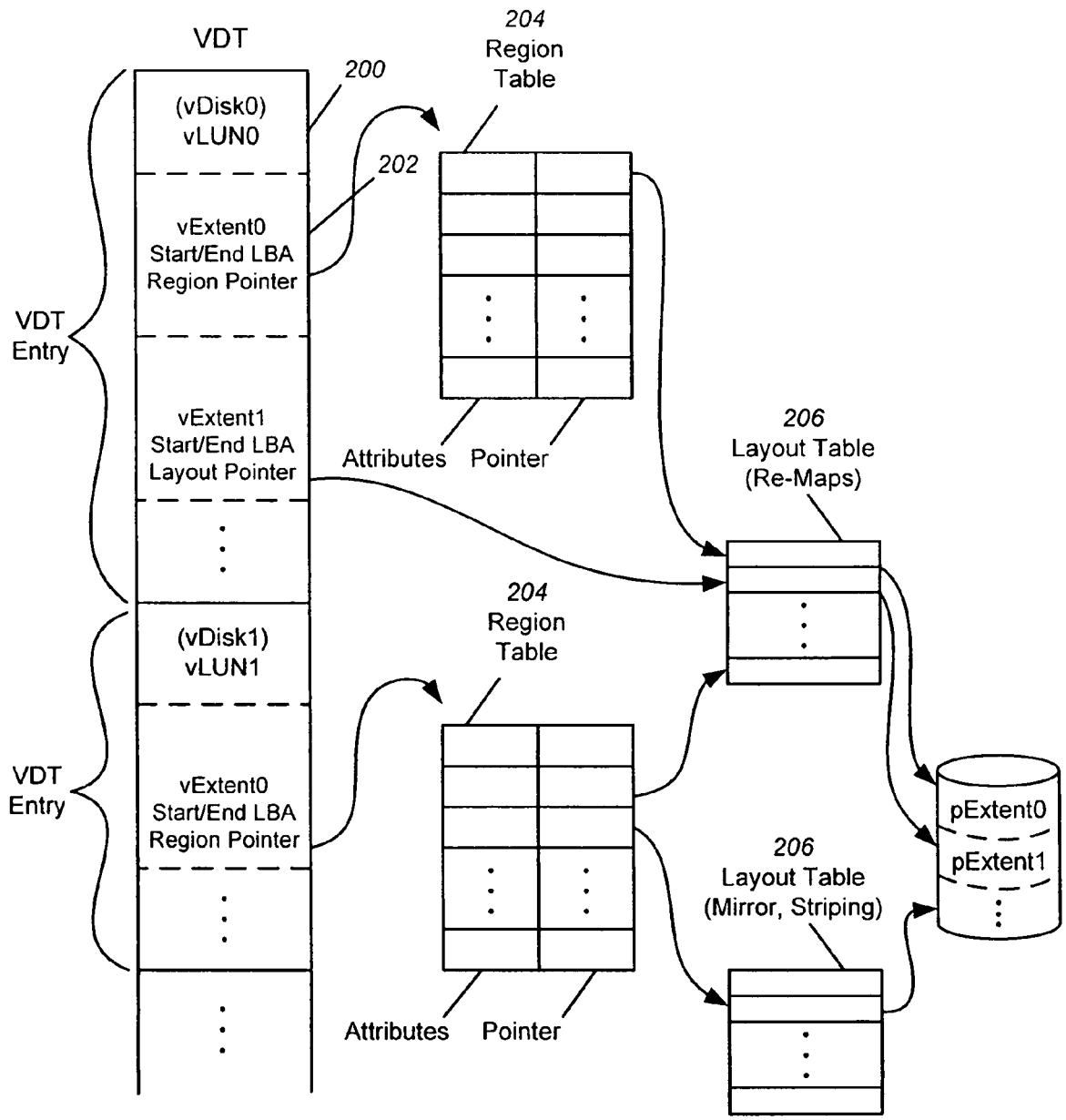
FIG. 3b illustrates an exemplary virtual disk table (VDT) having multiple VDT entries, each entry representing a virtual logical unit number (vLUN), and pointing to various region tables, layout tables, and physical extents (pExtents) according to embodiments of the invention.

FIG. 3b is an illustration of a VDT having multiple VDT entries, each entry representing a vLUN 200. Within each vLUN entry are one or more vExtent entries 202, each vExtent entry containing, among other things, LBA pointers and region table or layout table pointers. Note that all of these tables are stored in the RAM connected to the DP hardware.

In one embodiment, there are two layout tables 206, each entry in the layout tables representing a different layout. One layout table contains all of the re-map layouts, and the other layout table contains all of the mirroring and striping layouts.

Figure 4:
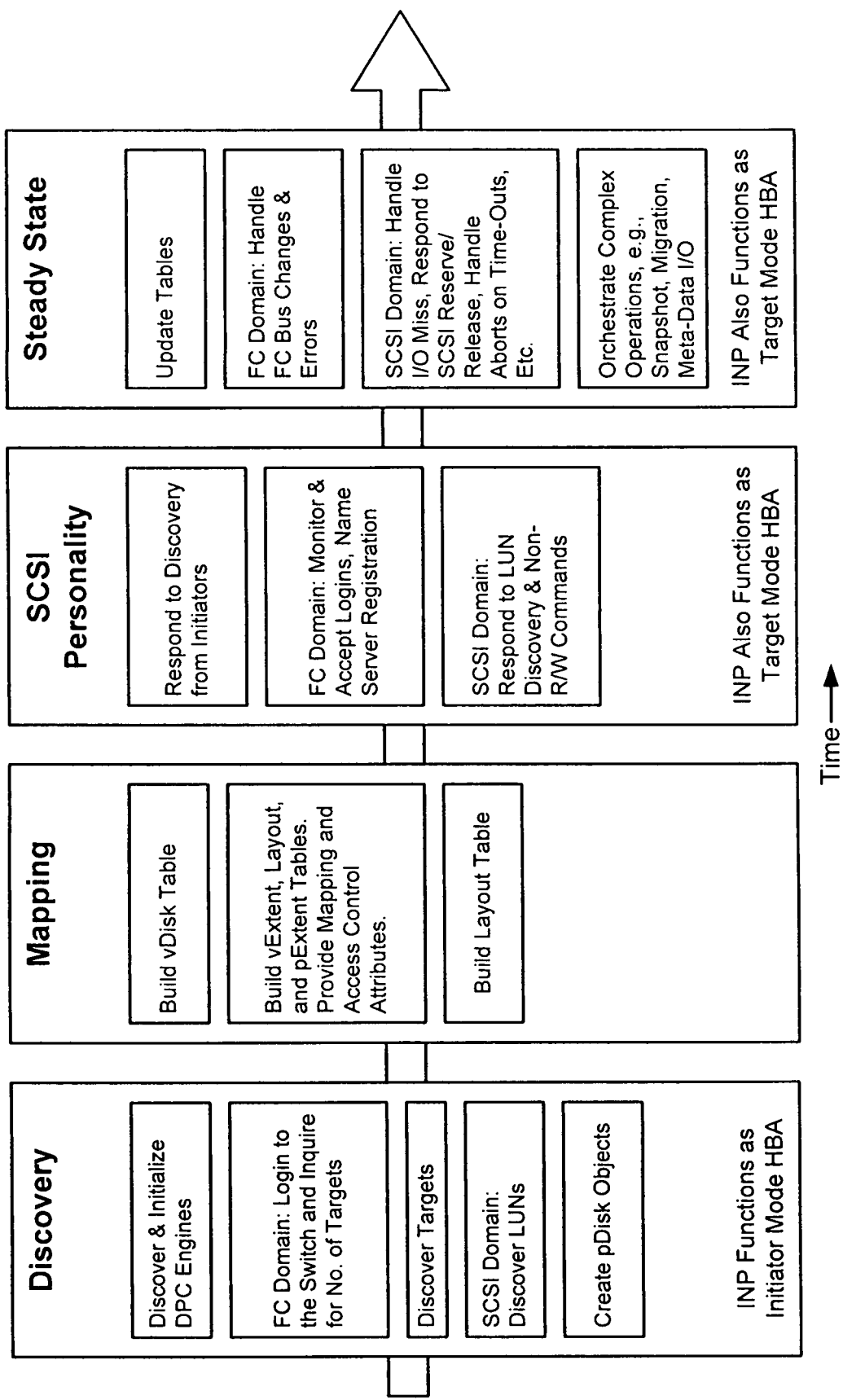
FIG. 4 illustrates an exemplary temporal flow diagram depicting the multiple phases of execution handled by the CP software according to embodiments of the invention.

FIG. 4 is a diagram of the temporal flow depicting the multiple phases of execution the CP software handles. The application program interface (API) is designed to assist CP-DP communication across all these phases of execution.

In this flow, the CP discovers physical disks in the Fabric; manages the mapping of virtual to physical storage; and presents virtual targets to Initiators. Based on mappings programmed by the CP, the DP performs reads and writes in real time and refers exceptions back to the CP. After the virtualization table is constructed the DP handles Inputs/Outputs (I/Os) as follows:

A SCSI Read/Write (R/W) I/O command from an Initiator for a vDisk configured in its tables is routed by the DP to the corresponding pDisk. Using the LBA in the command, the DP identifies the vExtent, to which the I/O belongs. The vExtent entry leads to the layout descriptor that specifies the geometry of the virtual extent and maps it to one or more physical extents. If R/W access is enabled for the vExtent, the DP forwards the I/O to the mapped physical extent(s).

In case the vExtent is sub-divided into regions, the region within which the I/O falls is identified. The Region entry leads to the Layout entry (and an offset). Using the Layout entry the DP validates access permissions for the region. If the permission is not sufficient, the I/O is faulted to the CP. Otherwise, the physical target information is picked up using the layout handle in the Layout entry and the DP generates appropriate SCSI command to the target. If the vDisk or vExtent entry is not present in the DP tables, it results in an IO MISS event notification being sent to the CP.

Figure 5:
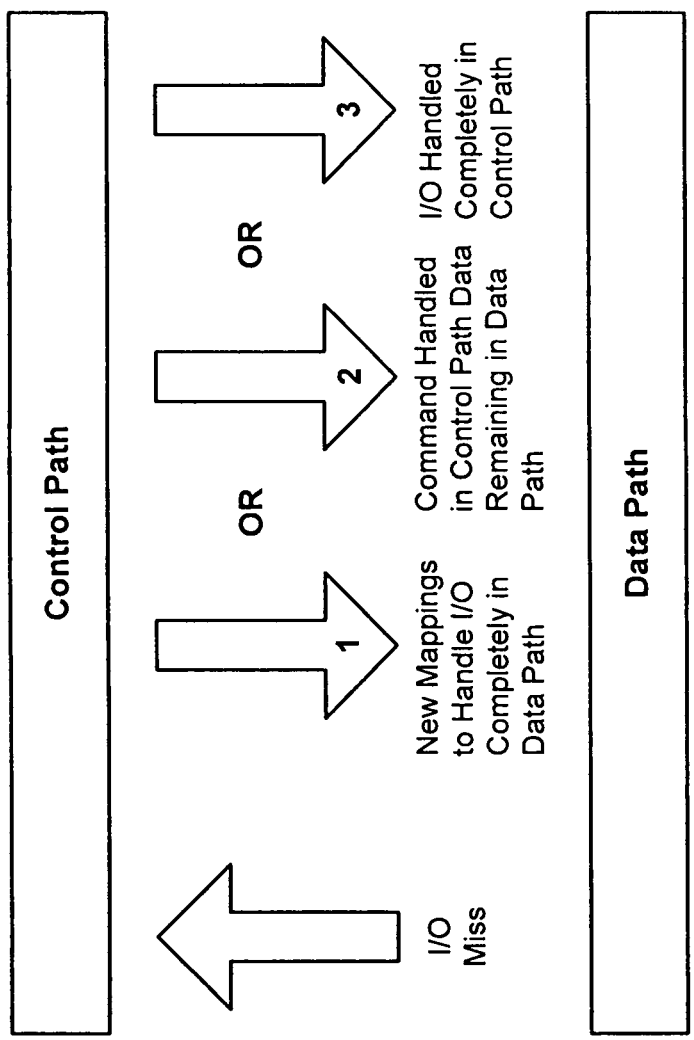
FIG. 5 illustrates exemplary communication flows between the CP and DP in case of an I/O miss according to embodiments of the invention.

FIG. 5 details the communications between the CP and DP in case of an I/O miss. It will be noted that the specific communication can be made dependent on specific operating parameters, and even on a dynamic basis.

In most cases, after the CP has set up the tables and the initiators start running I/Os, the CP no longer comes into play. However, there are some exceptions, such as an I/O miss (which occurs when a mapping table doesn't exist, or when a portion of the mapping table indicates that the target is not writable), when the CP needs to have access to those I/O requests. For example, if the CP has set up a vDisk, and is performing some special operations on that vDisk, such as a snapshot, then if a write is received for that vDisk, the CP may not want it to occur immediately, and may instead want to take control of that I/O request. To prevent the write from happening, the CP may mark certain sections of that vDisk as unwritable, so that instead of processing the I/O request the DP will send an I/O miss to the CP, and the CP can take control. The CP can then perform certain operations such as a re-mapping, and then allow the I/O to proceed.

Each of the following modes mentioned below provide powerful tools for Storage application to selectively off-load certain I/O's to fast path, and at the same time, control certain other I/O's that it needs to respond. These are classified into the following modes:

In full off-load mode, the storage application off-loads all the read/write processing to fast path. This mode provides the most superior performance, but Storage application does not have any control over the I/Os, since they are completely handled in fast path.

In partial off-load mode, the storage application performs the command lookup (from Virtual space to Physical space), and dispatches the command (as shown in FIG. 4). The rest of the SCSI phases (Transfer ready, Data, Response) are handled in fast path. This provides good performance, at the same time providing control to Storage application over how to perform Virtual to Physical mapping.

The no off-load mode is similar to standard HBA (Host Bus Adapter), where the hardware unit essentially does not perform any acceleration, but simply provides a SCSI interface to Storage applications.

Software Model

Figure 6A:
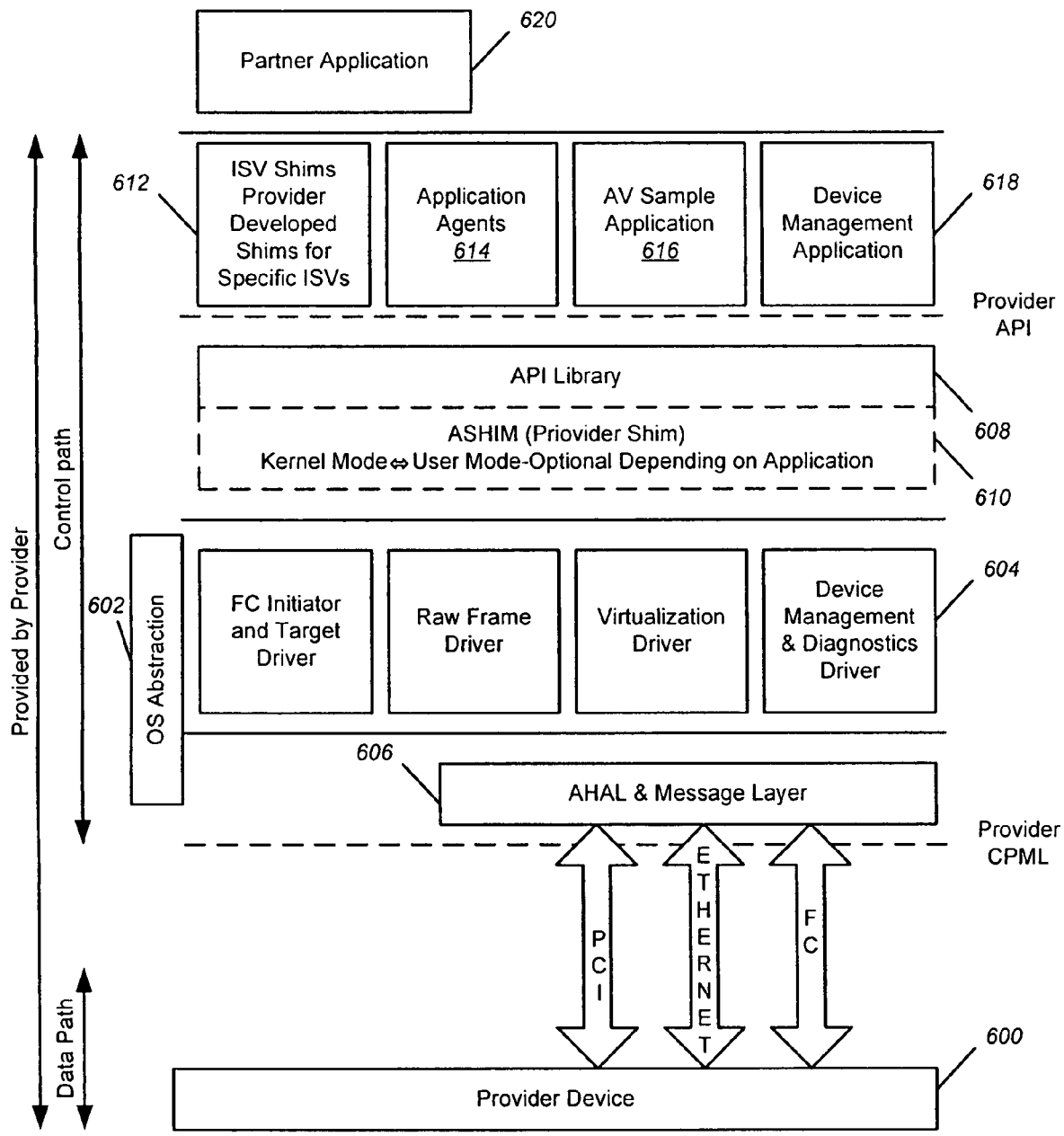
FIG. 6a illustrates an exemplary CP software layer diagram and its interaction with the DP according to embodiments of the invention.

FIG. 6a is a diagram of the application layers of the data processor and accompanying software that implements the data storage solution. FIG. 6a shows how the software is structured and how it interacts with the hardware. In FIG. 6a, the hardware and firmware of the DP are represented in the lowest block. The remainder of the blocks are in the CP.

An accelerated storage application uses one or more hardware devices 600 to implement the DP. These can be Application-Specific Integrated Circuits (ASICs) such as INPs embedded into a partner's hardware platform or fabric application controller board. The API is operable to discover both types of device and distinguish between them to provide the specific functions and usage that keys on the capabilities of each device. Further, the API provides a single, consistent interface to both.

The communications between the CP and DP are generalized. There are multiple ways that the CP can talk to the DP, based on the customer applications. The most common communication protocol is a PCIe interface. For example, the entire DP could be a PCIe form factor adapter card that plugs into a PCIe slot in a PC, while the CP runs in software in the PC (out-of-band control). In other embodiments, the CP and DP could be two separate machines, communicating over Ethernet or FC (this is referred to in-band control). In general, the CP and DP communication mechanism is done so that the physical transport is abstracted out, and the drivers are unaware of communications below, which are abstracted into a messaging layer.

The OS abstraction layer 602, which includes certain device drivers 604, is software that runs in the processor connected to the DP to perform certain functions. The OS Abstraction layer abstracts commonly used OS services such as thread services, semaphores etc. and is utilized to ease porting to other operating systems.

A Hardware Abstraction Layer (AHAL) and message layer 606 can be utilized to provide a C language interface from the CP drivers to the DP(s) through message-passing mechanisms. It has modules that determine device configuration, handle interrupts, de-multiplex messages from the hardware devices, and send messages to the devices. The AHAL can utilize the a layer such as the CPML (Control-Path Messaging Layer) to provide the transport interface between the Control Path Processor and the device(s). The CPML supports Peripheral Component Interconnect (PCI), Ethernet, and Fibre Channel (FC); The CPML provides flexibility in designing the hardware solution by making the choice of transport between the CP and the DP transparent to the software developer. The CPML is not visible to the application developer.

The driver layer includes a set of drivers. This layer exposes the API. The device drivers are kernel mode modules. The API is provided by several kernel-mode drivers. The Virtualization module provides an interface to create and maintain virtual disks on one or more DP (virtualization) engines. Each physical device in the system presents a single DP engine to user layer applications. The FC Initiator/Target Module provides Fibre Channel Initiator/Target functionality, including a frame interface for sending and receiving raw FC frames. The Device Management and Diagnostics Driver provides an interface to initialize the hardware devices, update firmware, and run diagnostic commands on the device.

The API library 608 also runs in the processor. The API library is used by the partner applications to perform tasks such as snapshots, data migration, block copy, and the like. The API provides a feature set that builds upon the capabilities of the hardware platforms. The API library is user mode. The ASHIM 610 is a layer that converts kernel mode calls to user mode. Both the OS abstraction layer and the API library are provided to the partner (owner of the virtualization device). The API library and OS abstraction layer software may be provided to the partner via disk or download.

The ISV shims 612 and other blocks at that level may be written by the partners, but some may be written, entirely or at least partially, by the provider. Some Independent Software Vendors (ISVs) have already developed their own standard interfaces for communicating with Data Path Controller (DPC) devices. In such cases it may be necessary to add an interface layer (a "shim") to translate between the API and the ISV's API.

The Application Agent layer 614 is at the same level as the ISV shims, but instead of being a mere API translation layer, this is akin to an ISV application, except that the ISV application is in two parts: an agent part that runs on the Control Path (CP) and an appliance part that runs on an ISV appliance and communicates with the agent. An application agent communicates with a remote partner application, the application agent using an ISV shim to communicate with the API library.

The AV sample application 616 is provided to show the partners how to use the API library. The Device Management Application 618 is for updating the firmware, reading from logs after crash dumps, and the like.

The partner application 620 is written with certain interfaces in mind, and is written generally so they can link with different hardware. The API libraries have their own interfaces that are exposed. The interfaces are general so that multiple partners can use the API libraries. Thus, shims are used to enable the API libraries and partner applications to communicate.

The upper two layers of FIG. 6a are applications written by the partner to perform various functions such as snapshots, data migration, etc. while maintaining performance using the API library. These applications also run in the processor. The applications are linked to the library using function calls. The API library, shims, and partner application, even though shown as separate blocks, are really one executable application.

The application agents are really two layers, as shown in FIG. 6b In FIG. 6b one option is a partner application 620 communicating with the API library 608 using an ISV shim 612.

User layer applications such as virtualization, mirroring, and snapshot are written by partners such as original equipment manufacturers (OEMs) and ISVs. The partner application communicates with the hardware device using the API or by going through the ISV shim.

The API model is based on a Request, Response, and Event model. It provides functions to create, destroy, modify, and query the virtualization objects.

This programming model section discusses how partner applications can get hooked up to the library, how they use the library, etc. Embodiments of the invention provide an API library and virtualization structure that enables the partner or storage applications to be written to perform certain functions.

The API can support both synchronous and asynchronous calling conventions for all the API functions.

The APIs may be implemented in blocking mode or non-blocking mode. Each function call takes a caller provided callback reference handle as a parameter. If this parameter is NULL, blocking mode is assumed. If it is not NULL, non-blocking mode is assumed, and in this case, a callback function must be registered by the CP application to receive completion of the requested operation.

The programming is done in the CP. In the CP, programming interfaces and libraries are provided, and customers can write code that sits on top and links to the libraries. The customer code performs storage applications such as snapshots and online data migration. For example, a customer might develop an application that uses the APIs, and implements a number of special functions. The programming model describes how this is achieved.

The API can provide kernel mode and user mode interfaces to applications. While the API functions and calls are the same in user mode and kernel mode with exceptions in event handler registration APIs, there are some procedural differences for the developer in linking and building a kernel resident application.

The API can be made available in user mode via a shared-object API Library, while there is no API library in kernel mode. Kernel-mode APIs are exposed by the kernel-resident drivers and an application using these will have to reside in kernel and follow appropriate kernel programming considerations.

It is possible for hardware to be connected to multiple Fabrics, which could have overlapping FC addresses. The hardware can support this by including the port numbers in the hashing function (for pre-fetching LPB entry during Command processing). Hence, if there are two or more remote ports that are reachable through different local ports (connected to different Fabrics), and happen to acquire same FC_Address, they will have a unique entry. This could be accomplished with such items as a hash entry.

High Availability Techniques

As discussed, in the split path architecture, both CP and DP may run in the same computer, or different computers. If different computers are used, there is a high availability (HA) model where there can be more than one CP. If one CP goes down, the other can take over. Another type of failure is when the communication path between the CP and DP goes down. Even though the CPs and DPs themselves are functional, the lack of a communication path makes it equivalent to one of them being broken.

Figure 7A:
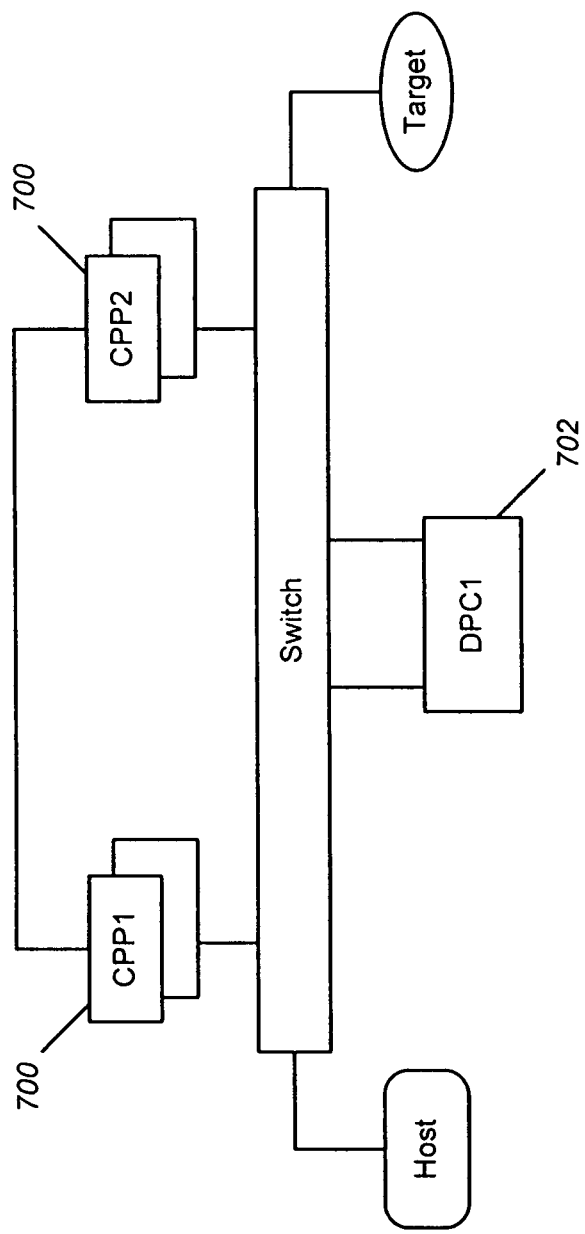
FIG. 7a illustrates an exemplary configuration using multiple CPs for high availability applications according to embodiments of the invention.

FIG. 7a is a diagram detailing the usage of multiple CPPs 700. In this case they are controlling a DPC 702. Two CPs could be controlling one or more DP, as shown in FIG. 7a. For example, if there are four DP and two CP, and each CP manages two DPs, then if one of the CPs goes down, then the other CP manages all four DPs. This configuration applicable to a switch domain, when the CPs and DPs are separate entities.

The other model is where there is a single CP and multiple DP engines, which is applicable to an appliance domain (single computer). If one of the cards (DPs) goes down, the CP can transfer the information to the other DP.

Both of these embodiments can operate in two different modes. One mode is active-active failover mode. In this mode, in the example of four DPs and two CPs, then all four of them are active, managing some storage. If one of the DPs goes down, the information will be transferred to the other DP.

The software supports Active-Active CPP (Control Path Processor) configuration. In this configuration, it enables multiple CPPs to control one Data Path controller (DPC), with one or more than one application running on each CPP.

The active-active configuration supports more than one CPP to control a single hardware device or (DPC). It is possible for each CPP to create, manipulate or destroy objects independently.

A single CPP that created the object is the default owner of the object. APIs are provided to change the ownership of these objects (in case of fail over).

Certain types of events are buffered by DPC until an acknowledgement (ack) is received from CPP. If the ack is not received by DPC (such as when a CPP goes down without sending the ack, or the event/ack is lost), an event is sent to another CPP (after the object ownership is changed).

In the second mode, active failover mode, the other DP is just a backup, sitting idle until needed. One DP engine creates the virtual volumes and handles the I/Os, and the other engine is on standby. When the active engine fails, the standby takes over in a seamless way so that the initiators and targets do not know there was a problem.

HA in general, and the modes described above, are not unique. What is unique is providing the hooks needed to allow the CP or DP to transfer all of its meta-data (i.e. tables, etc.) to the other CP or DP (to the other fail over device). These "hooks" are the interfaces to the APIs that allow partner applications to use them to perform failover. The invention also allows a certain time for the CPs to get connected back to DPs. If this time expires, a self-destruct mode is entered where the DP stops virtualizing, to avoid data to be sent to the wrong places without the application knowing about it. Thus, the complete functionality to perform failover may be in the firmware of the DP, as well as in the CP.

The following paragraphs describe the detailed design for supporting multiple CPPs controlling a single DPC, with each CPP controlling a subset of objects on the DPC. This is an active-active configuration as opposed to an active-passive configuration that is supported in the current architecture.

Embodiments of the invention support configuration of various storage virtualization objects & generation of events related to these objects. But only one CPP and one application in CPP can control these objects. There is support for more than one application in CPP, but only one application can configure objects (typically, this is the application providing volume manager functionality). Events can be received by multiple applications and there is a mechanism for registering the events from each application.

The following paragraphs explore the low level changes required to allow multiple CPPs to control one DPC, with one or more than one application running on each CPP. The following are the objectives of this change: It should be possible to support more than one CPP to control a single DPC. It should be possible for each CPP to create, manipulate or destroy objects independently. A CPP that creates an object is the owner of that object. APIs should be provided to change the ownership of objects (e.g. in case of failover).

Certain types of events should be buffered by DPC until an acknowledgement is received from CPP. If the ACK is not received by DPC (such as when a CPP goes down without sending the ACK, or the event/ACK is lost), the event should be sent to another CPP (after the object ownership is changed). Existing API's should remain unchanged as much as possible, with additional functionalities supported by new API's.

FIG. 7a illustrates a simple SAN configuration (many-to-many) with two CPPs and two DPCs. It is possible for one of the CPPs to control both of the DPCs, or both of the CPPs to control one DPC at any instant of time. Each CPP entity is uniquely identified by the DPC using a handle referred to as $cpp_{13}$ id_t. This handle is assigned by the DPC when a CPP connects to the DPC for the first time, and it is unique for each CPP within the context of a single DPC. It is transparent to most of the modules. Since DPC internally maintains an association of the "connection-id" of the CPP with its cpp_id, all messages received over a specific connection are from the corresponding CPP.

The architecture may comprise several virtualization objects. A Virtual Local Port (VLP) object can be created as either Initiator or Target instance (VIP or VTP). Hence it is owned by the creator CPP (implicitly), or the ownership changed (explicitly) in case of failover/failback. The events related to this instance of the VLP are sent to the current owner of this object. Note that a single physical port event may result in multiple VLP events. A Local Port object is owned by the caller of av_fc_start( ), i.e. the CPP that initializes the port. The ownership of a local port can be changed either by using the new APIs or by re-initializing the port (i.e. by calling av_fc_star( ) again by another CPP). In the architecture, a remote port object is associated with a local port (through which the remote port is seen). These objects are not explicitly created by any CPP, and hence they do not have an explicit ownership. All the remote port events are associated with a local port (since they are received through one of the local ports), and are sent to the owner CPP of the local port.

With regard to pDisk/pLUN objects, each pDisk is owned by the creator CPP (implicitly), or the ownership can be changed to another CPP (explicitly), in case of failover/failback. All the events related to a pDisk (SCSI errors/failures) are sent to the corresponding pDisk owner. It is possible that multiple DPCs may utilize the pDisk object (to create vLUN objects), but it is owned by only one CPP, and hence the associated failure events are sent to one CPP.

With regard to vDisk/vLUN objects, each vDisk is owned by the creator CPP (implicitly), or the ownership can be changed to another CPP (explicitly), in case of failover/failback. So the associated events are sent to the current owner CPP. With regard to hLUN objects, each hLUN entry points to a single vDisk entry. Hence, the ownership is implicitly determined by the ownership of the vDisk object.

Each of these objects will have an associated owner (of the type cpp_id_t), which is the ID of the CPP entity that created it. There will be methods (additional APIs) to change the ownership. Since each object is owned by a CPP, any event associated to a particular object is sent to the object's owner. Before dispatching an event, the object's owner is determined, and the event is sent to that CPP. For the reliable events, DPC requires acknowledgement from the receiver CPP. Therefore the event will be queued until, either its acknowledgement is received or the associated object is deleted.

In case of a CPP failure, the DPC waits for a specific time period to allow another CPP to take control of the objects (owned by the dead CPP) explicitly. During this interval, the objects owned by the failed CPP are still active, and the events related to these objects are queued (except those that do not require acknowledgement, which are dropped). The I/Os continue to be handled in the fast path during this period. If the fail over does not happen within the stipulated time, the DPC removes the corresponding objects and aborts the I/Os pertaining to those objects.

As of now, there are two media a CPP can use to connect to a DPC, either FCP or Ethernet. In case of FCP, once port login completes, a corresponding LPB entry is generated and preserved in SP. In case of Ethernet, once the socket is connected, the DPC socket descriptor acts as the unique identifier of the connection. Once the connection is complete for a CPP, a new entry is added into the aCppDB[ ] array that maintains the LPB entry or the socket descriptor (connection-id) of the active CPP. The index of the array is used as the CPP identifier (cpp_id_t).

Each of the virtualization objects has an associated owner (of the type cpp_id_t). Both of vDisk_t and pDiskInfo_t structures are having one byte reserved field that is used to maintain the CPP identifier. In case of local port, the cpp_id is kept inside the fc4_port_t structure.

Figure 7B:
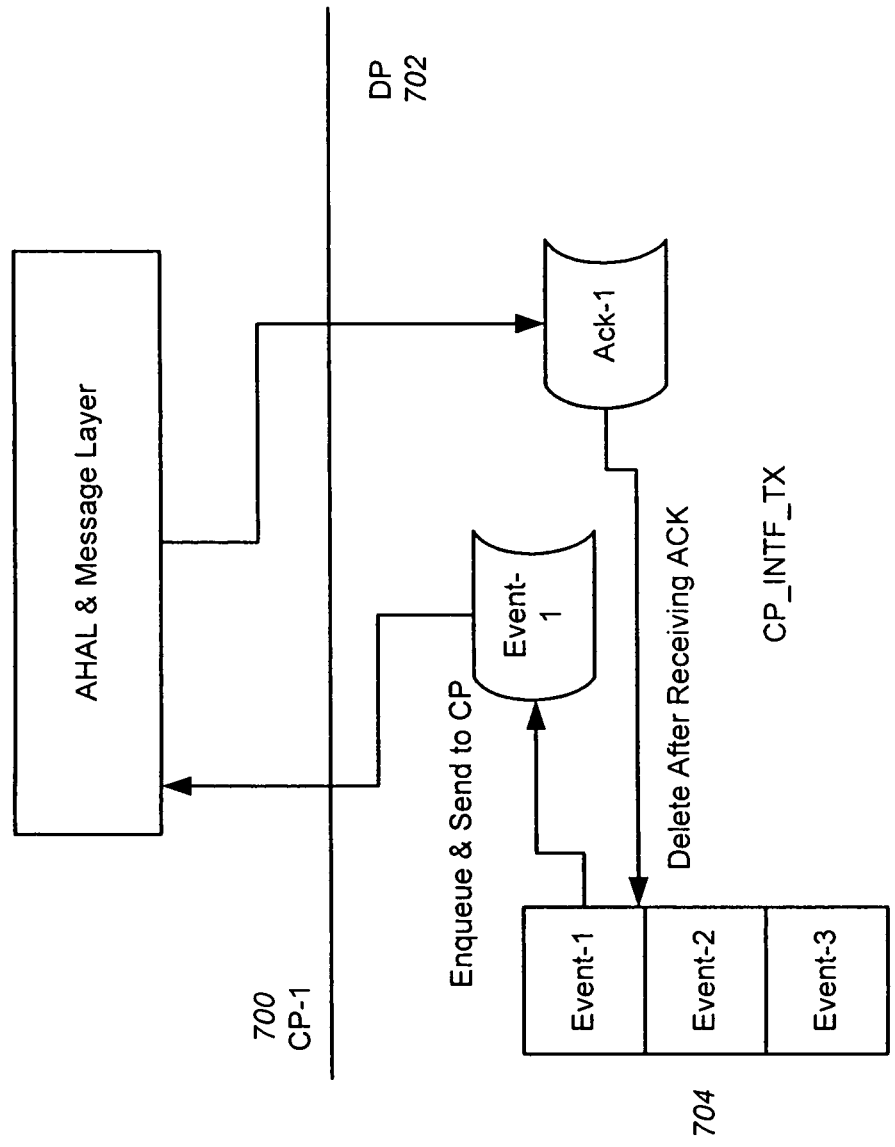
FIG. 7b illustrates exemplary communications between the CP and DP for performing reliable event handling according to embodiments of the invention.

FIG. 7b is an illustration of reliable event handling. The DPC 702 provides notice of any asynchronous events (such as back-end errors, I/O faults) to the CPP 700 via events 704. The following is the list of events that can be received by CPP during its runtime: (1) IO Miss (No ACK required); (2) Non-RW command (No ACK required); (3) TMF (Currently, viHandleCmd( ) passes control to viEventNonRwCmd( ) to handle Non-RW as well as TMF events—need to separate them so that based on the opcode, only TMF events can be queued); (4) PIO Errors; (5) VIO Errors; (6) Path Down; (7) RSCN; and (8) LogIn/LogOut.

Each of the events is associated with a table object. Since each object is owned by a CPP, the event should be sent to the object's owner. Before dispatching an event, the object's owner CPP is determined, and the event is sent to that CPP. Most of the listed events are required to be handled properly by a CPP to resume DPC normal functionality. For these events, DPC requires acknowledgement from the receiver CPP. The event will be queued until, either its ACK is received or the associated object is deleted.

There is a dedicated task (REL_EVENT) to handle Enqueue/Dequeue/Flush/Hold/Replay of events. There need to be 'n' number of queues (indexed by cpp_id_t) if there are 'n' number of CPPs. If one CPP goes down, another active CPP is supposed to notice it (through the heartbeat mechanism, implemented by the SA) and come forward to adopt the 'orphan' objects within the failover period. The pending events (waiting to be ack-ed) are re-played to the new owner CPP. SP passes the 'event handle' along with the event to CP and CP is supposed to send the event handle back with the ACK. Any reliable event will not be removed from the queue until one of the CPPs acknowledges the receipt of it.

Some events are classified as not requiring an ACK (e.g. EVENT_IO_MISS). These events are not queued by DPC but instead discarded as soon as it is sent to a CPP.

For certain reliable events (e.g., SCSI_ERROR), it is possible that the host IO (VIO) may timeout, before the event is acknowledged from CPP (especially in case of CPP Failure, so another CPP can take over). In such cases, the abort mechanism simply frees the exchanges related to the VIO & corresponding PIO(s). Note that it is not required to dequeue the event from the wait queue, since it will eventually be removed (either after receiving Ack from another CPP, or FAILOVER_TO timer expiry).

There can be some events (E.g. IO_MISS events can be sent directly from FP to gain in performance, to be supported in future) that are sent from FP (in case of in-band control path). These cannot be reliable events as they are directly dispatched from FP.

Figure 7C:
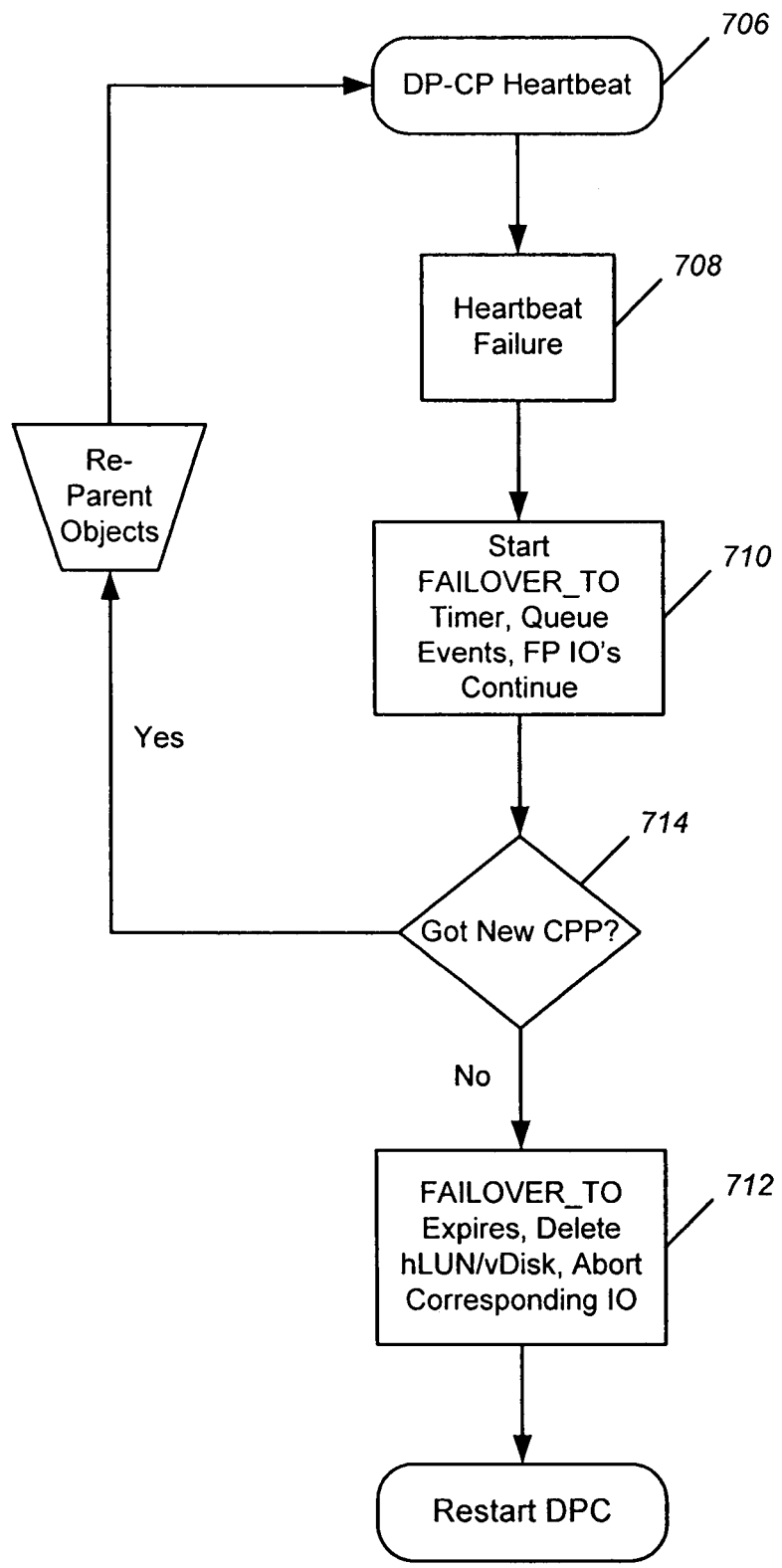
FIG. 7c illustrates an exemplary flowchart for implementing CP failover according to embodiments of the invention.

FIG. 7c is a flowchart of CPP failover. Each DPC maintains a heartbeat 706 with each CPP that is connected to it. In case of a CPP failure 708 (or the communication path failure with CPP, which results in same action on DPC as a CPP failure), the DPC starts another timeout 710 (called FAILOVER_TO, which is a configurable parameter (Should be in seconds, more than the heartbeat timeout.) and waits for a new CPP to take control of the objects, created by the old CPP, explicitly (see 714). The MQX timer is used for this purpose. It should be possible to tweak the CP-DP heartbeat implementation to include the FAILOVER_TO time as part of the heartbeat timeout.

During this interval, the objects owned by the failed CPP are still active, and the events related to these objects are queued (except those that do not require acknowledgement, which are dropped). Events like IO_MISS are not queued. Any pending DPIO on the CPP fails anyway as there is no communication between CPP and DPC. The IOs continue to be handled in the fast path during this period. The event queuing mechanism can hold only a specified number of events, after that it starts dropping them.

If the fail over does not happen within the FAILOVER_TO period, the DPC removes the object like hLUN or vDisk, and aborts the IOs pertaining to them (see 712). Note that the other objects that were created/owned by the failed CPP (e.g. VLP, local port or pDisk) are not removed, since they may be used by other objects on other active CPPs.

The DPC does not inform about the failed CPP to other CPPs, as SAs are assumed to have a heart-beat mechanism in place. The I/Os received on the removed objects or the related events are simply discarded.

If the DPC loses heartbeat with the last CPP connected to it, it waits for the FAILOVER_TO period for a CPP to come up and connect. If that does not happen, it restarts itself, discarding all its state & mapping tables. All the pending events from the corresponding queues are flushed and spBoardReset( ) is called.

The system can support multiple types of firmware and driver upgrades for the underlying hardware:

Normal code upgrades: The device being upgraded needs to be brought down, the code loaded, and the system restarted. This is true for either CPP or DPC upgrade. It is possible that the system configuration has multiple devices (CPPs & DPCs), which can be upgraded in a rolling fashion. This requires that the Data Path Processor (DPP) and DPC maintain some level of compatibility, even across releases.

Non-disruptive upgrades: The device that is being upgraded does not need to be brought down, and the IO operations can continue uninterrupted, while the software is being upgraded and restarted. This is accomplished by loading the fast path firmware in pairs, so that at any time only one pair is non-functional. The Support Path (SP) firmware (since there is only a single processor) will perform a warm-restart, after loading the new image.

When a firmware upgrade is received over the SAN fabric, it is desired to not have the system go down (stoppage of traffic) during the upgrade. Embodiments of the present invention provide for firmware upgrades in the virtualization space. Some of the processors are kept active while upgrading the firmware on others, so that at any point there is a processor active. For example, when upgrading the firmware in the DP, some of the processors in the APEX core can be taken down for firmware upgrades while others continue to operate on the old firmware.

Driver upgrades, on the other hand, cannot be performed in this manner. To ensure no loss of operation, two CPs are needed, and one CP would have to take control over all DPs while the other CP is taken down for a driver upgrade.

The system can provide for the ability to enable any-to-any relationship between CP and DP entities. One CP can control one or more DP entities, and each DP entity can in turn be controlled by one or more CP entities. This provides a rich set of high-availability features at a system-level.

Virtualization Services

Simple LBA Remap.

Figure 8A:
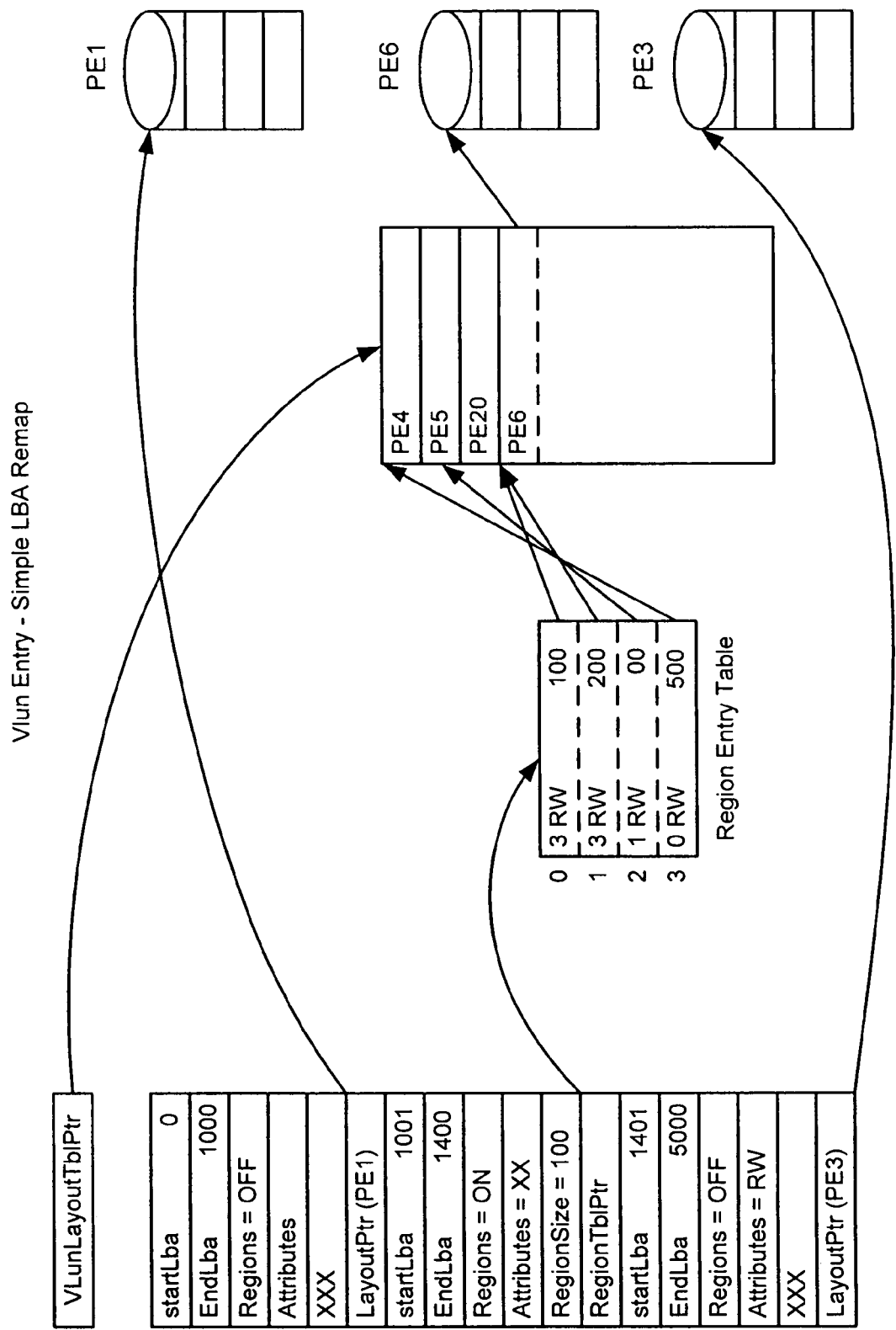
FIG. 8a illustrates the performance of an exemplary simple logical block address (LBA) mapping using table-driven lookups according to embodiments of the invention.

FIG. 8a illustrates how a simple LBA mapping is performed using table-driven lookups.

In a simple LBA remap, one virtual target is instantiated and associated with one physical target in a one-to-one map. vLUNs are created and mapped to equal sized pLUNs. What occurs in the process is the remapping of the LBA offsets in the vExtents.

Figure 8B:
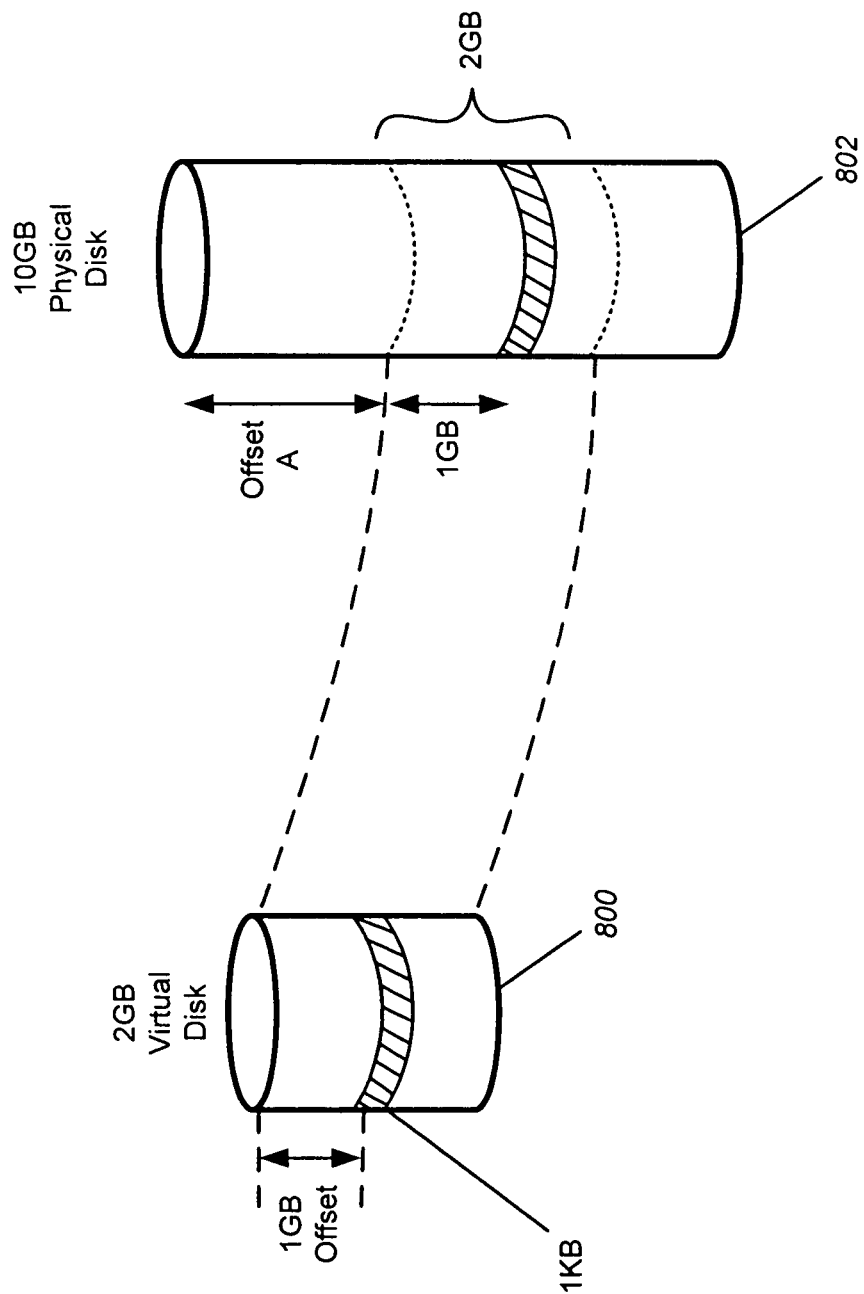
FIG. 8b illustrates an how an exemplary 2 GB of virtual storage is remapped to 1 OGB of physical storage according to embodiments of the invention.

FIG. 8b illustrates how 2 GB of virtual storage 800 is remapped to a much larger physical storage (10 GB) 802. If an I/O request is received for 1 kB of data with a 1 GB offset, for example, the virtualization appliance will send a request to the physical storage, but the physical device will not get a 1 GB offset, it will actually be an offset of 1 GB plus A. This offset is computed and applied to the physical device.

Mirroring.

The system can also support synchronous mirroring with local mirrors and/or remote mirroring with a journal disk. In mirroring, a single virtual disk maps to two physical disks.

Figure 9:
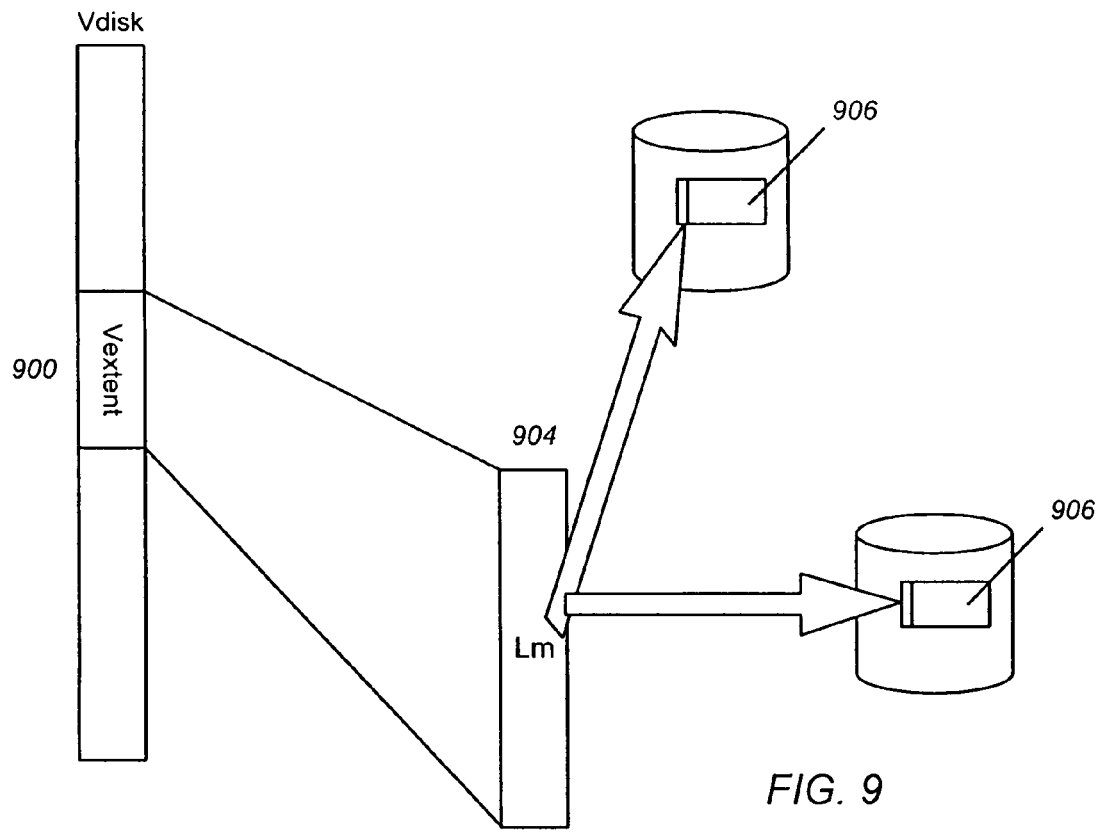
FIG. 9 illustrates an exemplary mirroring operation according to embodiments of the invention.

FIG. 9 illustrates the operation of mirroring in the system and the support for synchronous mirroring with local mirrors and/or remote mirroring with a journal disk. To create an empty mirrored volume with the system, the following steps may be performed: (1) Create a vDisk 900; (2) For each vExtent 902 in the vDisk, create a mirrored layout 904 for the vExtent, add pExtents 906 to the layout; and (3) set layout pointer for this vExtent.

Figure 10:
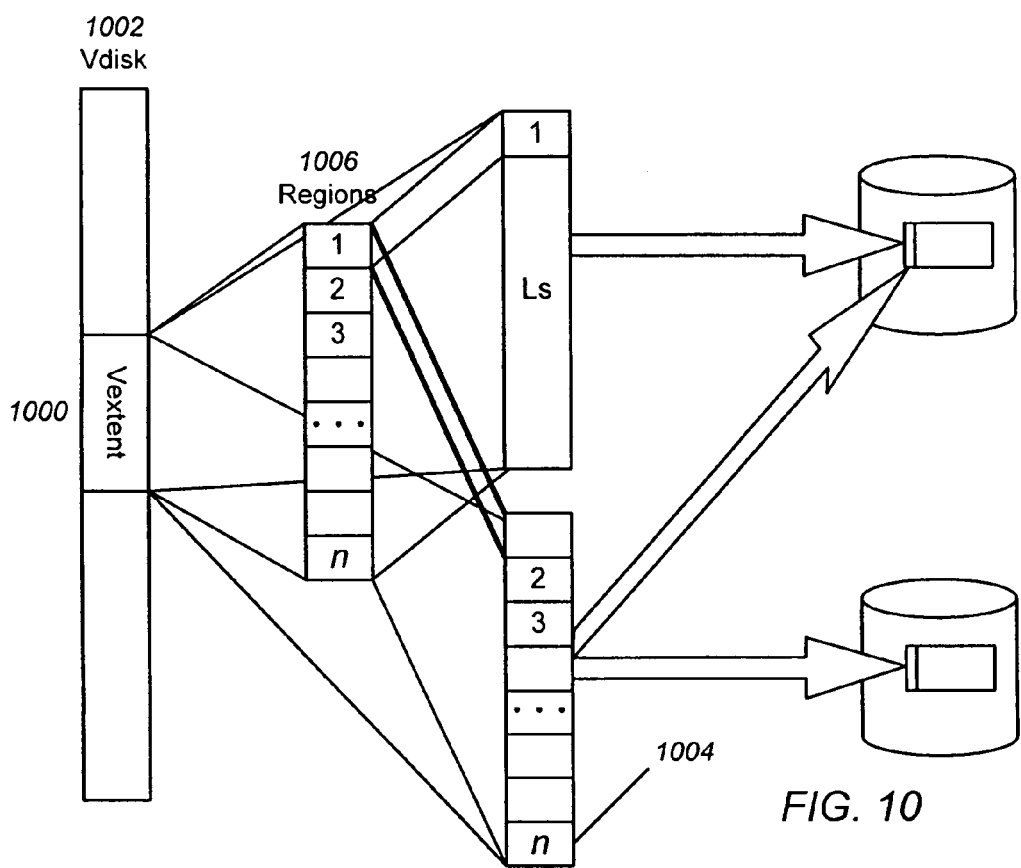
FIG. 10 illustrates an exemplary simple-to-mirrored relayout according to embodiments of the invention.

FIG. 10 depicts further operations with mirroring in the system. The steps depicted in FIG. 10 for each vExtent 1000 in vDisk 1002, where vExtent points to Ls at start, include: (1) Create mirrored layout Lm 1004; (2) Populate mirrored layout Lm; (3) Create regions 1006; (4) For each region in vExtent, (i) set region to "Read Only", (ii) issue block copy, (iii) set region to point to Lm and restore "R/W Access", and (iv) retry any I/Os that were held; (5) Map vExtent to Lm (R/W) and remove regions; and (6) Purge old layout Ls. Note that relayout as shown in FIG. 10 is similar to online migration, discussed below and shown in FIG. 15.

Block Copy.

A block copy operation is used by storage management software during data migration, snap-shot and many other applications. The slow path (SP) initiates a block copy by sending the read command to the target from which a block of data needs to be moved or copied and a write command to the target into which the data needs to be written. After SP's initiation of this operation, FP will then complete the I/O(s) and send the status of the operation to SP. The Slow Path creates two fibre channel exchanges, one with the read disk and another to write disk to send read and write commands respectively. These two exchanges/commands are managed by the fast path until the required data is moved from the read-disk to the write-disk. On receiving the good status (from both devices), FP sends a message to SP, informing it about the completion status of block copy I/O.

Block copy copies data from one physical disk to another physical disk without involving the host software, in an efficient way, at wire speed, in HW. This is typically used for data migration or snapshots, when data is copied from one disk to another disk. The block copy function is called as part of that migration or snapshot process.

Consider a write request during snapshot, where $V_{org}$—vDisk (original), the vDisk that is being snapshot, and $V_{snap}$—The vDisk that represents the snapshot. Suppose there is a write request to a $V_{org}$, and that portion of existing data is not yet copied ('snapshot') onto $V_{snap}$. The write faults to the CP, as the access attribute for that data range would be read-only in the Region entry of $V_{org}$. CP copies the existing data from $V_{org}$ to $V_{snap}$ first. This is done by initiating a block copy, which starts two IOs—a read IO and a write IO (in the most simple cases). The DP performs this operation without any CP intervention by tying these IOs together. After completion of these IOs, the CP changes the attribute of data range to read-write and issues a virtual IO.

Figure 11:
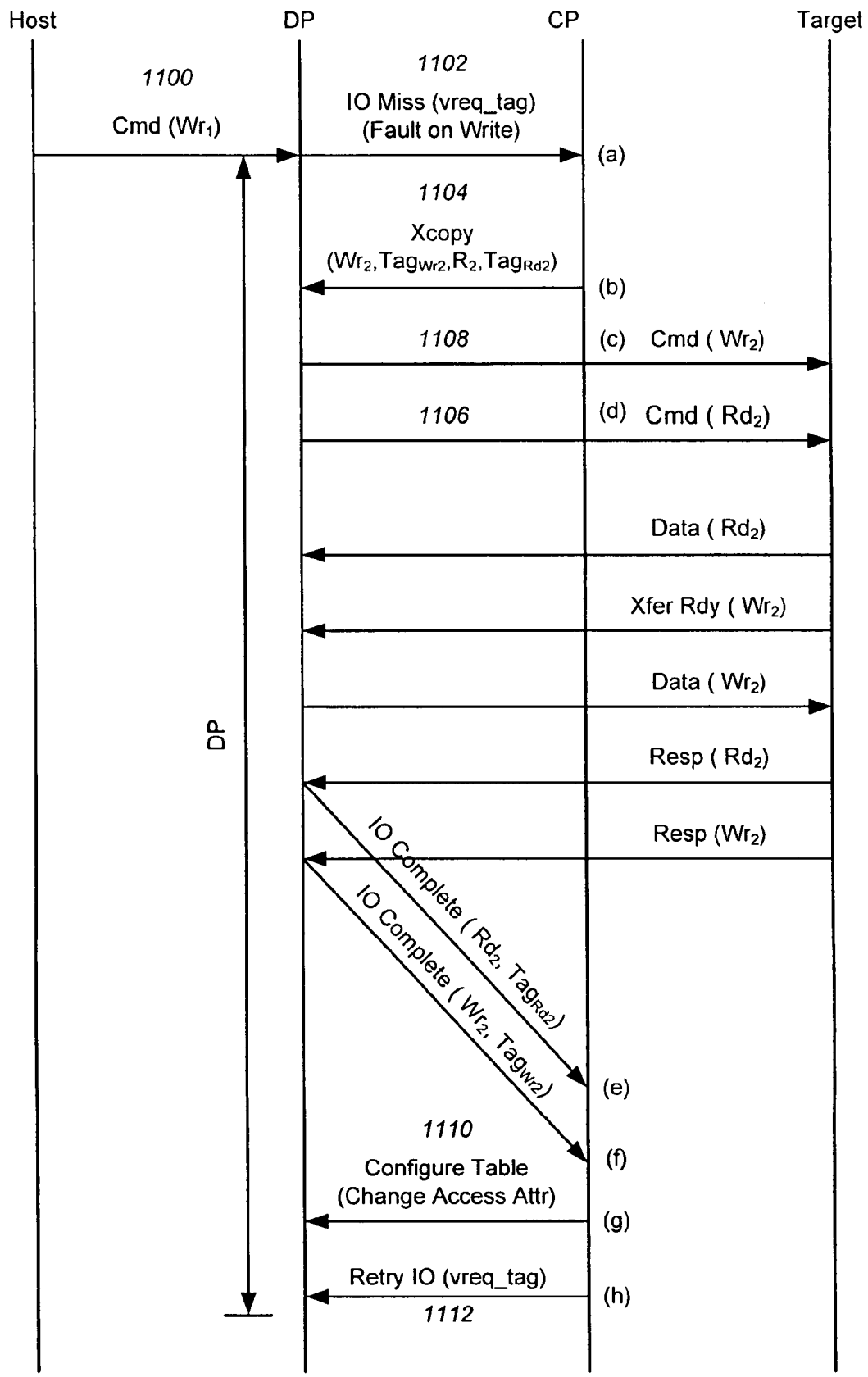
FIG. 11 illustrates an exemplary flow of events that the system can perform for a block copy operation according to embodiments of the invention.

FIG. 11 illustrates a flow of events that the system can perform for the block copy operation. First, a read-only attribute in the Region entry results in IO 1100 faulting 1102 to the CP. The CP determines that it is a write request to $V_{org}$ and issues a block-copy command 1104. The DP tags each request, read, and write separately, so that the completion of each of them can be flagged to the CP separately, as soon as it happens. The DP issues the read command 1106 to $V_{org}$. The DP issues the corresponding write command 1108 to $V_{snap}$. The SCSI status is indicated to the CP, along with the io-request tag to identify the transaction that is completed. The previous step is repeated for the second transaction that is completed. Upon completing the copy from $V_{org}$ to $V_{snap}$ successfully, the CP reconfigures the Region entry on $V_{org}$ to read-write and on $V_{snap}$ to read-only (see 1110). The CP can then issue a request 1112 to retry the original write request to $V_{org}$ from the remote host.

Snapshots.

Embodiments of the present invention enable snapshots to be accomplished using the split CP and DP and virtualization structures. In a standard disk environment, there are huge amounts of data on the disks, and if a failure happens, it is desirable to revert or roll back the volume to some previous version. This previous version of the volume is a snapshot. Transactions that occur after the failure are maintained so that they can be reapplied to the volume after the volume has been rolled back to the previous version, and the up to date database can recreated.

In the present invention, where virtual targets are mapped to physical targets, traditional software cannot be used because they only understand physical targets. Therefore, hooks are provided to implement snapshots in the DP without losing performance.

In a space saver snap-shot, whenever a write command is faulted to SP, SP can allocate from the next available blocks from the snapshot disk and create the mapping tables for FP. It then performs the block copy from the original volume to the snap-shot disk in the newly allocated space. Then the write command is sent to the original physical storage. Any reads to snapshot disk for the back-up operation or subsequent writes to this region will be serviced by fast path in the future. The allocation of the physical storage is done on a region-by-region basis as the regions are pushed to the snap-shot disk.

In an incremental snapshot a small physical storage, incremental update disk, is allocated to store the new data (writes). On a write command original physical storage is not modified, instead the region (arbitrary size chunk) in which write command lies is allocated on the snapshot physical disk, old data is copied from the original disk to incremental disk and then the new data is over-written on incremental disk. From that point on, all the read/writes to the region that was pushed to incremental disk are directed to the incremental disk. All other regions continue to point to original physical storage.

Figure 12:
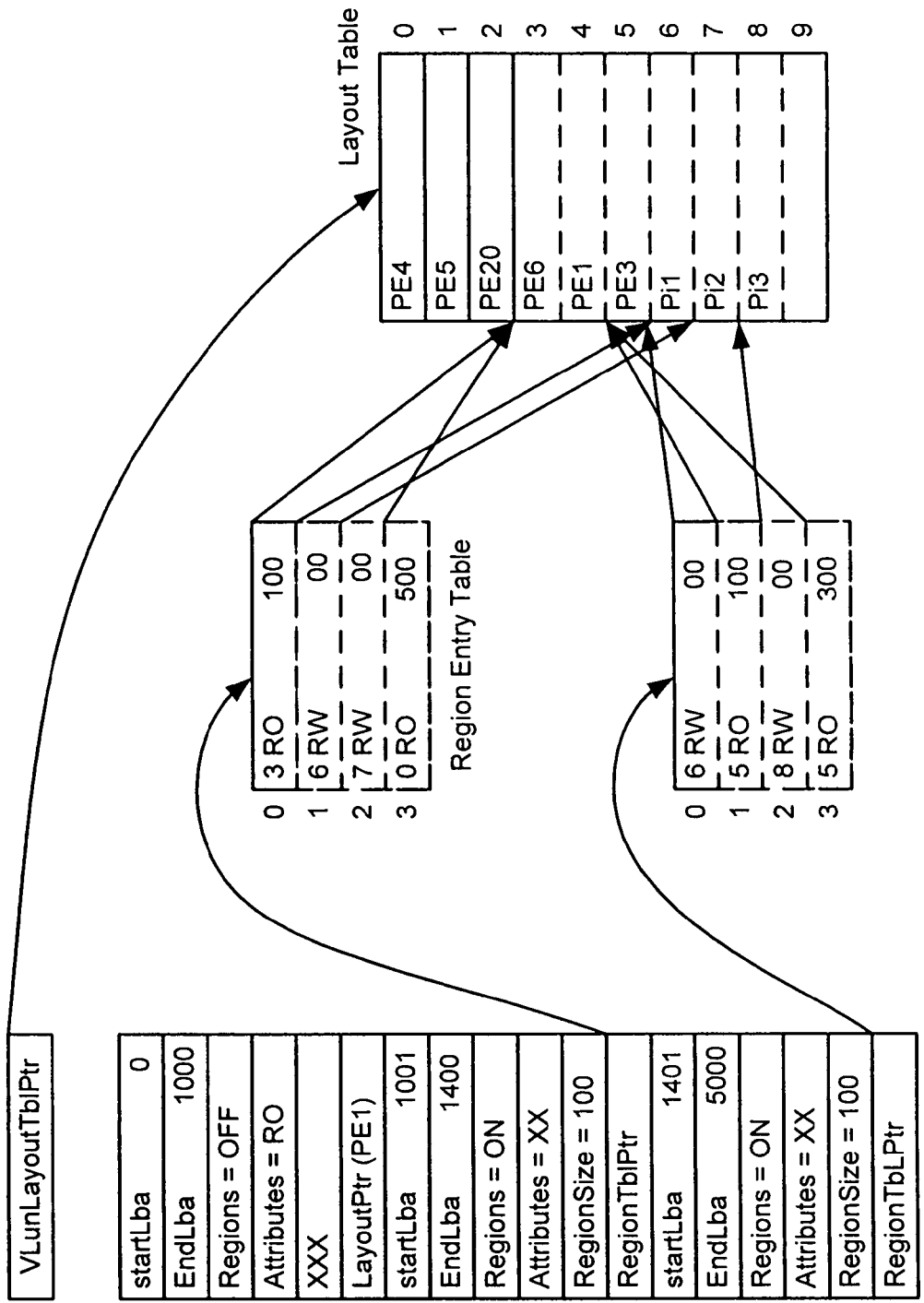
FIG. 12 illustrates an exemplary incremental snapshot according to embodiments of the invention.

FIG. 12 details how the system can be utilized to perform an incremental snapshot.

Figure 13:
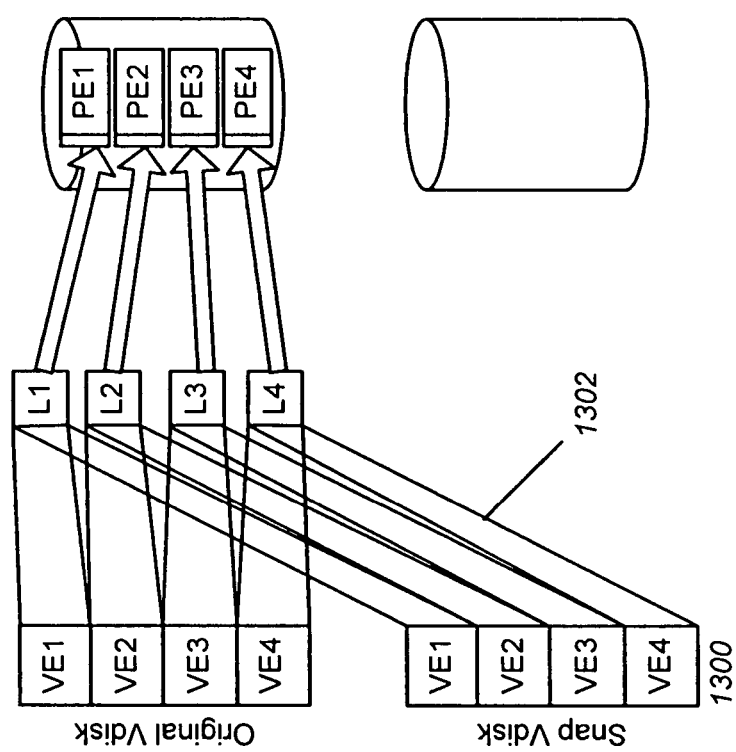
FIG. 13 illustrates an exemplary process of creating a snapshot according to embodiments of the present invention.

FIG. 13 details the process of creating the snapshot. In this case the steps that could be utilized would include: (1) Change permissions of source disk vExtents to RO; (2) Create empty vDisk 1300 for snap disk; (3) Create snap virtual extents 1302 pointing to same layouts; and (4) Set snap vExtents to RO. All reads could be handled without CPP intervention.

Figure 14A:
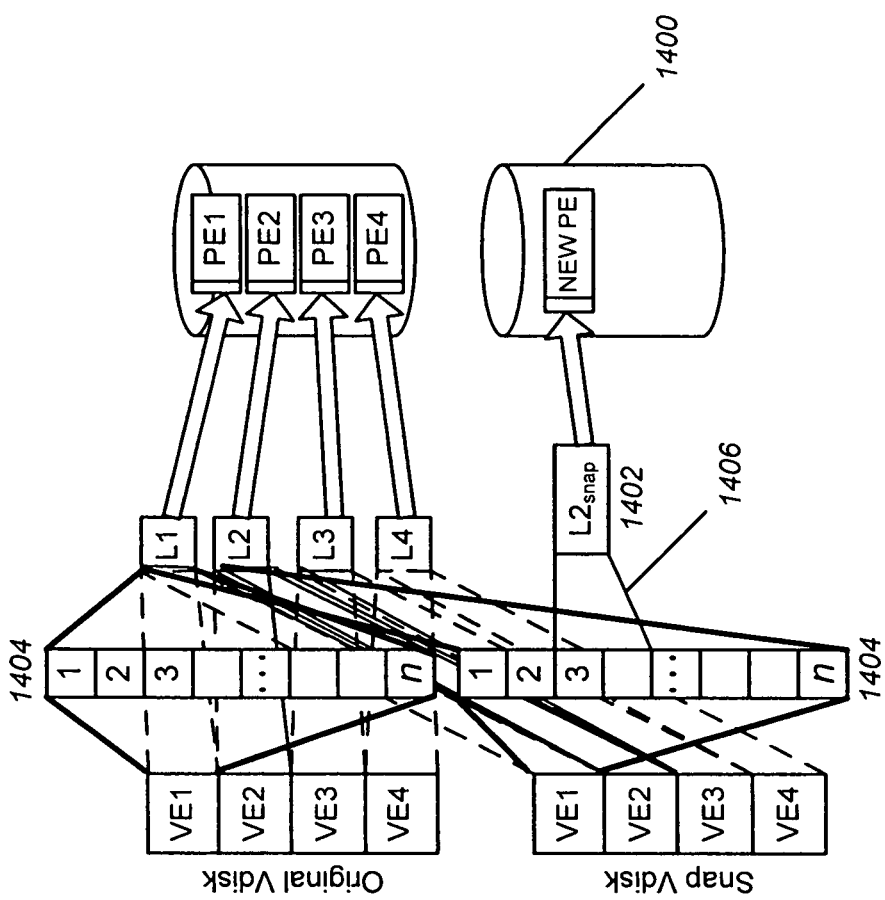
FIG. 14a illustrates an exemplary implementation of snapshot copy on write (COW) according to embodiments of the invention.

FIG. 14a details a possible implementation of Snapshot Copy on Write (COW). Here, a SCSI write arrives and is faulted to the CPP. The steps could include: (1) CPP allocates a new pExtent 1400, creates a new layout 1402, and assigns the pExtent to it; (2) CPP creates regions 1404 in the affected vExtent on both original and snap vDisks; (3) CPP copies affected regions to the new pExtent; (4) Point regions in snap vDisk to new layout (see 1406); (5) Set write regions to RW; and (6) Retry the original SCSI write.

Figure 14B:
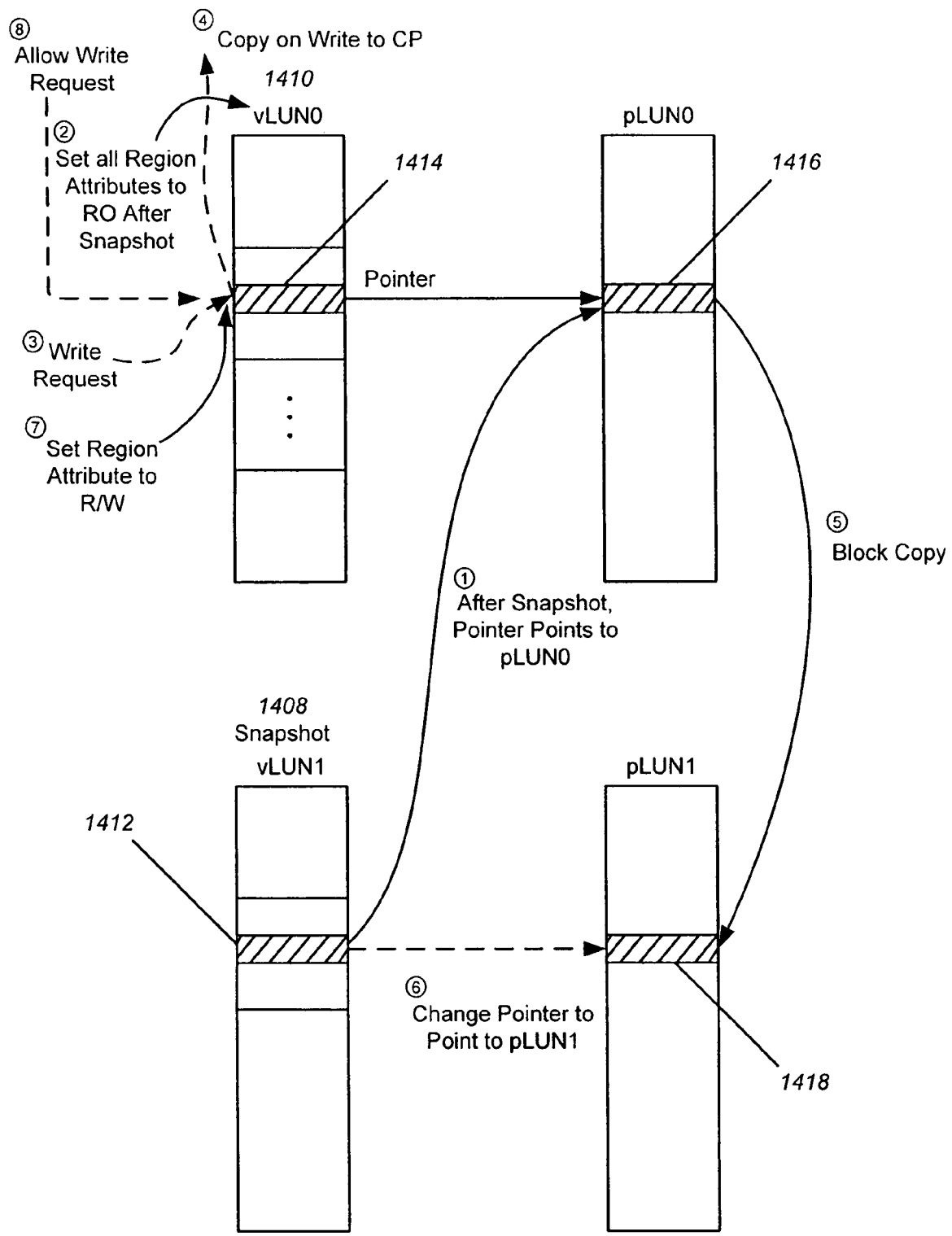
FIG. 14b illustrates an exemplary snapshot process according to embodiments of the invention.

FIG. 14b illustrates an exemplary snapshot process according to embodiments of the invention. A snapshot is like a "picture" of a vLUN at a particular moment in time. In FIG. 14b a snapshot command has caused a snapshot vLUN1 1408 to be copied from original vLUN0 1410. In other words, a snapshot of vLUN0 is taken and saved as vLUN1. The region table entries 1412 in vLUN1 point to the same pExtents in pLUN0 as the region table entries in vLUN0. Note that no data is moved at this time. In the example of FIG. 14a, both the region table entry for region 1414 in vLUN0 and the corresponding region table entry for region 1412 in vLUN1 point to pExtent 1416. After vLUN1 is created, all region table entries in vLUN0 are set to read only access.

However, if a write directed to region 1414 is subsequently received, because the access attribute for that region is set to read only, a copy on write fault will be sent to the control path. The control path will then cause the data in pExtent 1416 to be copied to a corresponding pExtent 1418 in pLUN1. In other words, before pExtent 1416 is overwritten, the contents of pExtent 1416 will be preserved in pLUN1 so that the snapshot vLUN1 will be preserved. The pointer in the region table entry for region 1412 in vLUN1 will then be changed to point to pExtent 1418, so that the snapshot vLUN1 will always be pointing to data present in pLUN0 when the snapshot was taken. The region table entry for region 1414 in original vLUN0 is then changed to read/write access, so that subsequent reads and writes to pExtent 1416 can be processed. This process is repeated each time a write is directed to a pExtent in pLUN0 that has not yet been copied to pLUN1.

Online Migration.

Embodiments of the present invention provide hardware assisted functionality so that online data migration can be done in the fabric. If a lot of data is stored on a physical disk, and the physical disk is creating problems or is old, the data should be moved a new disk. Preferably, all the data should be moved over to the new disk without down time. Cutting off access to users creates down time and is unacceptable. The present invention enables this without down time. To migrate data from one vDisk to another, there is a software layer that starts copying data, but while this is going on, the initiators can be doing reads or writes. When these reads or writes happen to a certain portion of the disk being copied, those I/O requests are faulted as I/O misses, and the storage application software will queue the I/Os and wait for the data in that portion to be copied before letting the I/O go through. So there is only a small delay which is less than the timeout time, and no re-tries are needed. Note that the entire disk need not have been copied, only the region at issue (the subject of the read or write) needs to have completed copying. If writing to the region of the disk that has not been migrated, then the read request need not be faulted.

Figure 15A:
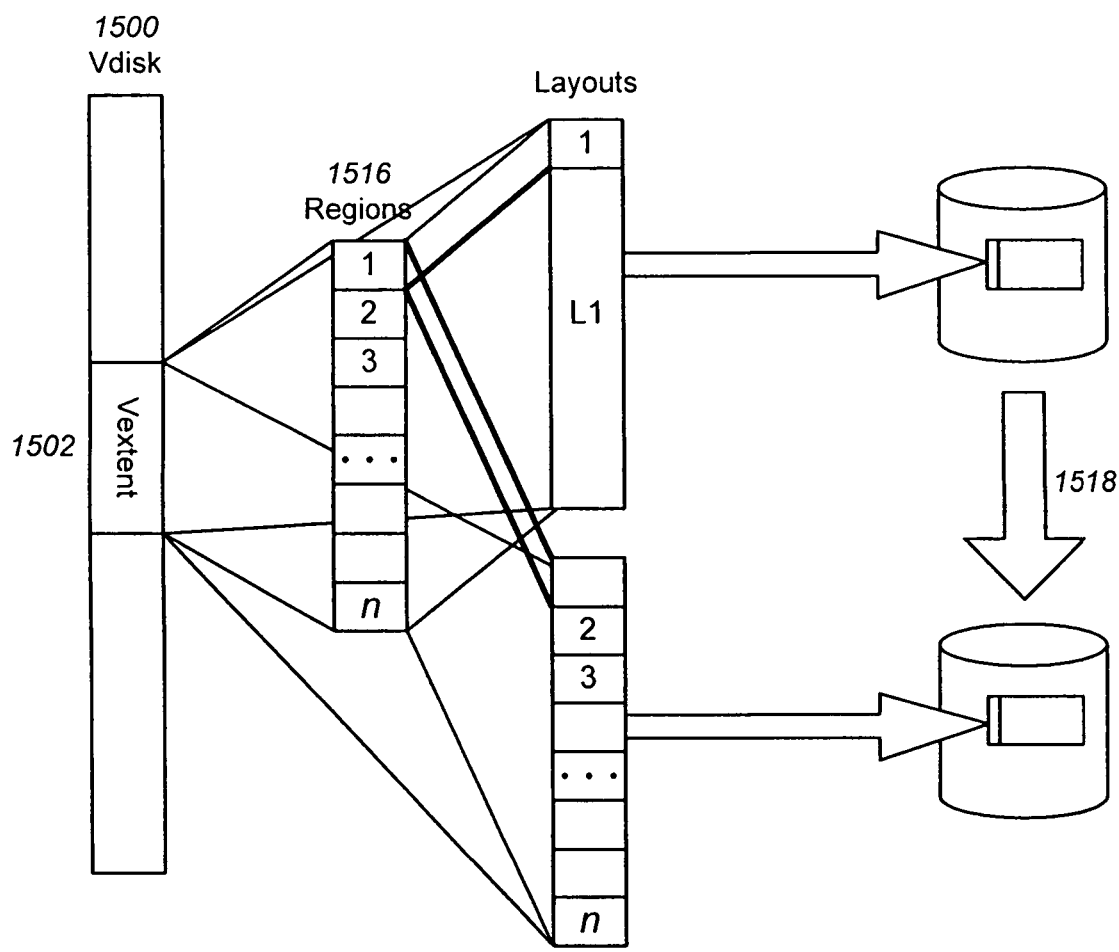
FIG. 15a illustrates an exemplary implementation of data migration strategy according to embodiments of the invention.

FIG. 15a details a possible implementation of a migration strategy using the system. The steps include, for each vExtent 1502 in vDisk 1500: (1) Subdivide vExtent into regions 1516 (they are created pointing to Layout 1 (L1)); (2) For each region in vExtent, (i) Set region to "Read Only", (ii) Issue block copy 1518, (iii) Set region to point to Layout 2 (L2) and restore "R/W Access", and (iv) Retry any I/Os that were held; and (3) Map vExtent to L2 and remove regions.

Figure 15B:
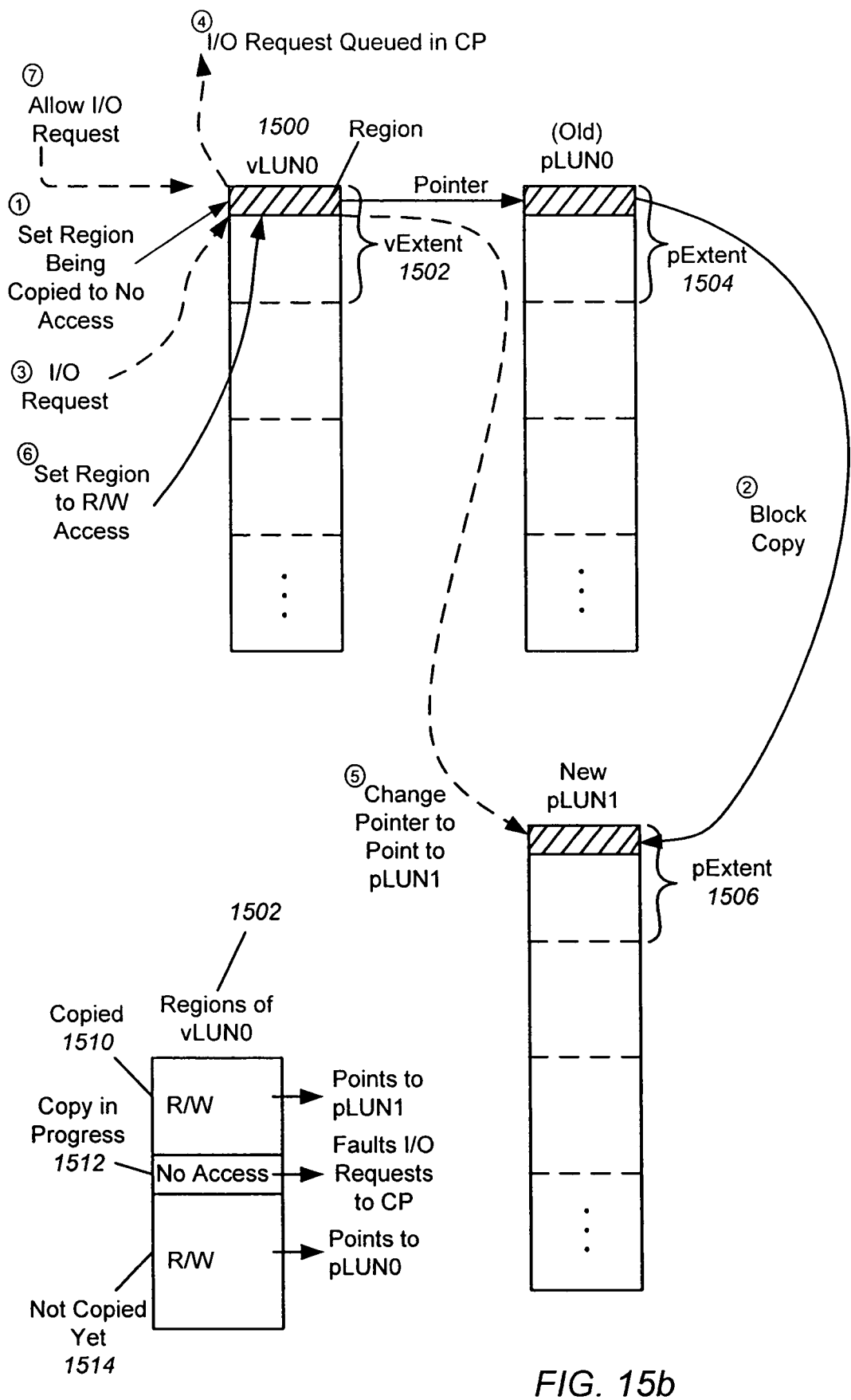
FIG. 15b illustrates an exemplary data migration procedure using storage virtualization according to embodiments of the invention.

FIG. 15b illustrates an example of data migration using the storage virtualization of embodiments of the invention. In the example of FIG. 15b, the migration of data from pLUN0 to pLUN1 (e.g. a copy process) is desired. Focusing on one vExtent for purposes of explanation only, vLUN0 contains vExtent 1502, which further contains a region table defining multiple regions and region entries, each region entry pointing to one or more pExtents in pLUN0 prior to the data migration. It can be appreciated that after the data migration is complete, each region entry in the region table of vExtent 1502 should now point to one or more pExtents in pLUN1, so that vLUN0 is properly mapped to the migrated data in pLUN1.

To accomplish this, as a particular pExtent 1504 in pLUN0 is being copied to a particular pExtent 1506 in pLUN1, the attribute of the region table entry in vExtent 1502 pointing to pExtent 1504 is changed from read/write access to no access, so that no reads or writes to pExtent 1504 will take place during the copying process (block copy). If an I/O request should be received for pExtent 1504 during this time, a fault will be sent to the control path, and the I/O request will be queued for delayed processing. After the copying of pExtent 1504 to pExtent 1506 is completed, the attribute of the region table entry in vExtent 1502 pointing to pExtent 1504 is changed back from no access to read/write access, and the pointer is changed to point to the newly copied pExtent 1506 in pLUN1. The queued I/O request can now be processed, because the migration of data for that region has been completed. This process is repeated until the entire contents of pLUN0 have been migrated to pLUN1.

Thus, at any time during the migration process, vExtent 1502 may contain one or more region table entries 1510 having a read/write access attribute and a pointer to newly copied pExtents in pLUN1, a region table entry 1512 having a no access attribute associated with the pExtent being copied, and one or more region table entries 1514 having a read/write access attribute and a pointer to the pExtents to be copied in pLUN0.

Dynamic Manipulation.

In dynamic manipulation, while I/Os are being performed, table entries such as attributes and pointers can be changed, or a new mirror can be added to a vDisk, for example. To avoid data corruption, it must be determined that there are no more outstanding I/Os for a particular region. When all I/Os have drained, the mappings can be changed. APIs are provided to allow a partner application to quiesce the volume (allow all outstanding I/Os to complete). Embodiments of the present invention provide the ability to quiesce down to vExtent granularity so that the entire volume does not have to be quiesced.

Embodiments of the present invention provide primitives to perform this manipulation without any performance degradation or data integrity. This operation of changing the map tables involves several steps. First, I/Os can be quiesced (drained) on a given LBA range, which will ensure that all the outstanding I/Os pending from host initiators are written to physical storage. Next, attributes are set on regions such that the new I/Os will not be serviced by fast path. They are either returned as BUSY (which will force the host initiators to retry after a timeout), or queued. The map entries can then be changed to reflect the new mapping. Finally, attributes are changed back to read/write, so the subsequent I/Os from host initiators are serviced in fast path.

Sparse Extents.

A Virtual LUN can comprise of multiple virtual extents (vExtents), as explained earlier. It is not necessary for all the vExtents to be created, or that they are contiguous. Sparse extents means that there are holes in the vLUN. No contiguous mapping is required. Maps can be created with holes. If a I/O request is destined for an unmapped area of the vLUN (a hole), the CP can be alerted and the mapping can be created at that time. The vExtents can be loaded on-demand (for example, when there is an IO to a specific LBA range).

Caching.

Caching applications can maintain their data caches in the fabric by treating the cache as a mirror. Mirroring keeps the cache updated, and by using the "sticky read" feature to specify that all reads should be done from the cache volume, the application ensures that the full performance benefits of the cache are realized.

Figure 15C:
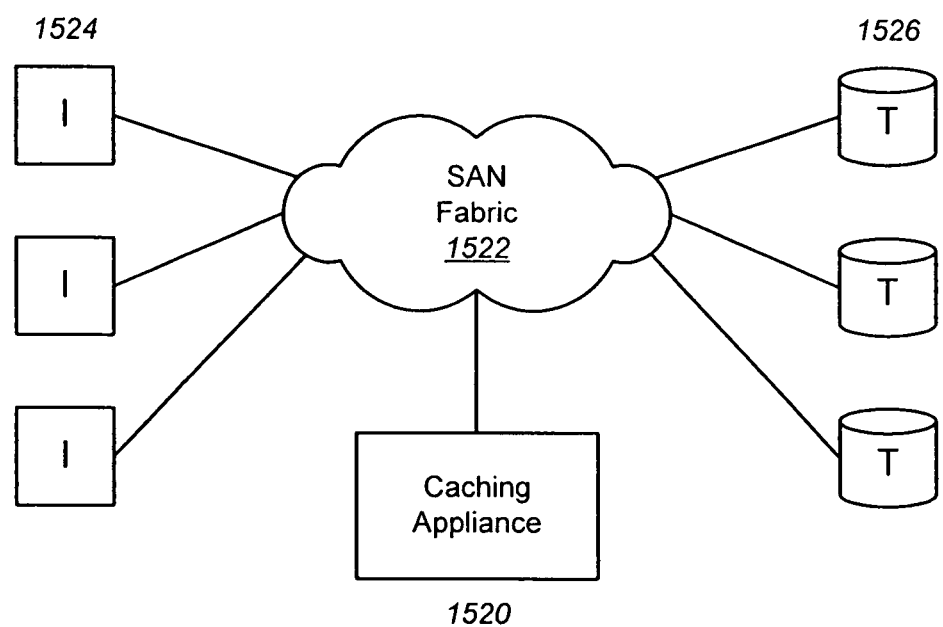
FIG. 15c illustrates an exemplary high-level caching diagram according to embodiments of the invention.

FIG. 15c illustrates caching. A caching appliance 1520 connected to the SAN 1522 will cache the data locally when initiators 1524 send requests to targets 1526. For example, during a write request, mirroring constructs can be used to deliver a copy of the data into cache, and the caching application may determine that the data also needs to be written to the target. If a read request for this data is subsequently received, it can be read directly from the cache, and the read request is never forwarded to the target. Background processes can be used to sync up the data in the cache. If, during a read request, the cache is determined to be out of sync (i.e. the data in the cache may not be updated), the data can be read from the physical storage and stored into the cache, and then the caching appliance may send the data along to the initiator.

Embodiments of the present invention provide for caching using mirroring and the concept of regions, where attributes can be set on a region basis (the region in cache is current or out of sync, so read from storage).

The cache agent has two distinct components, cache management software and volume management software. The volume management software is referred to as "control path". The volume management component is responsible for creation of cached volumes, specifying volume geometry, handling mapping tables, IO miss events etc. The volume manager may also co-ordinate operations between multiple cache-agent components for redundancy. The cache agent component is responsible for managing the cache memory, resolve cache-hit/miss, flush and replace the cache buffers etc. The volume manger communicates with hardware (fast path) using CPML (control path messaging layer) protocol defined by API. This communication happens between the control plane and the support CPU (SP) inside the hardware. The communication between the cache-agent and hardware can involve SCSI R/W commands and associated data frames.

The frame formats that could be used for are CPML, cache-agent communication and frames from external SCSI initiator/targets are specific to system implementation. The hardware can treat the cache agent as an SCSI node capable of acting as SCSI target as well as SCSI initiator. For a virtual volume created on fast path, the entire volume, any virtual extents or any virtual regions of it can be marked as "cacheable". Based on this attribute, hardware can divert the read/write commands to the cache agent(s). The attributes can be set/changed by the volume manager using the API.

More than one cache agents can be attached to the same virtual LBA range to provide high availability of the cache. More than one cache agents can also the attached to single virtual volume covering disjoint LBA ranges. This will allow for increasing the total cache-size and load-balancing. The cache agent can employ proprietary caching algorithms for cache management. It can initiate regular SCSI IOs to the virtual volume to read and write the data from the physical devices. The cache agent can use these read/write commands during pre-fetch/cache-fill and cache flush operations. The hardware can also be operable to provide "cache-update" feature on the data frames. This feature can be used to avoid back and forth traffic of data frames between the hardware and cache-agent during a cache-miss.

This following paragraphs explain how the DP can be used along with a cache agent in fibre channel SAN environment. The cache agent can communicate with the DP using native FC, FC-PCIExpress Bridge or SPI-4—PCIExpress Bridge interfaces and PCI/Ethernet interfaces.

The DP can be used in several system configurations with the cache agent and volume management software.

Figure 15D:
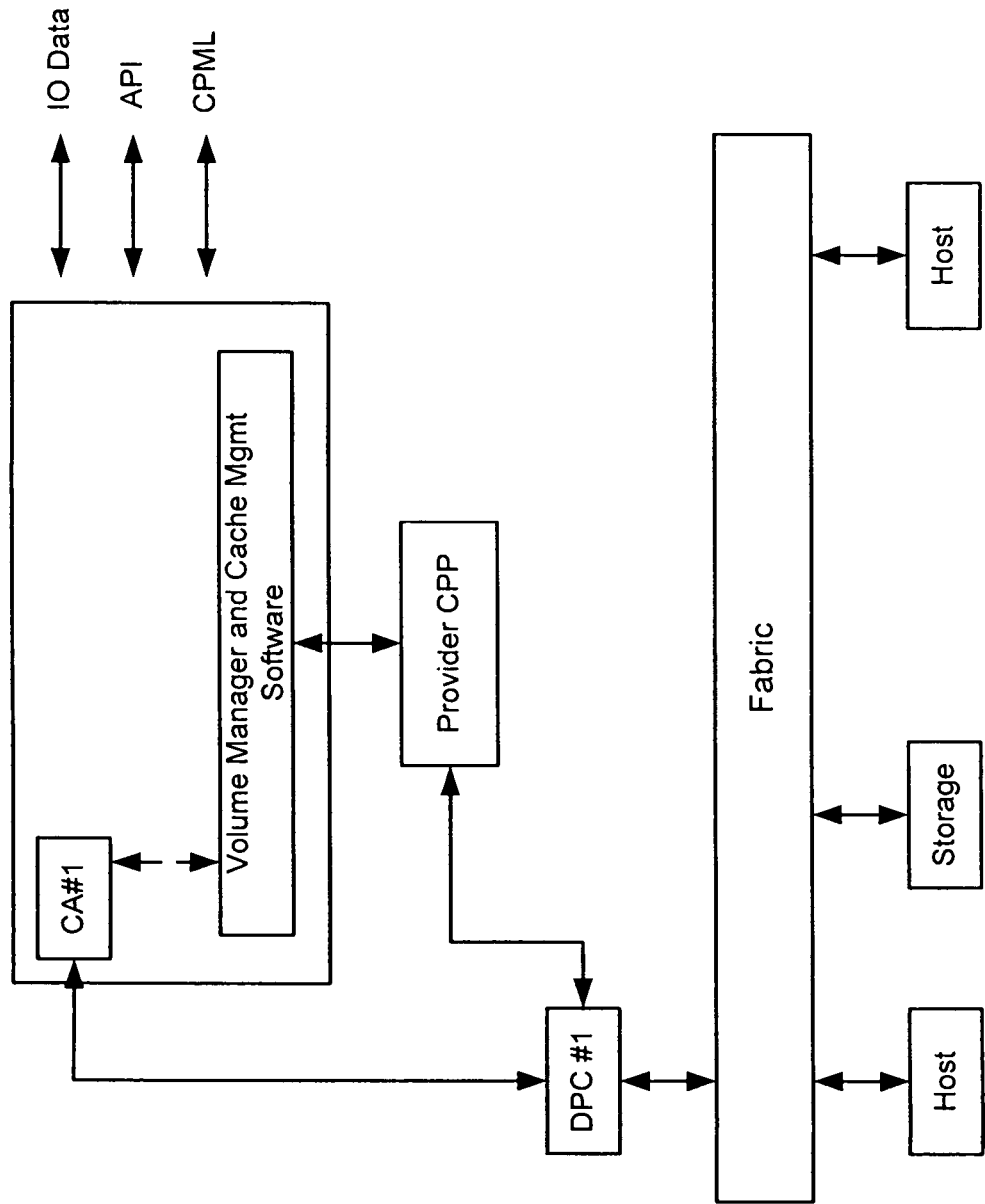
FIG. 15d illustrates an exemplary single DP, single cache agent configuration (C1) according to embodiments of the invention.

FIG. 15d illustrates a Single DPC, single Cache Agent Configuration (C1).

Figure 15E:
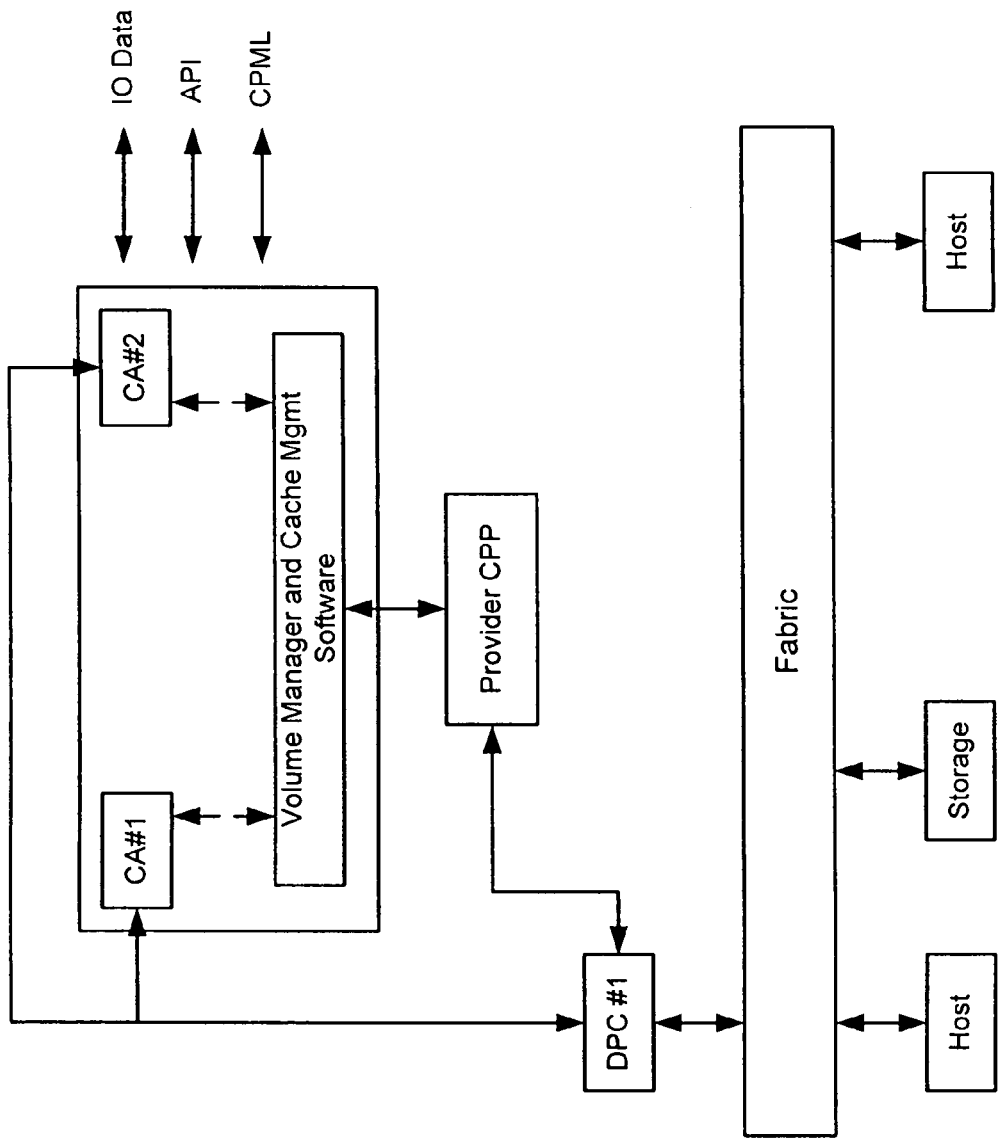
FIG. 15e illustrates an exemplary single DP, multiple cache agent configuration (C2) according to embodiments of the invention.

FIG. 15e illustrates a Single DP, Multiple Cache Agents (C2).

Figure 15F:
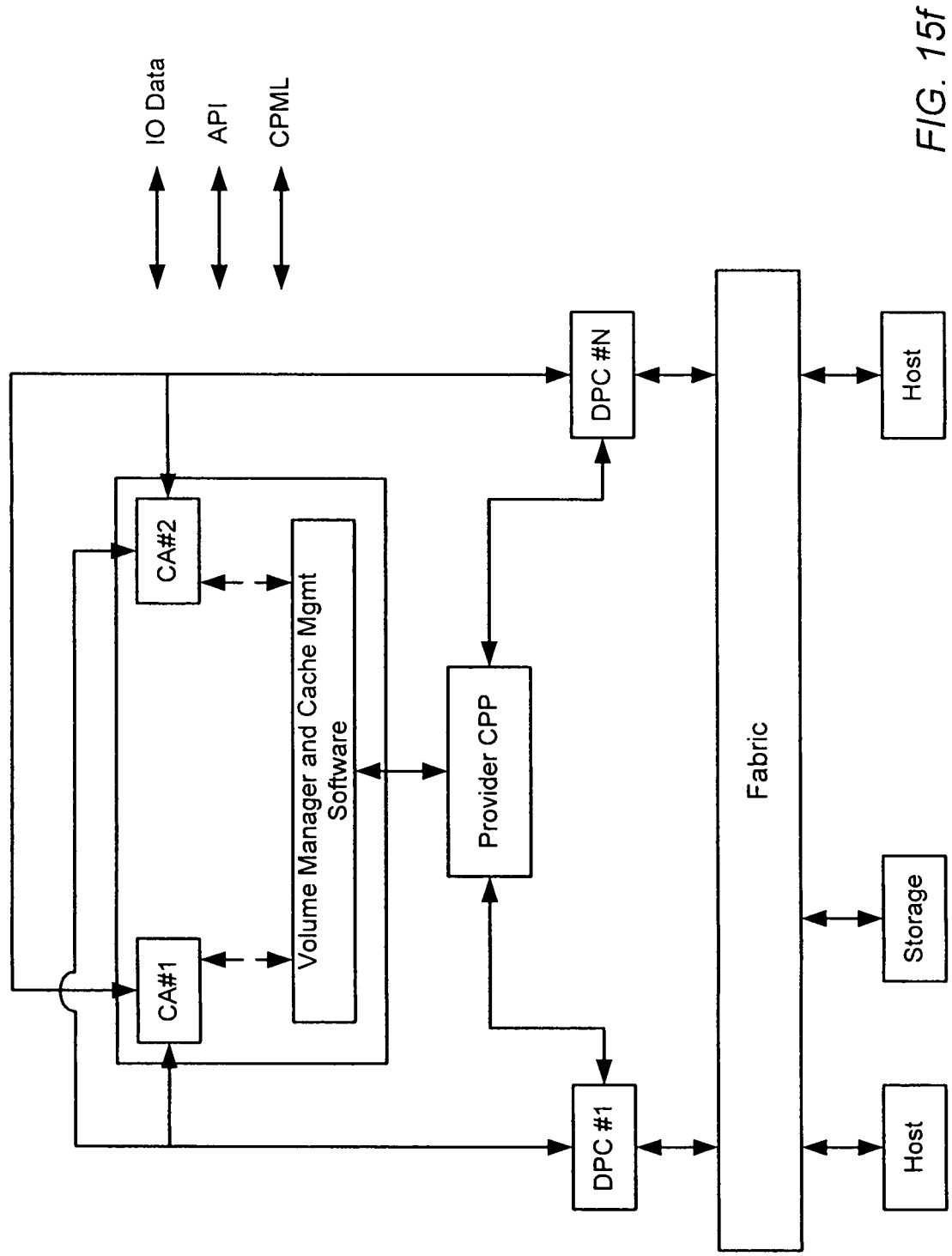
FIG. 15f illustrates an exemplary multiple DP, multiple cache agent configuration (C3) according to embodiments of the invention.

FIG. 15f illustrates Multiple DPs, Multiple Cache Agents (C3). In FIG. 15f the two cache agents and the DPCs are part of the same system. (e.g. Director switch). All DPCs within the system can internally access all the cache agents. All the DPCs are controlled by centralized control path running on CPP.

Figure 15G:
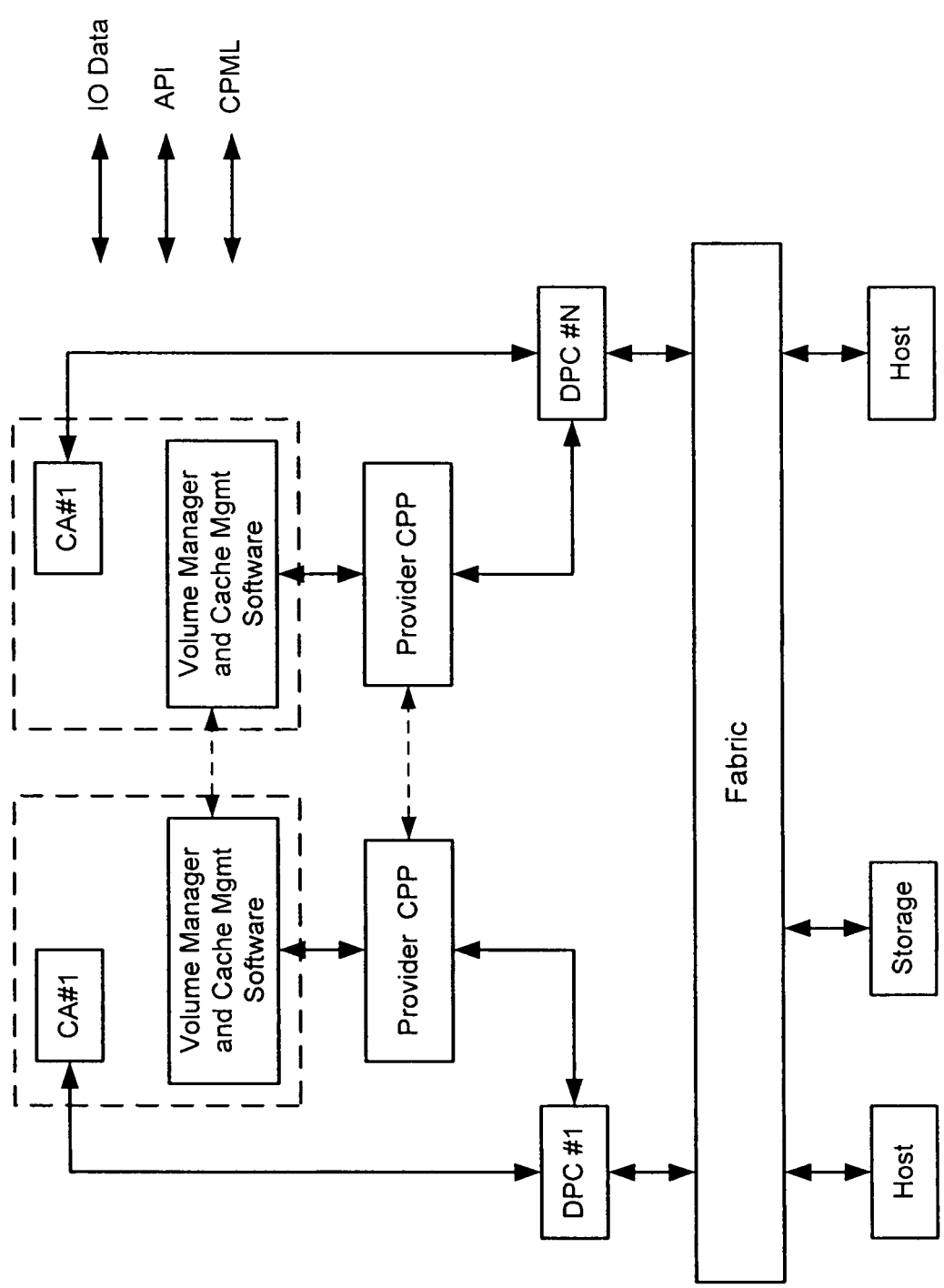
FIG. 15g illustrates an exemplary block diagram of multiple cache agents independently connected to a fabric (C4) according to embodiments of the invention.

FIG. 15g illustrates Multiple cache Agents independently connected to fabric (C4).

The cache agent has two distinct components, cache management software and volume management software. The volume management software is referred to as "control path" in this document. The volume management component is responsible for creation of cached volumes, specifying volume geometry, handling mapping tables, IO miss events etc. The volume manager may also co-ordinate operations between multiple cache-agent components for redundancy. The cache agent component is responsible for managing the cache memory, resolve cache-hit/miss, flush and replace the cache buffers etc. The volume manger communicates with the DP (fast path) using CPML (control path messaging layer) protocol defined by the API. This communication happens between the control plane and the support CPU (SP) inside the DP. The communication between the cache-agent and the DP involves SCSI R/W commands and associated data frames. This communication must be directed to the APEX engine (Fast Path) in the DP and therefore must use a different protocol from the CPML.

The frame formats used for CPML, cache-agent communication and frames from external SCSI initiator/targets are specific to system implementation.

The DP will treat the cache agent as an SCSI node capable of acting as SCSI target as well as SCSI initiator. For a virtual volume created on the DP, the entire volume, any virtual extents or any virtual regions of it can be marked as "cacheable". Based on this attribute, the DP will divert the read/write commands to the cache agent(s). The attributes can be set/changed by the volume manager using the API.

More than one cache agents can be attached to the same virtual LBA range to provide high availability of the cache. More than one cache agents can also the attached to single virtual volume covering disjoint LBA ranges. This will allow for increasing the total cache-size and load-balancing. The cache agent can employ proprietary caching algorithms for cache management. It can initiate regular SCSI IOs to the virtual volume to read and write the data from the physical devices. The cache agent can use these read/write commands during pre-fetch/cache-fill and cache flush operations. The DP also provides "cache-update" feature on the data frames. This feature can be used to avoid back and forth traffic of data frames between the DP and cache-agent during a cache-miss.

The DP will provide a unique identifier (handle) for each IO sent to the cache agent. The cache agent should include this handle in all subsequent communications with the DP for that IO. The DP will use this handle to locate the internal request control block for this IO.

FIG. 15h shows the object model of a "cacheable virtual disk". Virtual extents 1 and 2 use cache agents #1 and #2 to cache the LBA range represented by these two extents. VE#3 uses cache agents #4 and #5 to cache LBA range of that VE. The cache agents form mirroring layout 1528 for the given extent. All the writes will be replicated to all the attached cache agents by the DP while reads will follow the configured mirror-read policy such as "load-balancing", "sticky mirror read" etc. FIG. 15h also shows alternative layouts 1530 for the same VE. These layouts point to the backend physical storage used by the virtual volume. Note that the physical storage layout may or may not contain mirroring configurations. It is possible to combine cache-agents and backend storage into single layout.

The following paragraphs outline the interaction between cache agent and the DP on read/write commands.

Handling of Read command with single cache agent or multiple cache agent configurations is the same. The following flow diagrams indicate the interactions with "selected" cache agent based on read-policy.

Figure 15I:
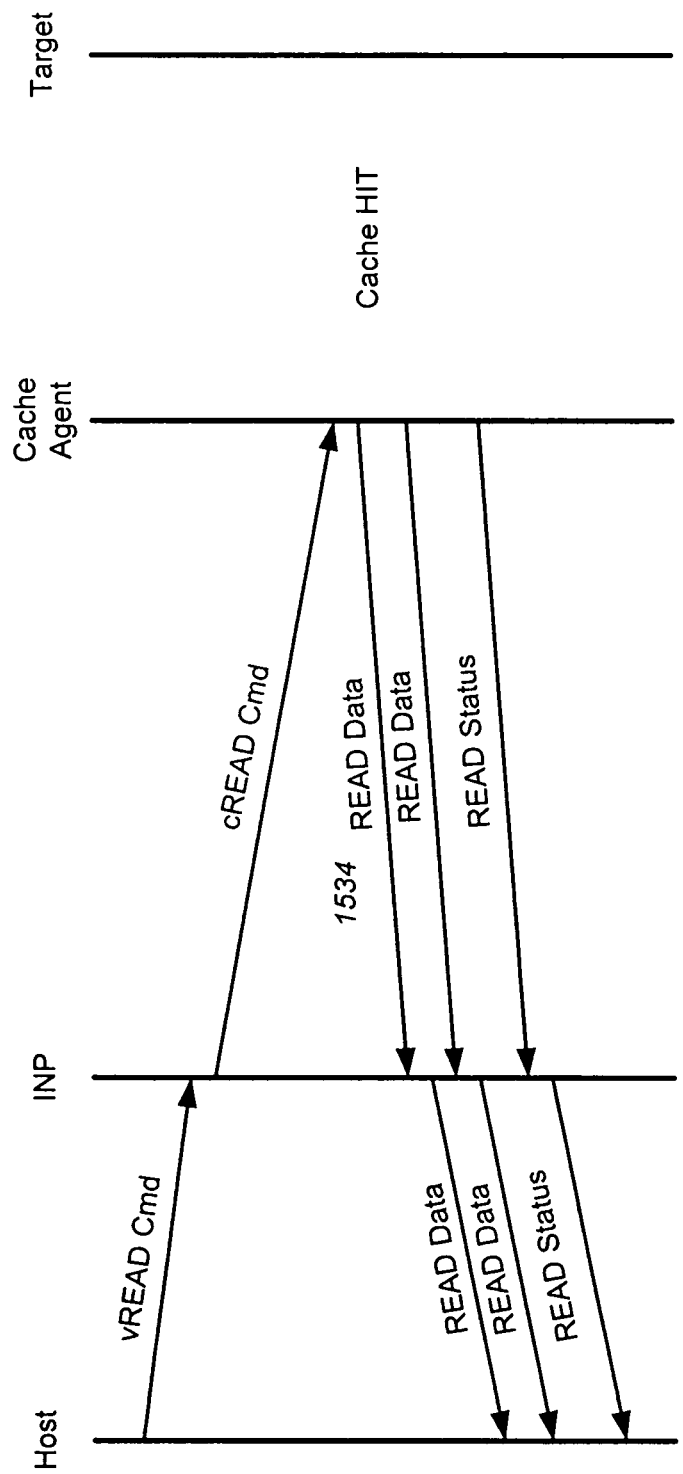
FIG. 15i illustrates an exemplary read—cache hit according to embodiments of the invention.

FIG. 15i illustrates a Read—Cache Hit. For read command from a host, the cache agent provides the read data 1534 from the cache. The read status from the cache agent is optional depending upon the configuration. For internal cache agents (present in the same system, e.g. Director Switch with the DP), implicit status from the cache agent is accepted.

Figure 15J:
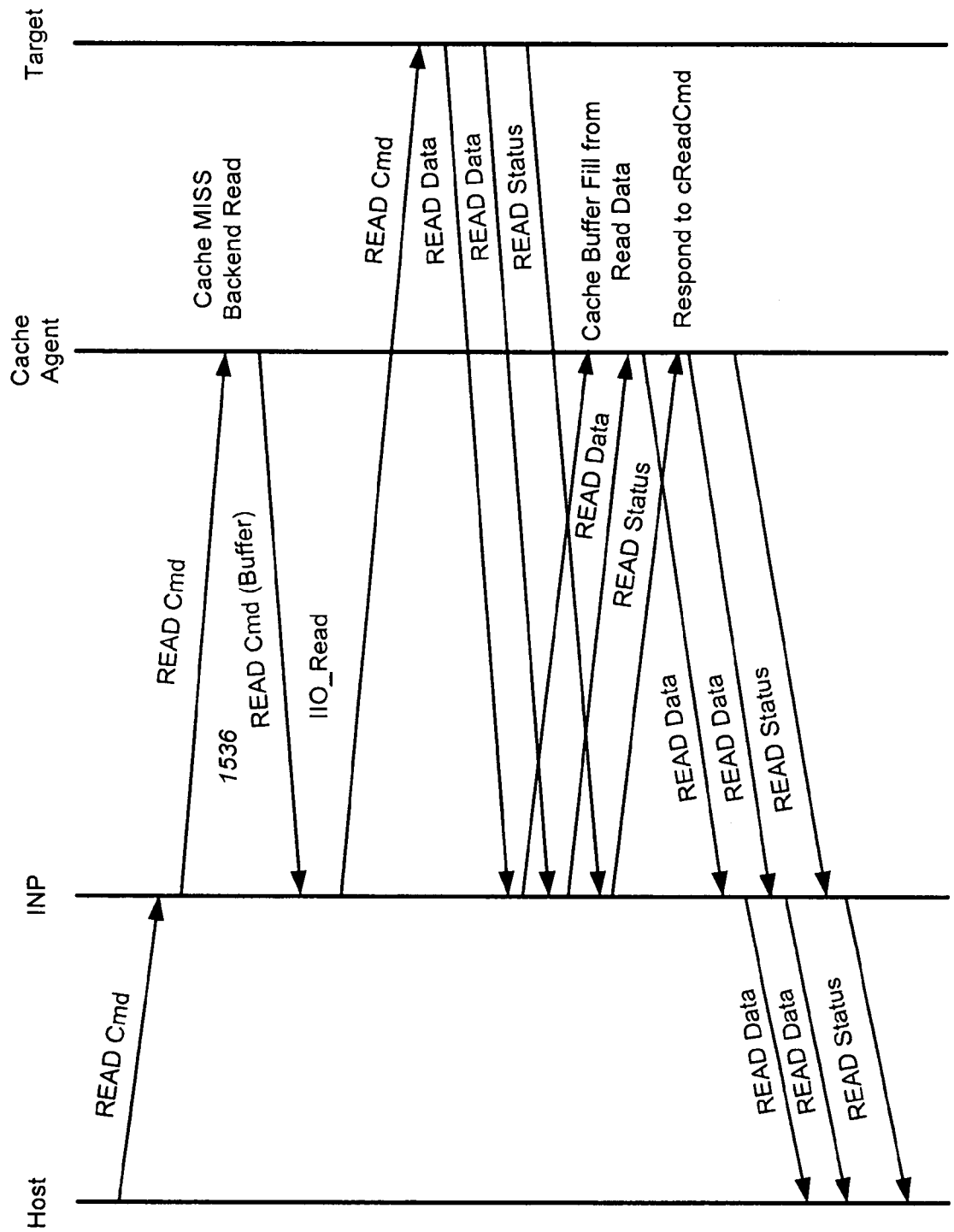
FIG. 15j illustrates an exemplary read—cache miss according to embodiments of the invention.

FIG. 15j illustrates a Read—Cache Miss. As shown in FIG. 15j on a cache miss on read, the cache agent initiates a new initiator mode read transaction (IIO_Read) 1536 to back end storage to fill the cache buffer(s). The read data from the back-end storage first goes to cache agent which then turns it around to fulfill the original Read transaction.

Figure 15K:
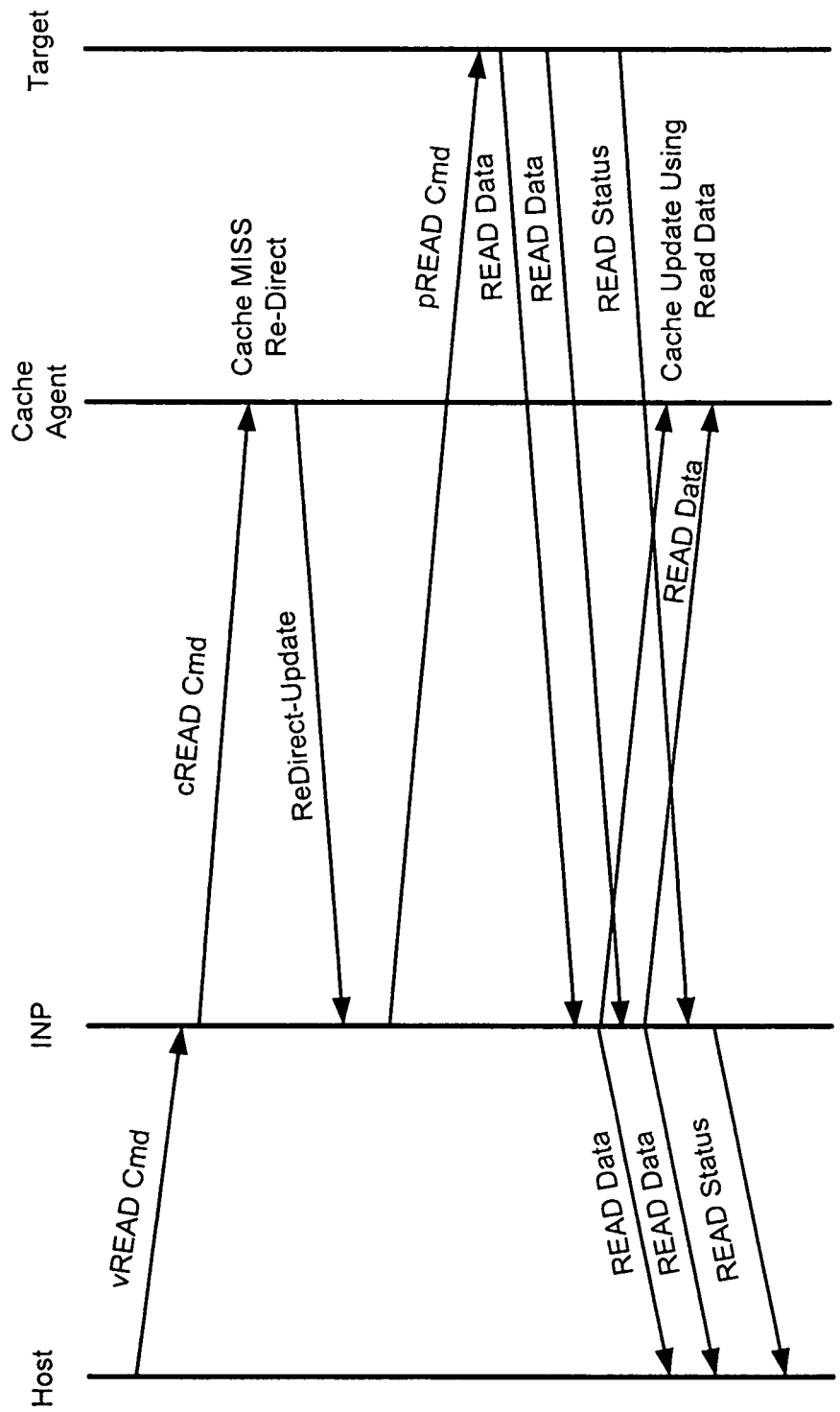
FIG. 15k illustrates an exemplary read—cache miss—redirect w/update according to embodiments of the invention.
Figure 15I:
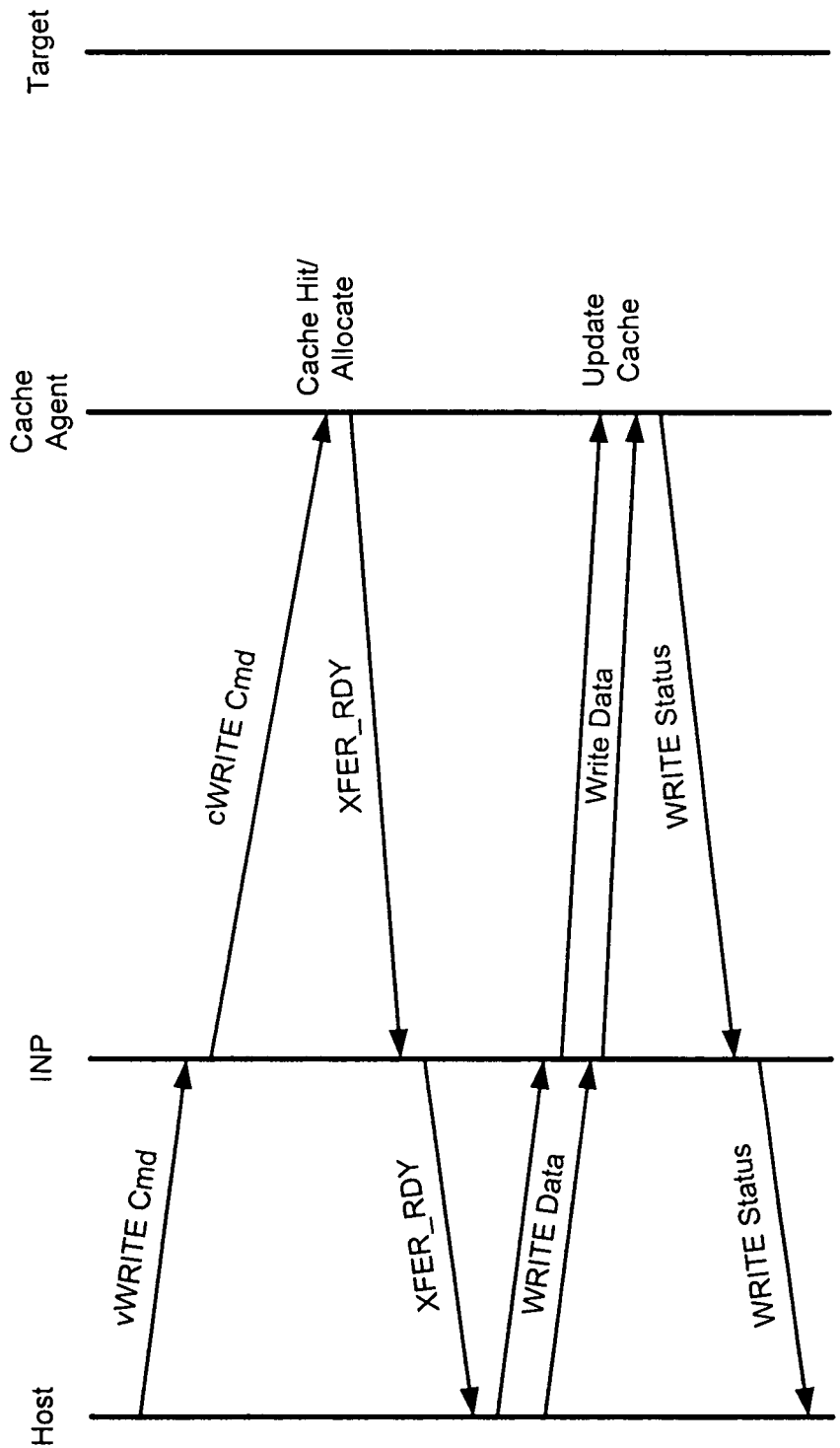

FIG. 15k illustrates a Read—Cache Miss—Redirect w/update. With the "redirect/update" operation, the cache agent can use the DP assist function to read the data from backend storage and directly send it to the host. This avoids data movement in and out of cache agent and also reduces the latency seen by the host. Redirect option can be used without update, in which case data will be sent to the host and not to the cache agent. This mode can be used when data need not be cached.

FIG. 15l illustrates a Write—Cache Hit/cache allocate (single cache agent).

Figure 15M:
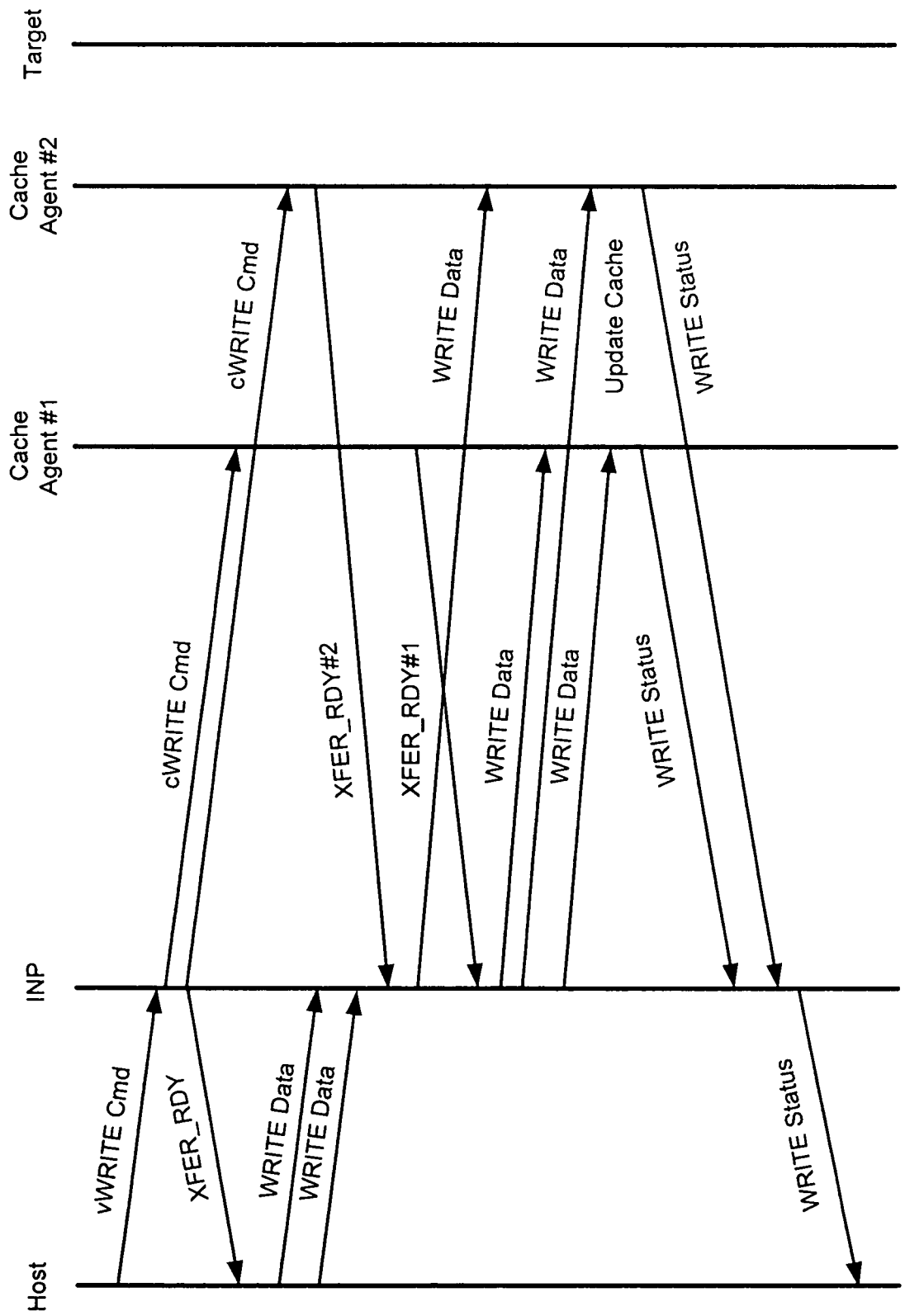
FIG. 15m illustrates an exemplary write—cache hit/allocate (multiple cache agents)—C3 according to embodiments of the invention.

FIG. 15m illustrates a Write—Cache Hit/Allocate (multiple cache agents)—C3. The DP treats multiple cache agents as synchronous mirrors for a write operation. The write operation is performed in buffered mode (sequence level buffering) by the DP. Due to this the XferRdy to the host is sent as soon as buffer is allocated even before xferRdys from the cache agents. Although the completion status is sent to the host only after GOOD status is received from all the cache agents.

Write—Write-thru caching. When cache-agents and back-end storage are configured as peer mirrors, asynchronous mirroring option can be provided to provide completion status to host without waiting for status from backend physical storage. This option may not be supported Write—Cache Miss—Redirect. Write commands and be re-directed back to the DP when the cache agent is in the processing of flushing the cache blocks or the given LBA range is not cacheable anymore. The re-directed write IO will be sent to the back end physical storage for completion. In case of multiple cache agents, all cache agents must respond with redirect for a given IO. If action from all cache agents is not the same, IO will fault to control plane.

Cache Flush. Cache agent may decide to flush the cache buffers in the event of re-using the buffer for a new write or based on timer event. In the case of multiple cache agents, the cache agents are expected to co-ordinate (out-of-band) to avoid same data being written out the backend storage. It is important to protect the data in the event of cache agent failure. Caching application may assign one of the cache agents as "master" for cache flush (de-staging). The DP can broadcast the completion status from the backend storage to other (non-master) cache agents so that cache buffers can be invalidated in those agents' cache.

Write Serialization. When multiple cache agents are used, the DP will perform write IO serialization to keep the caches in exact sync state. Write serialization function can be provided in several ways. In one method, the DP, on each write request, will acquire a write-lock from the control plane for the LBA range. The lock will be released on completion of the IO. All the Write IOs to the locked LBA range will be blocked until lock is released. In the configuration where only one DP is used, locks will be managed by the support CPU inside the DP. This will not require involvement from CP.

Figure 15N:
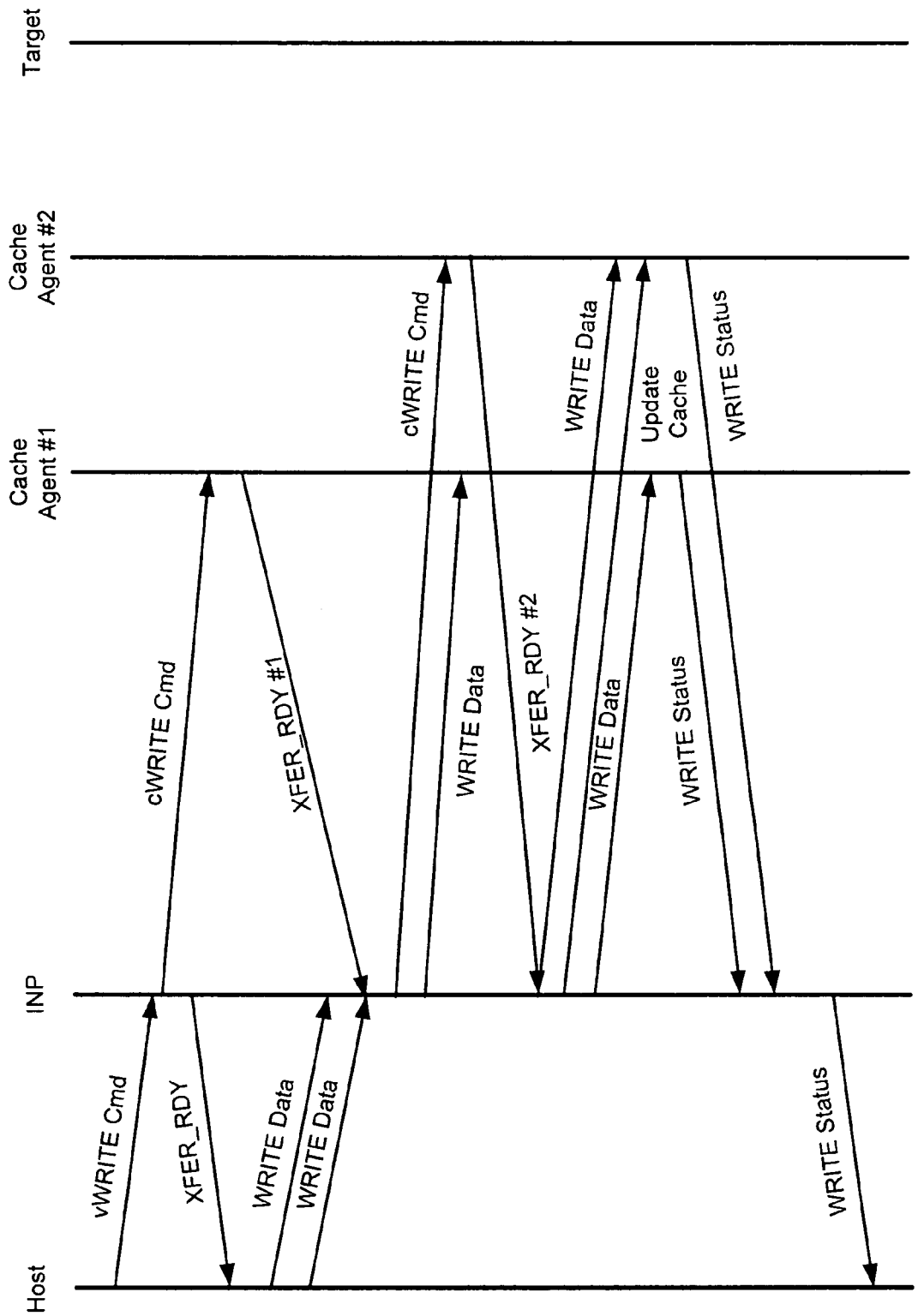
FIG. 15n illustrates an exemplary flow diagram of write serialization by a master cache agent according to embodiments of the invention.

In a second method, the CP can assign one of the cache agents as "Master". The DP will send write IOs to the master cache agent first. Only after the master cache agent accepts the IO (by sending XferRdy), the IO will be sent to rest of the cache agents. This will allow the master cache agent to serialize the overlapping write IOs to maintain consistency across the cache agents. This is shown in FIG. 15n.

DP assist/acceleration for caching application. Cache Pooling: Extend the cache size beyond the capability of single cache agent hardware. Provide locality based load-balancing between cache agents. Provide write mirroring between caches to avoid cache-to-cache communication and data movement. Avoids back and forth data movement (into and out of cache agent) on cache miss (read cmd). Eliminate cache-to-cache communication on cache Flush. Write serialization assist between cache agents. Cache Statistics. Initiator virtual IO support. This will allow the cache agent to use virtual volume to access back-end storage. Backend storage may use complex layouts. All the LBA translation is handled by DPC.

The following errors will be detected and the corresponding IO will be faulted to CP: (1) Transport Errors on host connections (lost frames, time-outs); (2) Transport Errors on back-end target connections; and (3) Errors on data-path connection to any cache agent. Connection between the DP and the cache agent is system configuration specific. Available error detection mechanism will be used on this connection to detect lost, mis-ordered or errored frames. Timeouts will be maintained at a transaction level, for every transaction between the DP and all cache agents.

The following tables list APIs for the Caching Application.

| Target mode API (R/W commands only) | |
| --- | --- |
| av_event_new_io(ioHandle, ioParameters); | SCSI commands will be delivered to the application by the API layer using events. |
| av_io_done(ioHandle, ioStatusInfo); | Application can send the desired scsi status on completing the IO. |
| av_data_send(ioHandle, bufferSGList); | This api is used to send the read data to DPC. The read data could be located in non-contiguous cache buffers. This API take scatter-gather list specification to perform data movement directly from cache buffers to avoid additional memory copies. |
| av_data_receive(ioHandle, bufferSGList); | This API posts buffers for data receive, results in scsi xfer ready message to the DP. The list of buffers indicates memory addresses of the cache buffers that are allocated/used for this IO. |
| av_event_data_io_done(ioHandle,...); | The io_done event will be delivered to the application when data movement to/from the buffers is complete. Based on system configuration the data_io primitives may be provided by HBA driver or by API or by a specialized driver. |

| Cache Management API | |
| --- | --- |
| av_cache_add (vdisk | vExtent, cacheAgentInfo); | A cache-agent can be added for entire vDisk or at VExtent level (vExtent is a range of vLba). VExtent level specification will allow for physically different caching agents to cache different portions of a (huge) virtual volume. Regions within a vExtent will use the cache-agent associated with the vExtent. CacheAgentInfo is the transport layer information that is required for communicating with the cache-agent. This may include, FCID, port#(chl#) etc. |
| av_set_attr(vdisk | VExtent, CACHE_ON | CACHE_OFF); | CACHE attribute can also be set during creation of above objects. |
| av_cache_rd_update (ioHandle, bufferSGList); | Cache appliance can instruct the DPC perform the IO to the back-end storage. The DPC will replicate the data frames to cache-appliance as they are delivered to the host. This will allow the cache appliance to cache the data as it is being delivered to the Initiator. (Frame Level Reverse Mirror). |
| av_cache_rd_redirect(ioHandle); | Cache appliance can instruct the DPC to complete the read IO from backend storage w/o any involvement from cache agent. This is a case of a cache miss and cache-agent is unable/un-willing to cache the data at the time. |

| Cache Management API | |
|---|---|
| av_cache_wr_thru(ioHandle, bufferSGList); | This api allows cache agent to perform "write-thru" caching. The DPC is informed to perform the write IO to the backend target. The data frames will be replicated to cache agent as well as to the backend storage. This will be frame level mirroring. This could be configurable attribute so that all writes are treated as write thru. (Assumption: CA will accept entire data for the IO) |
| av_cache_wr_redirect(ioHandle); | Cache agent instructs DPC to perform the IO to the backend storage. No data/status will be sent to cache agent. Write data is not cached. |

| Initiator Mode API | |
|---|---|
| av_ivio_send (ioParameters, *ioHandle); | The cache-agent can use this API in the initiator mode to initiate IOs to the backend storage. This can be used for cache-flush, cache fills, read ahead etc. ioParametes include transport-specific description of the backend storage and bufferSGList for performing data io. The same API provides both read and write interface. An unique ioHandle will be returned by API layer for tracking of the IO. This API may be provided by HBA driver/SCSI mid layer based on the system configuration. Av_iio_send is used for accessing the backend storage as physical devices while av_ivio_send is used to send an IO to backend as a virtual device. In ivio case, LBA translation is handled by the DP. |
| av_event_iio_done(ioParameters, *ioHandle); | Event indicating completion of initiator mode IO. |

Region Spec and vExtents.

RegionSpec and vExtents can be added, modified or removed by Storage Application (SA) at any time for a virtual LUN (vLUN) A virtual extent will be qualified by start_lba and end_lba. Since the region table is associated with the virtual extent, it is not required to divide the entire virtual disk into small regions. This conserves the limited memory resource.

The virtual extent entries are stored within the VDT entry. This information is used by the DPC during LBA translation. The region size in the vExtent is measured in LBAs and must be a power of two. The region table can be created and managed by the application (API client) when it requires region-level control over any virtual LBA range, such as on-line migration. A region entry consists of the layout handle attributes (rd-only/rd-wr/no-access), and the relative offset within the layout. A separate Region Table is created for every vExtent that uses regions.

Granularity Management with RegionSpec.

RegionSpec for a virtual extent offers a finer granularity control to SA. A Virtual Extent may be subdivided into Regions when needed. This means that regions are optional, dynamic, and temporary. Regions are used for fine-grained control, for example, to reduce the size of the area to copy-on-write for snapshot, or to reduce the size of the "window" that is inaccessible during volume migration. Each region also has its own access control attributes.

The storage application can define the region size, which is constant across a virtual extent. Region size is specified as a number of LBAs, and this number must be a power of 2. While the region size is fixed within each vExtent (except for possibly the last region in the vExtent), different vExtents of a vDisk may have different region sizes. Typical region sizes range from 64 KB to 1 MB. Each region maps its portion of the virtual extent by specifying a layout and an offset (in LBA numbers) from the beginning of the layout. The region also specifies access control attributes which govern access to the region.

The Region Table contains all the region entries of a given vExtent. Region entries in the region table may have different access permission and may be mapped to different physical storage using different layouts.

Smarts Used During Lookups.

Table-driven Virtualization in the hardware can be accomplished with mapping Virtual IO (VIO) requests to Physical IO (PIO) requests, using the tales configured by control path. In order to achieve wire-speed performance, following mechanisms are used to speed up this operation:

Each fast path processor (known as PE), posts a request for a table entry well before it needs it for the processing. While the request is being serviced by hardware (to fetch the memory location), PE can operate on the previous data that was already fetched. This ensures there is minimal or no stalling of processing on the processor.

Each fast path processor (PE) maintains two hardware "contexts", which can process two different frames concurrently. If one context is waiting for a memory request (using the above mechanism, this should be low), the context can be switched to another.

Deadlock Prevention.

Block copy is normally performed between two separate devices. However, there are occasions when a block copy is attempted between two blocks that are actually part of the same target or same device. This can occur when repeated carving of the disks occurs across volumes. So it may appear the a block copy is being performed from one volume to another, when in fact the copy is being attempted within the same volume. When this occurs, read and write request can clash, and remain unresolved and waiting in both directions, resulting in deadlock. The block copy operation as described above avoids deadlock.

A block copy operation is used by storage management software for various reasons during data migration, snap-shot and many other applications. The slow path (SP) initiates a block copy by sending the read command to the target from which a block of data needs to be moved or copied and a write command to the target into which the data needs to be written. After SP's initiation of this operation, FP will then complete the I/O(s) and send the status of the operation to SP. The Slow Path creates two FC exchanges, one with the read disk and another to write disk to send read and write commands respectively. These two exchanges/commands are managed by the fast path until the required data is moved from the read-disk to the write-disk. On receiving the good status (from both devices), FP sends a message to SP, informing it about the completion status of block copy I/O. Note that SP can initiate multiple bCopy operations simultaneously.

Some disks or LUNs may not service multiple commands simultaneously. Suppose a block copy operation involves such a LUN for both read and write operation. Then, if the write command reaches the LUN before the read command, the bCopy operation would result in a deadlock. In order to avoid this, SP sends read command first to the read-target. It programs FP to send an interrupt to SP as soon as the first data frame arrives from the read-target. Upon receiving this interrupt, SP sends the write command to the write target. The rest of the operation is handled in FP and the final status is indicated to SP.

Error Recovery.

This section provides introduction to the Error handling and recovery strategy that is followed by the system. APIs have been written to handle errors such as failures during mirroring. The DP is allowed to handle data errors as much as possible, while the CP does other things, and gets involved only when the DP cannot resolve the errors.

DPC is responsible for handling all the errors at the Transport (FC) layer. This includes error checking at the Frame/Sequence/Exchange level, responding to the FC Abort processing initiated by the peer devices, maintaining Transport timeout & in the event of timeout expiry, initiating the Abort processing with the peer devices. All the errors Virtual IO or Physical IO (VIO or PIO) are reported to SA in the form of Asynchronous events. However, in case of PIO, DPC may retry an IO with the storage device (if it is possible), before sending a failure notification to SA.

In most cases, SA is responsible for completing the IO to the Initiator, after processing the failure event. In case of simple remaps, this processing may be to send the failure status to Initiator. But in case of Sync mirroring, this may involve more complex operations, and depends on the algorithms followed by SA. DPC merely provides hooks to perform any operation as required by SA, and completes (either successfully or with failure) to the Initiator. SA is responsible for initiating the actual error recovery procedure, once it is detected & reported by DPC (after it completes the transport abort processing, as mentioned above).

Journal Mode.

Journaling is used to create a point in time copy of primary storage at a remote location. The remote copy always represents a "point-in-time" that is in the past. At primary location, all the updates (writes) to the primary storage are recorded on a journal disk. A copy agent copies the journal disk to the remote storage in the background. Once all the data from the journal disk is committed to the remote location a new consistent point-in-time copy becomes available at remote location. The control path applications can use various proprietary algorithms for creating remote mirrored volumes. These algorithms can be built on the incremental snap-shot technology or by implementing a journal of all the updates to the primary mirror. An API provides capability to store a timestamp, sequence number and some application specific data, along with the Command Descriptor Block (CDB) on the journal disk.

Hierarchical Volumes.

Figure 16:
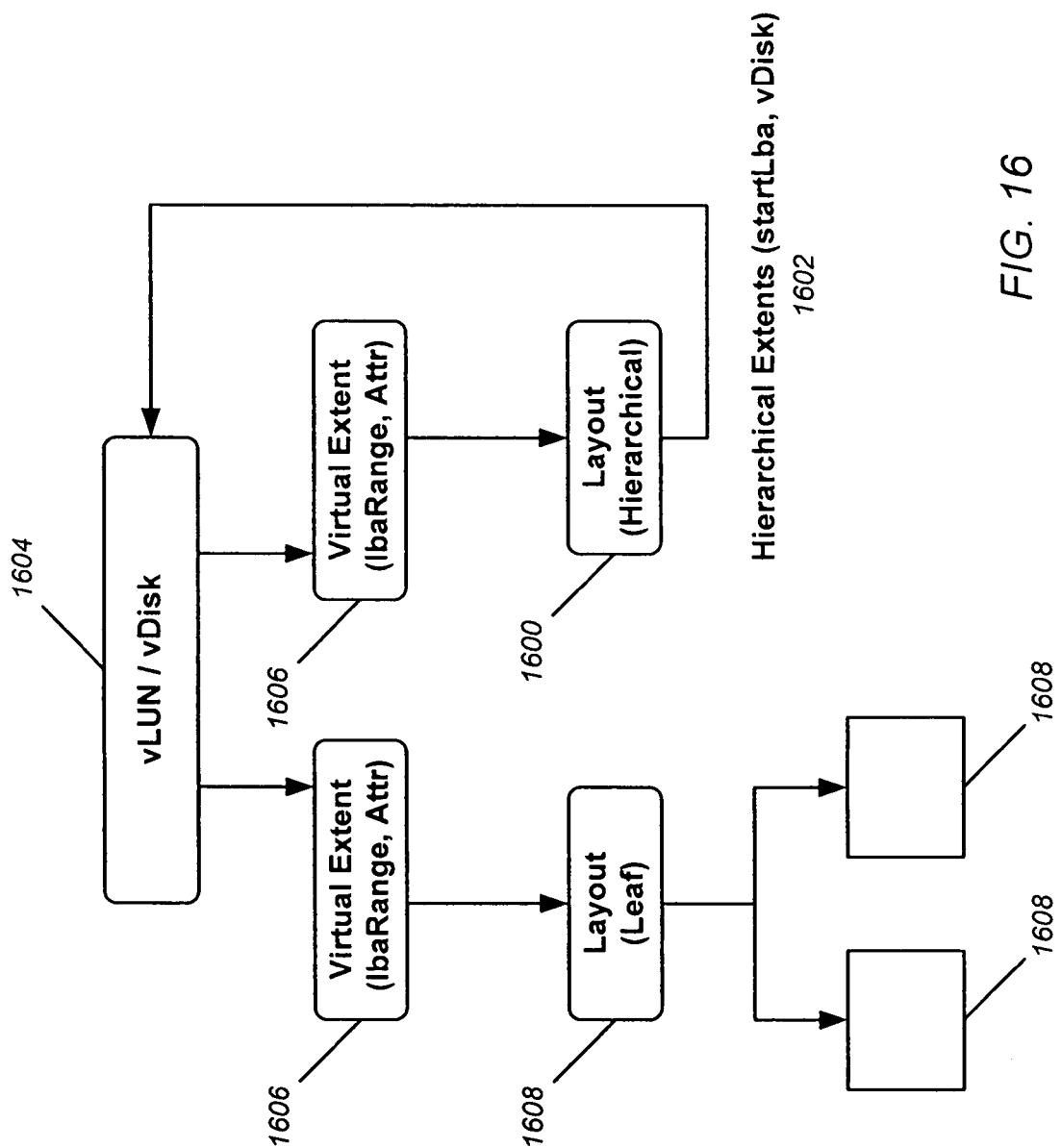
FIG. 16 illustrates an exemplary object model with hierarchical maps according to embodiments of the invention.

FIG. 16 shows the virtualization structure generally utilized according to embodiments of the invention, but instead of layouts 1600 only mapping to pExtents, volumes can be created in a hierarchical manner by mapping them to hierarchical extents 1602. When a pExtent is created, there could actually be another vExtent, which in turn will point to another map, creating a hierarchy of lookups. FIG. 16 illustrates the concept of hierarchical volumes, where a virtual disk (vDisk) 1604 may be split into multiple virtual extents (vExtents) 1606, which themselves may be divided further into one or more regions, which define one or more physical extents (pExtents) 1608.

Hierarchical mode allows the creation of maps of various vDisks on top of vDisks. The layouts 1600 would point to another vDisk 1604 instead of the pExtents. The hierarchy is traversed, going through multiple layers of vDisks, until a pExtent is eventually reached. The advantage of hierarchical volumes is that it makes partner applications simpler to write. For example, if it is desired to create a block copy of a vDisk, it is not necessary to get into the details of each physical layout and set permissions. Instead, a vDisk can be placed above it, regions and permissions can be created on this higher level vDisk, and a virtual block copy can then be performed on the lower vDisk using what amounts to a virtual command. The lower level details within the lower vDisk need not be managed. Similarly, if writing to a mirror, multiple writes to each pDisk are not necessary, because one write will take care of it.

The envisioned system architecture can support hierarchical representation of virtual storage. The hierarchical mapping tables allow storage applications to create complex virtualized storage and simplify the management of virtual storage.

FIG. 16 shows an exemplary object model with hierarchical maps. In the case of hierarchical mapping, the Layout object 1602 will be marked as "Hierarchical Layout". The Hierarchical Layout object will be similar to the Leaf Layout 1608 except that all the back end devices specified in the hierarchical layout shall map to vDisk 1604 objects as shown in the diagram. The startLba associated with each child will allow a storage application to use the desired portion of the vDisk for a given parent LBA range. Each child vDisk object will represent a Concat-Volume and will provide the next layer of mappings.

Different vExtents of a vDisk can use leaf or hierarchical layouts independent of each other. It is possible that each vDisk (that is used to build a top-level volume) may have a different configuration. For example, if the top-level volume is a mirror of 2 vDisks, one vDisk could be a simple volume, where as another vDisk could be a concatenation of multiple physical LUNs.

Figure 17:
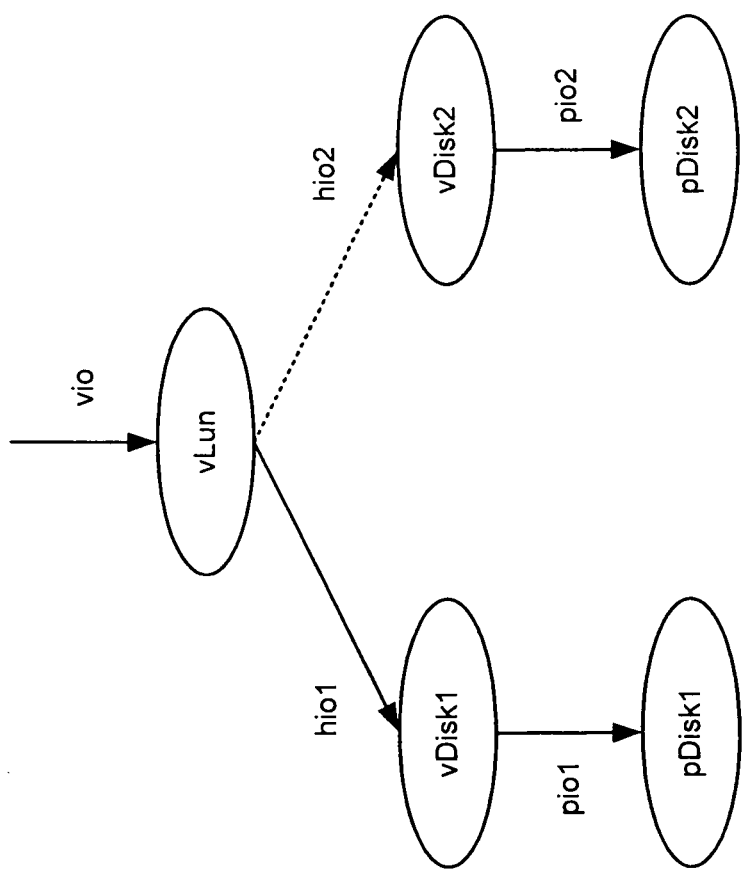
FIG. 17 illustrates an exemplary structure and operation of a hierarchical mirrored volume according to embodiments of the invention.

FIG. 17 is an example of a structure and operation of a hierarchical mirrored volume as envisioned under the system.

Figure 18:
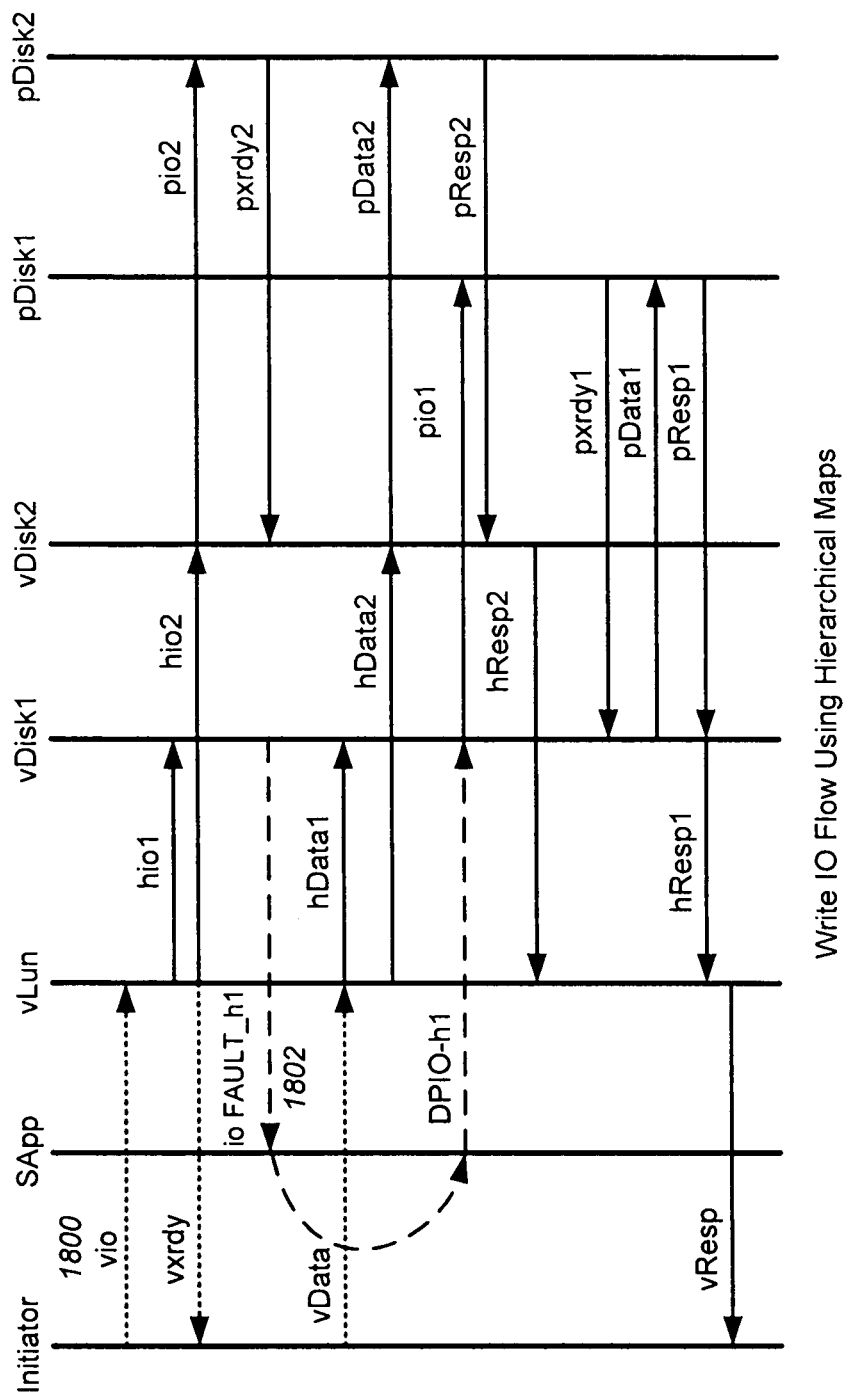
FIG. 18 illustrates an exemplary fault handling flow according to embodiments of the invention.

FIG. 18 is a flow diagram with details of a potential use. The remote initiator sends a write IO 1800 to vLun. This IO is called vio. The vLun is a 2 way mirror where each mirror is a vDisk. vDisk1 and vDisk2 are the two mirrors. The incoming vio gets mirrored on to vDisk1 and vDisk2 using internal IOs called hio1 and hio2 (hierarchical IO) respectively. The permission maps on vDisk1 cause hio1 to fault 1802 to the storage application while mappings on vDisk2 translate hio2 to pio2 and send it to back-end pDisk2. It can be seen from the flow diagram that IOs at any given layer progress independent of each other (e.g. hio1, hio2 or pio1, pio2). The storage application uses DPIO mode [2] to resolve the 10_Fault_h1 and send pio1 to pDisk as a result of fault resolution. The write-data received from the initiator gets relayed to pDisk1 and pDisk2 when the respective xfer_rdy signals are received. SCSI status on pio1 and pio2 completes hio1 and hio2. Once both hio1 and hio2 are complete a completion status vResp is sent to the initiator for the vio.

Array Virtualization.

As described above, in normal SAN-based virtualization, within the SAN fabric around a switch, initiators communicated with virtual targets, and the DP mapped the virtual targets to physical targets and sent it the physical I/Os. However, the same concepts can be used to virtualize a storage array. The DP can act as a front end to multiple storage arrays from different vendors, and concatenate all of them into a single storage.

The system Software can be utilized to support virtualization of arrays and disks from multiple vendors and present them as vendor agnostic storage that enables better utilization of storage resources.

Figure 19:
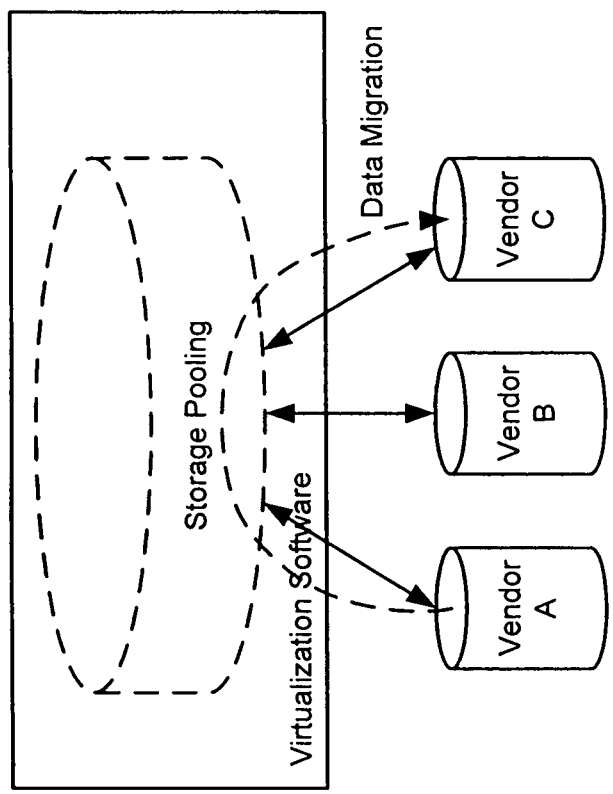
FIG. 19 illustrates an exemplary vendor-agnostic data migration according to embodiments of the invention.

FIG. 19 is a diagram showing such a usage. The system software can be used to enable support for mirroring between arrays and non-array based storage devices and striping across storage devices from multiple vendors.

In case of any resource starvation on the system, the default mode of operation is to use link-level flow control (Buffer-to-buffer credits in Fibre channel). The disadvantage of this scheme is that all the flows will be uniformly affected. It is possible that certain flows (SCSI transactions) may need to be serviced on a priority basis. Another solution is to flow control certain flows (that are not priority) selectively, by sending SCSI BUSY. This will ensure that all the flows are not flow-controlled.

Copy Services

Embodiments of the present invention support copy services such as mirroring (which is useful if a target should fail), copying to a remote site (which is useful for disaster recovery), and continuous data protection. In continuous data protection, point-in-time copies (snapshots) of volumes are made so that if one drive goes bad, the copy can be instantiated for recovery purposes.

Figure 20A:
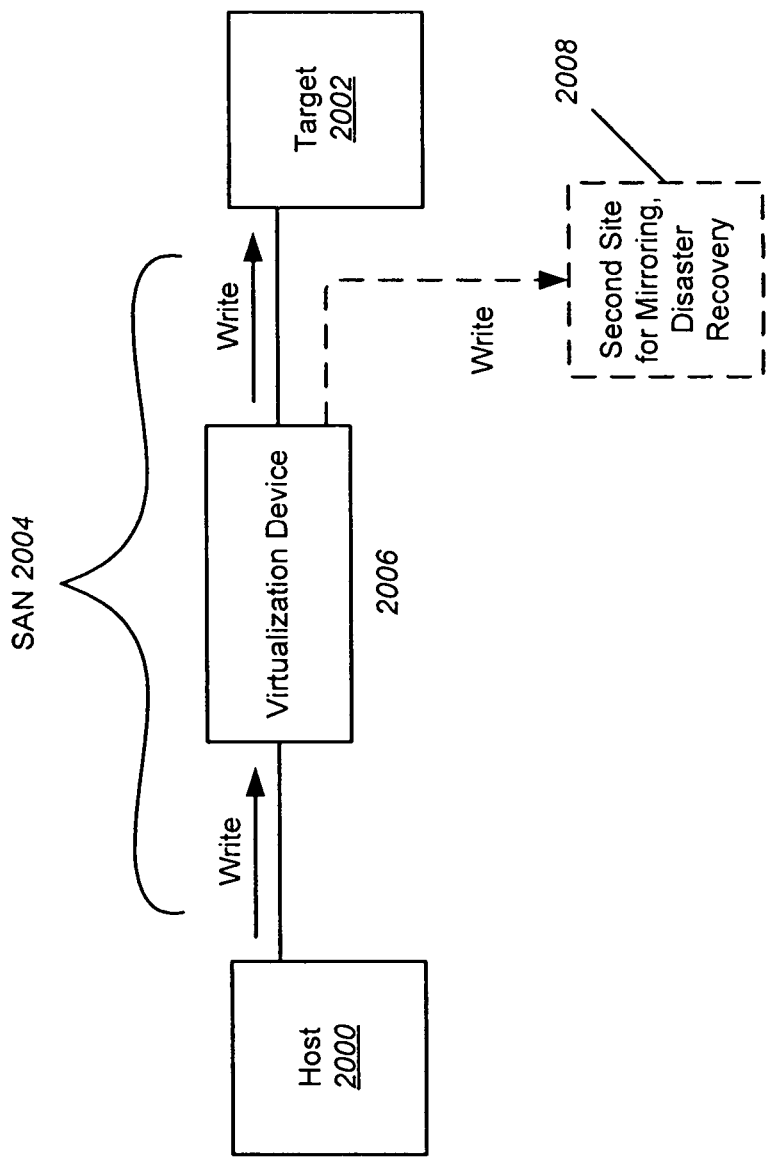
FIG. 20a illustrates an exemplary write operation to s second site for mirroring or disaster recovery according to embodiments of the invention.

FIG. 20a shows hosts 2000 connected to targets 2002 through a SAN fabric 2004. When initiators are writing to the targets, there are applications where it is desirable to split the write commands (write splitting). In FIG. 20a, a write command will normally go just to the target. However, the virtualization device 2006 takes control of the write and sends it to both the target and another device 2008. This concept is similar to mirroring, and again the initiator does not know that it is writing to another device. This would be done for a purpose similar to synchronous mirroring (write to two locations, and send confirmation only when both are successfully written), such as writing to a remote site for disaster recovery purposes (but in this case, even if one the write to the backup device failed, a confirmation would still be sent back to the initiator). Another purposes is for continuous data protection (CDP). In CDP, the additional writing creates point in time copies, so when the targets goes bad, a point in time copy can be instantiated and the data recovered.

Proxy Mode w/Virtual N-Ports.

The system supports virtual N-ports, which enables multiple virtual local ports behind a single physical N-port. The virtual local ports can be assigned World wide Port Names (WWPNs) independently by different Management entities, at different points in time to establish better control over the ports. This functionality enables support for the ability to support multiple personalities (Initiator, Target or in-band control) behind a single physical port, and the ability to support proxy mode of operation which facilitates a one-to-one mapping of physical target ports as virtual target ports.

Virtual Local Ports.

It is possible to assign WWPNs independently to each Virtual Local port, even though they are behind a single physical port. This removes the restrictions in World wide Node Name (WWNN) assignments, and makes it possible for them to be assigned independently, by different Management entities, at different points in time.

The Virtual Local ports can be independently configured to be different Zones in a Fabric, using the WWN based zoning. For example, it is possible to create Virtual Initiator (VI), Virtual Target (VT) and Virtual Control (VC) instances on a single physical port, assign them different WWN's and configure them in different Zones.

Proxy Mode.

In proxy mode, on the write splitting device, virtual targets are created, which is similar to the virtualization concept. The initiators see the virtual targets instead of the physical targets, and the writes are split. This concept is very similar to mirroring.

The system supports a proxy mode, which facilitates a one-to-one mapping of physical target ports as virtual target ports. This would imply a need for emulating multiple N-ports behind a single physical port on the hardware. The primary motivation for this mode is certain class of applications, such as replication & continuous backup. Behind each physical port of the hardware, multiple N-port id's (FC port_id) can be assigned by logging to the Switch that supports N-port virtualization. The DP can support up to 2048 N-port addresses across all its ports, which can be distributed across all the physical FC ports (up to 8) in any manner.

In the simplest scenario, each of these virtual N-ports is mapped to each FC port connected to the fabric (either Initiator or a Target port). For example, in a SAN that consists of m host initiator ports & n target ports, the DP would allocate (m+n+1) virtual N-port ids from the Switch. It then creates m virtual initiator (VI) objects & n virtual target (VT) objects, which are the objects that represent the corresponding physical entities (initiators & targets). Each of these objects is assigned a WWPN, and the system registers all VT objects as SCSI FCP targets with the Switch. Each VT object can then present multiple LU's behind it. The hardware can also allocate one additional N-port id for itself, which is used to send the split write commands to secondary storage.

Figure 20B:
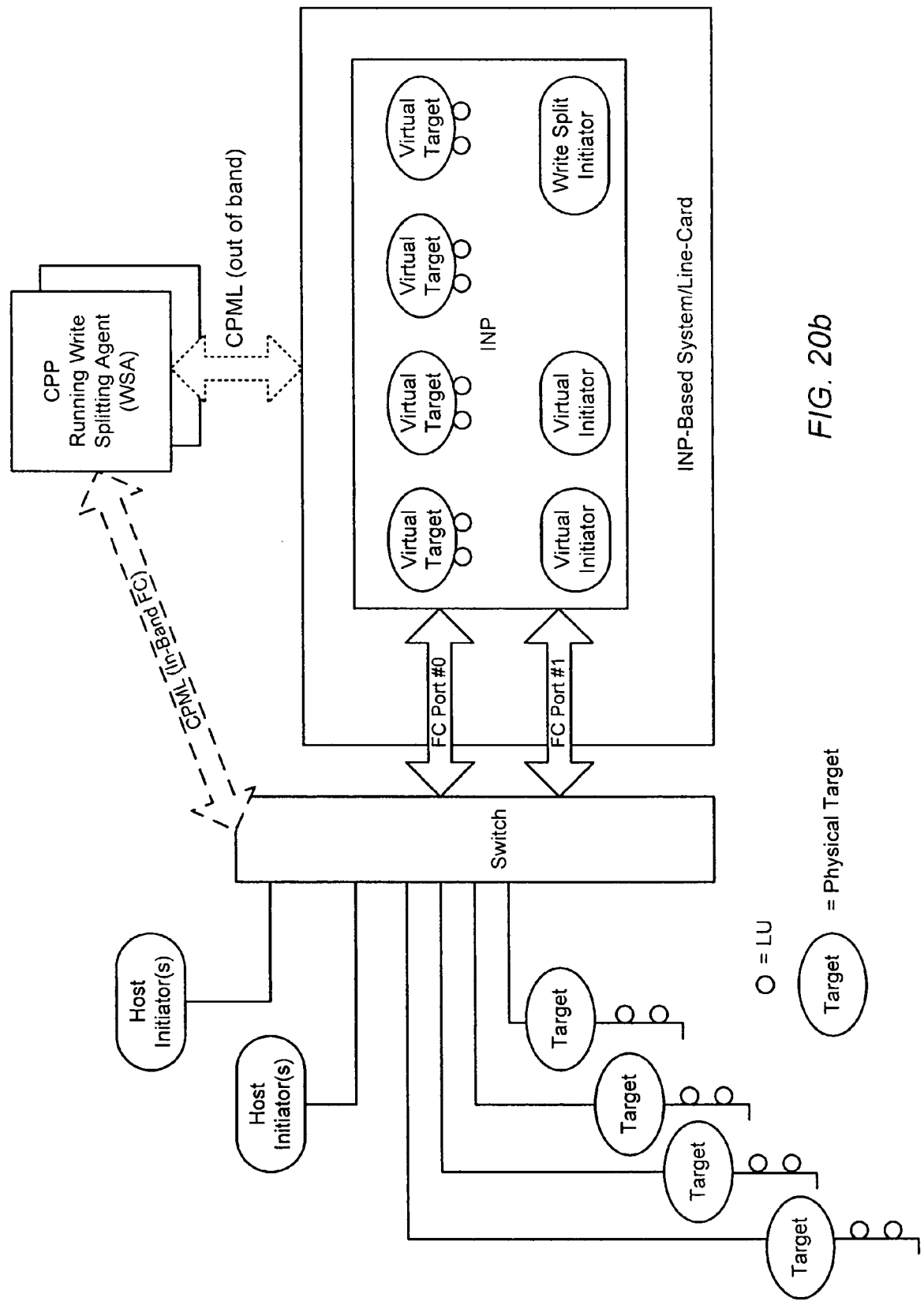
FIG. 20b illustrates an exemplary proxy mode mapping of physical target ports as virtual target ports according to embodiments of the invention.

FIG. 20b is an block schematic diagram showing a system utilizing such a proxy mode. In this case, the configuration is shown with m=2 & n=4. In Proxy mode, the hardware can maintain an association of physical objects (initiator & target ports) and their corresponding virtual objects (virtual initiators & virtual targets). All the SCSI commands (non-read/write) received from initiators are directed to virtual target ports, which are forwarded to the corresponding target ports that they represent. In this case, there is no need for providing SCSI personality by the storage application. Hence, it is possible to support applications that utilize write splitting functionality, with only a light-weight write splitting agent on CPP.

Additionally, for all the SCSI exchanges between initiators & primary storage targets, the exchange timers are operable to be disabled on the hardware platform (except for garbage collection), and all the error handling is left to end devices (initiators & targets). For those SCSI sessions initiated by the hardware with secondary devices (as a result of write splitting, which the host is unaware of), the hardware still maintains exchange timers. The SCSI or Transport failures on either Primary or secondary are still notified to CP agents, for appropriate action (Dirty region logging).

Proxy mode can be introduced with minimal disruption in an existing SAN installation, by using multi-pathing. The Intelligent switch (with the hardware as a component) can be added as an alternative path to existing path to a target. Once the multi-path driver on the host recognizes the new path (through the hardware), the original path can be broken, and all IOs are automatically redirected through the hardware. This will require spoofing the target behavior on the Virtual target, to make the Multi-path driver believe this to be a different path to the same primary target device.

Transparent Mode.

In the transparent mode, the initiator sees only the physical target, not a device in the middle, and the DP is part of the switch and intercepts all write commands and directs them to a second device.

Transparent mode solves one drawback that is posed by Proxy mode. The LUN masking tables on Storage devices (in existing SAN installations) use the Initiator WWN (or FC port ids) to configure access controls. If a new Intelligent switch needs to be introduced in the Fabric to enable special applications (such as Asynchronous replication), the existing LUN masking tables need to be changed, to provide access to hardware (which acts as Virtual Initiator).

Transparent mode is a way to address this restriction. In this case, hardware logs into the switch & obtains N-port id(s). But it does not register itself as a (Virtual) Target device. The Switch is configured to forward all frames coming from all or a subset of ports on the Switch to the hardware (similar to Promiscuous mode). The hardware is operable to filter SCSI write commands on certain protected volumes, and sends them to the Secondary Write Device (SWD), using its (Virtual) Initiator interface. In addition, it also forwards the original command to primary storage for which it was intended. All the other frames are simply forwarded by the hardware (through the Switch again) to their intended destination address. This ensures that there is virtually no disruption to the operation of SAN, and new applications can be introduced in a completely non-intrusive manner.

Internal N-Port.

In addition to external ports, The hardware can "virtually" log into Fabric server (which runs as part of Fabric services running on the Control processor) and acquires FC port_ids. It also registers "virtually" with the Name server running on the Control processor. These are referred to as "Internal N-ports" (IN ports)

Write Splitting with Hardware Assist.

The ability of an intelligent storage controller device to replicate writes, received from the Initiator for the primary storage, onto secondary storage exposed by a Secondary Write Device is known as Write Splitting. Write-Splitting can be used to address a wide spectrum of data-protection applications. Some of its most common applications include Remote-replication, Off-host Write-Journaling and Continuous Backup.

The envisioned system technology can provide Write Splitting support for vDisks in the Data Path (DP). The envisioned system provides hardware assist functions that can be used to implement a Write Splitting agent without compromising the IO performance on the primary storage (for instance IO performance will not be degraded while intercepting a write command).

The envisioned system provides the following components in order to support Write Splitting functionality: (1) Write Splitting Agent 1 (WSA)—Write-Splitting Agent implemented by, using the FS-WS API; (2) Write Splitting API (FS-WS API)—ISVs can implement custom Write-Splitting Agents using these APIs; and (3) Write Splitting Agent API (FS-WSA API)—This API is exposed by the WSA. ISVs need to implement these APIs to customize the WSA.

Figure 21:
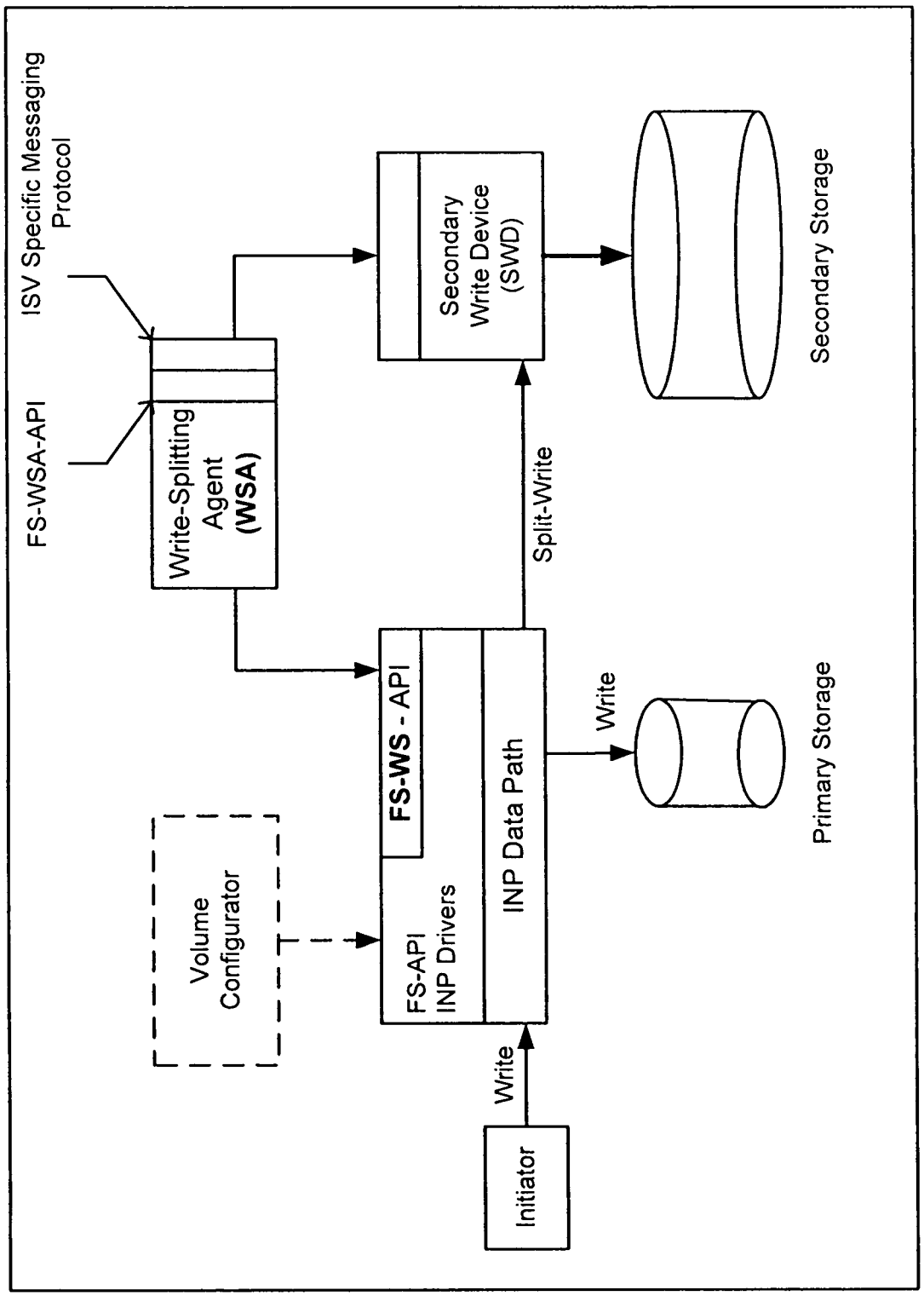
FIG. 21 illustrates exemplary components that may be needed to perform write splitting according to embodiments of the invention.

FIG. 21 shows a possible implementation of the different components involved in a solution, based on the Write Splitting support feature in the DP.

Write Splitting Agent.

The WSA is a Control Path (CP) agent, which uses the FS-WS API to configure Write Splitting settings in the FS-Data Path. The WSA invokes the FS-WSA API to communicate with the Secondary Write Device. This application allows the Secondary Write Device to take advantage of the FS-Data Path write splitting capability without having to write any software on the intelligent storage switch/controller.

Write Splitting API (FS-WS API).

The Write Splitting API is an extension of the driver API. The FS-WS API exposes functionality to configure Write Splitting settings of vDisks on the FS-Data Path. This API can be invoked by the WSA.

Write Splitting Agent API (FS-WSA API).

The WSA API is also an extension of the API but at a higher layer than the driver API. This interface is used for communication between the WSA and the Secondary Write Device. This API can be invoked by the WSA to communicate with the Secondary Write Device in a vendor-independent manner. There are two levels at which ISVs can interface with the system, in order to implement the Write Splitting functionality: (1) Agent API level: ISV products can interface with the WSA using in-band (using FCP/SCSI messages), or out-of-band messaging protocol (such as Ethernet).—FS-WSA-API; and (2) Driver API level: ISVs can implement a WSA (in Control path) using the fast path APIs.—FS-WS-API.

The Write Splitting support facilitates seamless integration of data-protection applications with the FS Data Path. Thus data protection software vendors can leverage the functionality of their solutions to provide protection to virtual volumes available in a enabled intelligent storage switch/controller, without compromising the performance.

Proxy Mode.

This mode is to implement certain class applications, such as replication & continuous backup. These are typically supported through external devices (appliances) or applications that execute on standard servers, which are connected to SANs using standard FC connections. In this case, there is typically no need for running full-featured volume management application on the system (on CP). Instead, there is a thin agent (referred to as Write Splitting Agent or WSA) which sets up the volumes that need to be protected.

Figure 22:
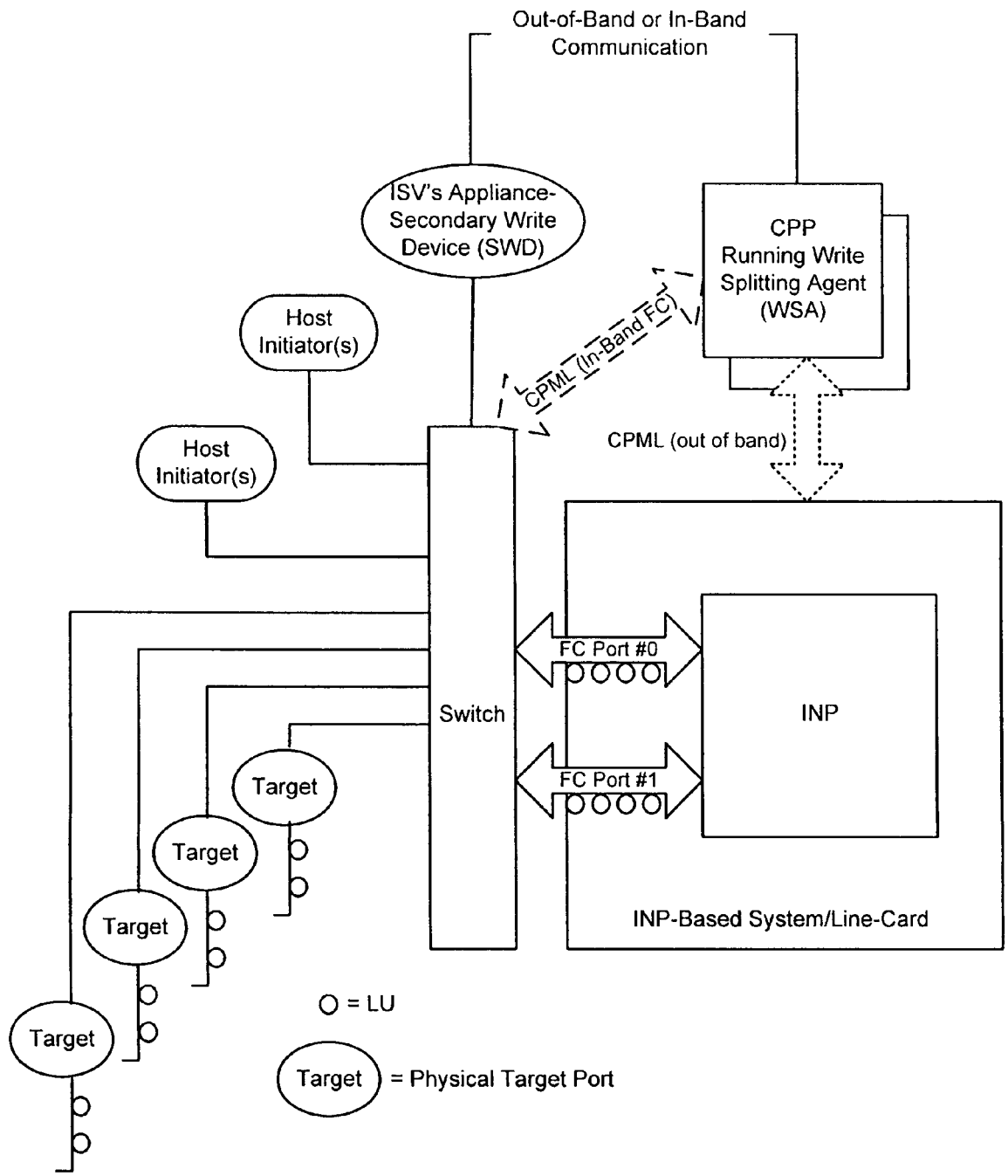
FIG. 22 illustrates an exemplary system configuration with a write splitting application according to embodiments of the invention.

FIG. 22 is a diagram of a typical system configuration with Write splitting application. The Virtualization mode has the following restrictions while running applications based on Write splitting functionality of the hardware (such as Asynchronous replication).

A Volume management application can run on Control path (alongside Write Splitting Agent application that communicates with Replication/Backup appliance), which is responsible for creating Virtual volumes and providing SCSI target personality.

If there are more targets at the back-end than the number of ports on the hardware, the Volume management application needs to distribute the back-end LU's (or virtualize them), even though the replication or backup application does not require this feature.

SAN Services

Routing Features.

The underlying hardware can provide basic Layer-2 Fibre channel switching (which consists of looking at the destination address in a Fibre Channel frame, and switching the frame to another port on the same switch, or to another switch through Inter-Switch-Link), along with other intelligent processing, without compromising the switching performance, as an integrated solution. The intelligent processing could be one of the following:

Inter-Fabric Routing: This is the ability to connect to two completely independent Fabrics (with potentially overlapping address space), by performing address translation.

Hard-zoning & LUN-masking: This is the ability to parse inside the Fibre Channel frame, and make certain decisions (based on configuration parameters that are set from an external control entity). Hard-zoning requires the switching entity to allow switching to take place only among a subset of ports. LUN masking allows the switching entity to provide higher level services (in addition to switching), whereby certain host initiators (servers) can be masked from certain storage volumes (or LUNs), as a security or provisioning policy.

SAN Services—Universal Port Concept.

The hardware can supports different flavors of Fibre Channel ports, which can be configured by software. These port types include—F, N, E, TF, TN or TE. Typically, Fibre channel devices take on the role of a subset of these port types (for e.g., switch ports can be F, E or E). In this manner, the overlying software does not care which protocol is run, since the hardware can distinguish the underlying ports and perform the proper operations automatically.

Figure 23:
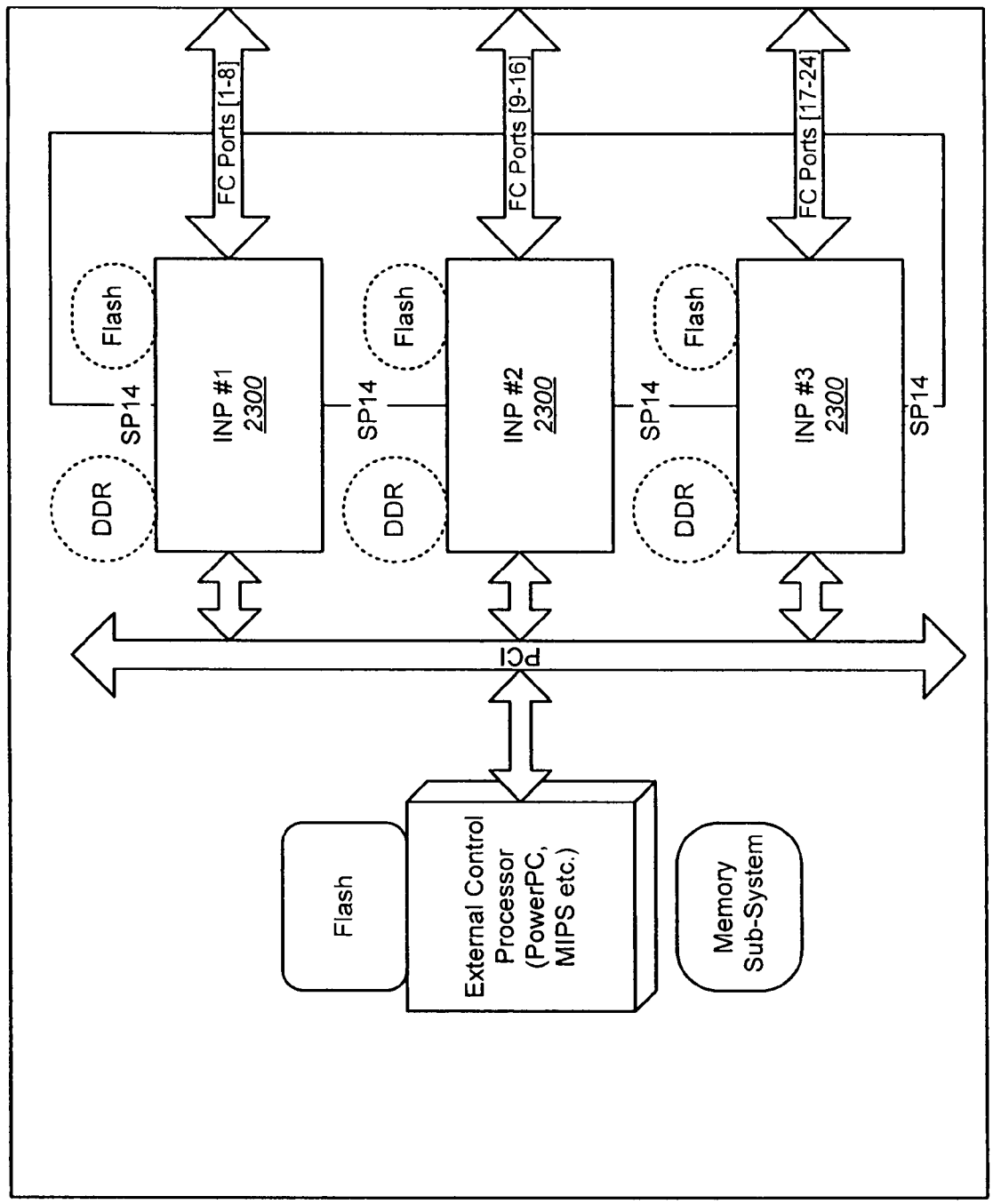
FIG. 23 illustrates an exemplary full system configuration (24 ports) of the switch product using multiple DPs according to embodiments of the invention.

FIG. 23 shows an exemplary full system configuration (24 ports) of the switch product using multiple intelligent network processors 2300.

Switching (VSAN) with Intelligence Support.

In this mode, in addition to standard FC switching, VSAN switching & Virtualization acceleration is supported. To support this mode, the hardware switching feature on the DP is disabled, and all frames are routed to VE module (by setting all route entries to point to VE). The fast path firmware (referred to as Switching FP henceforth, to distinguish it from intelligence in the fast path, referred to as Virt FP) performs the routing lookup, by extracting route table entries from external DDR memory. It determines the egress port based on the route lookup, and forwards the frame on egress port (with or without the associated VSAN tag). Part of the fast path PEs perform virtualization acceleration.

In this mode, the intelligent network processor requires external DDR memory to store the route tables, virtualization tables and the Support processor firmware.

The port configuration & route lookup works as follows. Each port can be configured as F, TF, E or TE port (FL ports are not supported). Each F port can be either VSAN-disabled or VSAN-enabled (referred to as F', to distinguish it from standard F port). TF or TE ports have another VSAN enabled device connected on them (TN or another TE port respectively). F' will have a standard N-port connected to it (but internally configured to be VSAN-enabled). Internally F ports can be associated with "default VSAN ID" and be treated as F' ports. Default VSAN ID (0x00) is not used for any other VSAN.

The control processor runs multiple instances of Fabric services, one for each VSAN supported on the switch. Each instance maintains the routing & device database independently, and populates the routing entries based on this. The DP registers DR, AR, DRT & ART are not used in route lookup. All entries in DRT & ART point to VE module in the DP. DP hardware sends all SCSI FCP frames to VE module & other frames (non-FCP) to Support processor. Both of them (VE & SP firmware) perform identical route lookups and forward the frame to an egress port. One of the side effects of this scheme is that non-FCP frames (such as ELS, FC-CT) coming on an ingress port (intermixed with other FCP frames) to the DP may go out of order compared to other FCP traffic.

In addition to external ports, the DP "virtually" logs into Fabric server (which runs as part of Fabric services running on the Control processor) and acquires FC port_ids. It also registers "virtually" with the Name server running on the Control processor. These are referred to as "Internal N-ports" (IN ports). Theoretically, these are similar to Virtual N-ports, but since these are internal, we use a different term to refer to them.

The DP fast path PEs are divided into two banks: three pairs to handle Switching functionality (Switching FP), and two pairs to handle virtualization acceleration (Virt FP). All incoming frames are forwarded to Switching FP (based on the TYPE), which makes a decision on whether the frame should be switched or virtualized (depending on the D_ID of the frame—if the D_ID matches with one of the IN port_ids, it is to be virtualized). If the frame needs to be switched, the frame is forwarded to one of the egress ports.

If the frame needs to be virtualized, the TYPE field is changed to reflect this, and the frame is unloaded. The DP hardware routes this frame back to VE, but this time it is processed by PE's that run Virt FP. The internal N-ports (IN ports) are treated as VSAN enabled (TN ports). When a frame is sent to Virt FP (by Switching FP), the header includes the VSAN header. After virtualizing, Virt FP includes the VSAN header and sends the frame back to Switching FP, which switches the frame to one of the egress ports (F or E), either with VSAN tag or without it (depending on the PORT_TYPE of egress port).

For those frames that are received by Support processor (which includes non-FCP frames directly coming from FC ports on the DP, as well as FCP frames forwarded by Virt FP), they need to be either handled internally (using FC4/FCP modules, or forwarded to Control processor as Raw frames. The latter is for supporting Fabric services. This is done by looking at the D_ID of the frame, and if it is one of the well-known addresses (WKA), it is sent to Raw frame module (to be processed by Fabric services module on the Control processor).

Software Stack.

Figure 24:
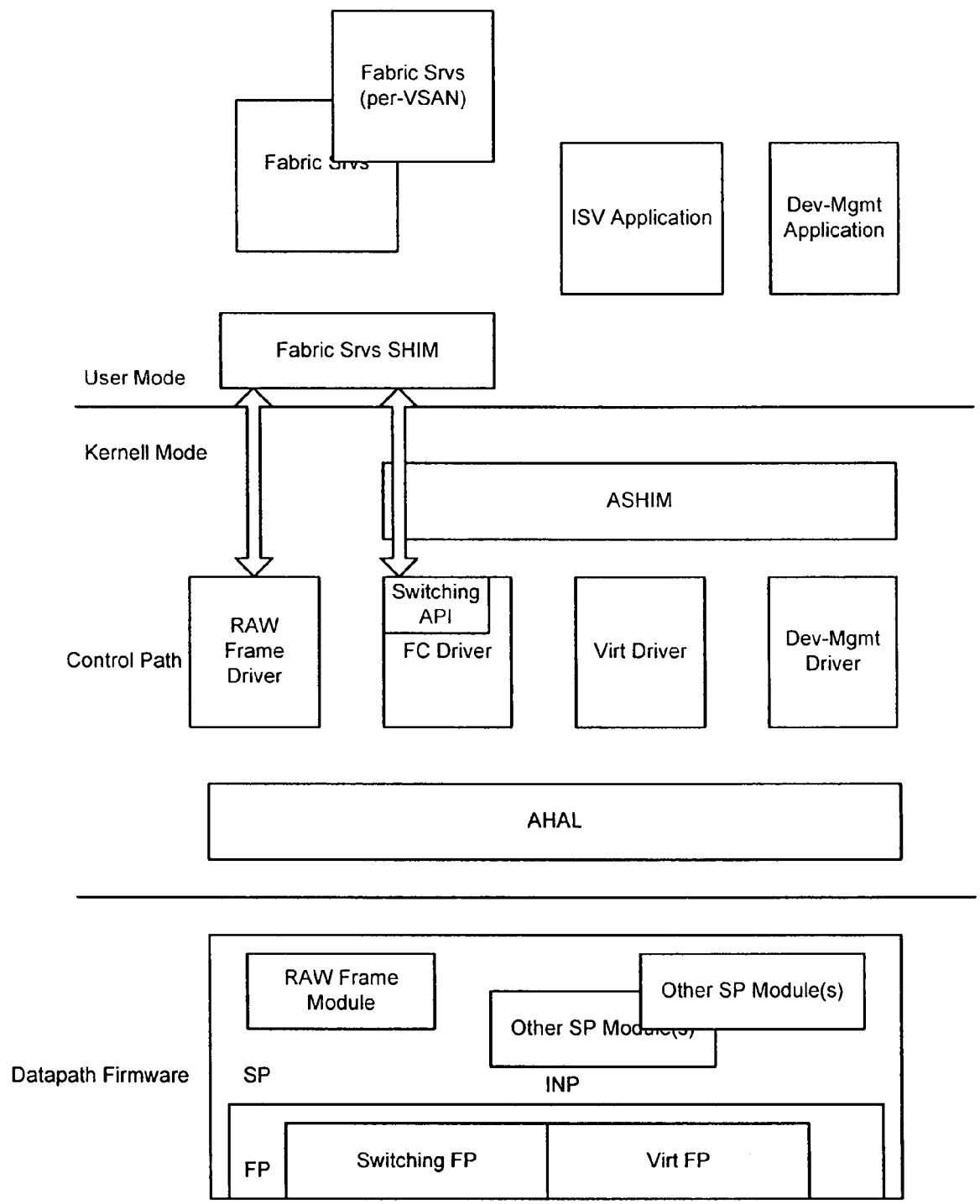
FIG. 24 illustrates an exemplary modified driver software stack which runs in the CP to support the hardware configuration of FIG. 23 according to embodiments of the invention.

FIG. 24 shows the modified driver software stack (which runs on the Control processor), to support the hardware configuration of FIG. 23. The shaded modules are additional pieces required to support this new functionality.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An apparatus for performing storage applications on physical storage using a split-path architecture, comprising:
a first data path (DP) for virtualizing the storage and performing data functions, the first DP including one or more DP processors (DPPs) and memory configured for storing firmware and one or more virtualization tables; and
a first control path (CP) communicatively coupled to the DP, the first CP including one or more CP processors (CPPs) and software configured for performing control functions in conjunction with the first DP, wherein an application programming interface (API) is provided by the first CP, the API being operable to enable a remote partner to perform virtualization services, the remote partner being different than the API provider,
wherein the first CP programs a mapping of virtual storage to the physical storage, the first CP provides the mapping to the first DP, the first DP being operable to read data from and write data to the physical storage based on the mapping from the first CP, and the first DP and the first CP are different paths.

2. The apparatus of claim 1, the one or more virtualization tables including a virtual disk table (VDT) having one or more virtual disk (vDisk) entries representing a vDisk, each vDisk entry containing one or more virtual extents (vExtents), and each vExtent containing a pointer for mapping the vExtent to a physical extent (pExtent) in the physical storage.

3. The apparatus of claim 2, wherein at least one vExtent is partitioned into multiple regions, the virtualization tables further including a region table pointed to by the vExtent that is partitioned into the multiple regions, the region table including multiple region table entries, each region table entry containing a pointer for mapping a region in the vExtent to a pExtent.

4. The apparatus of claim 3, the virtualization tables further including a layout table pointed to by either a vExtent or a region table entry, the layout table containing one or more pointers to a pExtent in accordance with a layout table type.

5. The apparatus of claim 1, further comprising a second CP communicatively coupled to the first DP for performing the control functions in conjunction with the first DP should the first CP fail.

6. The apparatus of claim 1, further comprising a second DP communicatively coupled to the first CP for performing the data functions in conjunction with the first CP should the first DP fail.

7. The apparatus of claim 1, the apparatus communicatively coupled to one or more hosts and one or more targets in a storage area network (SAN).

8. A computer comprising the apparatus of claim 1.

9. The apparatus of claim 1, the DP contained within a switch and the CP contained within a computer coupled to the switch.

10. A method for performing storage applications on physical storage using a split-path architecture, comprising:
virtualizing the storage and performing Small Computer System Interface (SCSI) data functions in a first data path (DP) including one or more DP processors (DPPs) and one or more virtualization tables;
performing control functions in conjunction with the first DP in a first control path (CP) including one or more CP processors (CPPs);
programming, in the first CP, a mapping of virtual storage to the physical storage;
providing, by the first CP, the mapping to the first DP, the first DP being operable to read data from and write data to the physical storage based on the mapping from the first CP, wherein the first DP and the first CP are different paths; and
providing an application programming interface (API) on the CP for enabling a remote partner to perform virtualization services, the remote partner being different than the API provider.

11. The method of claim 10, the step of virtualizing the storage comprising:
creating a virtual disk table (VDT) as one of the virtualization tables;
creating one or more virtual disk (vDisk) entries representing a vDisk in the VDT;
creating one or more virtual extents (vExtents) in each vDisk entry; and
storing a pointer in each vExtent for mapping the vExtent to a physical extent (pExtent) in the physical storage.

12. The method of claim 11, further comprising:
partitioning at least one vExtent into multiple regions;
creating a region table pointed to by the vExtent that is partitioned into the multiple regions, the region table including multiple region table entries; and
storing a pointer in each region table entry for mapping a region in the vExtent to a pExtent.

13. The method of claim 12, further comprising:
creating a layout table pointed to by either a vExtent or a region table entry, the layout table containing one or more pointers to a pExtent in accordance with a layout table type.

14. The method of claim 10, further comprising communicatively coupling a second CP to the first DP for performing the control functions in conjunction with the first DP should the first CP fail.

15. The method of claim 10, further comprising communicatively coupling a second DP to the first CP for performing the data functions in conjunction with the first CP should the first DP fail.

16. The method of claim 10, further comprising communicatively coupling the apparatus to one or more hosts and one or more targets in a storage area network (SAN).

17. The method of claim 10, further comprising providing an application programming interface (API) library to the CP for enabling partner applications to be written using the API library to perform virtualization services.

18. The method of claim 11, further comprising processing an input/output (I/O) request in the DP by:
identifying the logical block address (LBA) in the I/O request;
identifying the vExtent to which the LBA belongs;
using the pointer in the vExtent to identify the pExtent involved in the I/O request; and
forwarding the I/O request to the identified pExtent.

19. The method of claim 12, further comprising processing an input/output (I/O) request in the DP by:
identifying the logical block address (LBA) in the I/O request;
identifying the vExtent and the region to which the LBA belongs;
using the pointer in the vExtent to identify the region table associated with the vExtent;
accessing the region table entry corresponding to the identified region to determine the pExtent involved in the I/O request;
determining an access attribute for the pExtent; and
forwarding the I/O request to the identified pExtent if access is allowed in accordance with the access attribute.

20. The method of claim 13, further comprising processing an input/output (I/O) request in the DP by:
identifying the logical block address (LBA) in the I/O request;
identifying the vExtent and the region to which the LBA belongs;
using the pointer in the vExtent to locate the layout table associated with the vExtent; and
forwarding the I/O request to the one or more pExtents pointed to in the layout table.

21. The method of claim 20, further comprising faulting the I/O request to the CP for exception handling if access to the pExtent is not allowed in accordance with the access attribute.

22. The method of claim 11, further comprising performing a snapshot by:
- copying a first vDisk to a second vDisk, and maintaining all pointers stored in the first vDisk in the second vDisk;
- setting all region attributes in the first vDisk to have no write access;
- if a write request for a particular region in the first vDisk is received,
  - faulting the write request to the CP for delayed processing,
  - performing a block copy of a particular pExtent in a first physical LUN (PLUN) pointed to by the particular region to a new pExtent in a second pLUN,
  - changing the pointer in the region in the second vDisk corresponding to the particular region in the first vDisk to point to the new pExtent in the second pLUN,
  - setting the region attribute for the particular region in the first vDisk to read/write access, and
  - allowing the faulted write request to be forwarded to the particular pExtent in the first pLUN.

23. The method of claim 11, further comprising performing data migration by:
- setting an attribute of a region in a vDisk pointing to a particular pExtent in a first physical disk (pDisk) to be migrated to have no write access;
- performing a block copy of the particular pExtent in the first pDisk to a new pExtent in a second pDisk;
- if a write request for the region in the vDisk is received during the block copy process, faulting the write request to the CP for delayed processing;
- changing the pointer in the region in the vDisk to point to the new pExtent in the second pDisk after the block copy process is completed;
- setting the attribute for the region in the vDisk to read/write access; and
- allowing any faulted write request to be forwarded to the new pExtent in the second pDisk.

24. The method of claim 13, wherein one layout type is a mirroring layout type containing two pointers to different pExtents to perform a mirroring function.

25. The method of claim 24, further comprising utilizing the mirroring layout type when receiving a write request to a target to write data to a caching appliance in addition to the target.

26. The method of claim 24, further comprising utilizing the virtualized storage to create a hierarchical arrangement of vDisks.

* * * * *